United States Patent
Baarman et al.

(10) Patent No.: US 7,663,258 B2
(45) Date of Patent: Feb. 16, 2010

(54) MINIATURE HYDRO-POWER GENTERATION SYSTEM POWER MANAGEMENT

(75) Inventors: David W. Baarman, Fennville, MI (US); Thomas Leppien, Grand Haven, MI (US); Terry Lee Lautzenheiser, Nunica, MI (US); Christopher B. Houghton, Chicago, IL (US); Stephen J. McPhilliamy, Chicago, IL (US)

(73) Assignee: Access Business Group International, LLC, Ada, MI (US)

( * ) Notice: Subject to any disclaimer, the term of this patent is extended or adjusted under 35 U.S.C. 154(b) by 231 days.

(21) Appl. No.: 11/980,944

(22) Filed: Oct. 31, 2007

(65) Prior Publication Data

US 2008/0061557 A1 Mar. 13, 2008

Related U.S. Application Data

(60) Continuation of application No. 11/522,166, filed on Sep. 15, 2006, now Pat. No. 7,605,484, which is a continuation of application No. 11/110,503, filed on Apr. 20, 2005, now Pat. No. 7,119,451, which is a division of application No. 10/760,020, filed on Jan. 17, 2004, now Pat. No. 6,927,501, which is a continuation-in-part of application No. 10/683,020, filed on Oct. 9, 2003, now Pat. No. 6,885,114.

(51) Int. Cl.
F02D 9/00 (2006.01)

(52) U.S. Cl. .................. 290/43; 29/52; 29/54

(58) Field of Classification Search ............ 290/43, 290/52, 54
See application file for complete search history.

(56) References Cited

U.S. PATENT DOCUMENTS

| | | | |
|---|---|---|---|
| 692,714 A | 2/1902 | Sala et al. | |
| 1,560,535 A | 11/1925 | Burton | |
| 2,436,683 A | 2/1948 | Wood, Jr. | 290/52 |
| 2,663,541 A | 12/1953 | Geen et al. | 253/3 |
| 2,743,374 A | 4/1956 | McCreary | 250/214 R |
| 2,743,375 A | 4/1956 | Parker | 290/52 |
| 3,233,164 A | 2/1966 | Tyler | 322/28 |

(Continued)

FOREIGN PATENT DOCUMENTS

DE 43 20 180 A1 6/1993

(Continued)

OTHER PUBLICATIONS

U.S. Appl. No. 11/981,094, Baarman et al., filed Oct. 31, 2007.
U.S. Appl. No. 11/981,353, Baarman et al., filed Oct. 31, 2007.
U.S. Appl. No. 11/981,288, Baarman et al., filed Oct. 31, 2007.
U.S. Appl. No. 11/981,087, Baarman et al., filed Oct. 31, 2007.
U.S. Appl. No. 11/980,949, Baarman et al., filed Oct. 31, 2007.

(Continued)

*Primary Examiner*—Nicholas Ponomarenko
*Assistant Examiner*—Iraj A Mohandesi
(74) *Attorney, Agent, or Firm*—Brinks Hofer Gilson and Lione

(57) ABSTRACT

A miniature hydro-power generation system may include a hydro-generator, a control circuit and an energy storage device. A flow of liquid may be used to rotate the hydro-generator to generate electric power. The control circuit may switch the electric power to charge the energy storage device and/or to supply the electric power to an electrical load. The control circuit may also selectively switch the energy storage device to supply electric power to the electrical load. Further, the control circuit may disable both the hydro-generator and the energy storage device from supplying electric power to the load.

13 Claims, 33 Drawing Sheets

U.S. PATENT DOCUMENTS

| | | | |
|---|---|---|---|
| 3,551,091 A | 12/1970 | Veloz | 21/102 |
| 3,776,265 A | 12/1973 | O'Connor, Jr. | 137/487.5 |
| 3,845,291 A | 10/1974 | Portyrata | 240/26 |
| 3,913,399 A | 10/1975 | Sheeks | 73/229 |
| 3,923,663 A | 12/1975 | Reid | 210/443 |
| 3,938,905 A | 2/1976 | Wadensten | 415/119 |
| 4,101,777 A | 7/1978 | Reid | 250/436 |
| 4,177,532 A | 12/1979 | Azuma | 15/24 |
| 4,246,753 A | 1/1981 | Redmond | 60/398 |
| 4,255,937 A | 3/1981 | Ehrlich | 62/264 |
| 4,272,686 A | 6/1981 | Suzuki | 290/54 |
| 4,276,482 A | 6/1981 | Crockett | 290/52 |
| 4,293,777 A | 10/1981 | Gamell | 290/52 |
| 4,352,025 A | 9/1982 | Troyen | 290/54 |
| 4,392,063 A | 7/1983 | Lindquist | 290/54 |
| 4,393,991 A | 7/1983 | Jeffras et al. | 239/102 |
| 4,467,217 A | 8/1984 | Roussey | 290/54 |
| 4,520,516 A | 6/1985 | Parsons | 4/623 |
| 4,524,285 A | 6/1985 | Rauch | 290/43 |
| 4,564,889 A | 1/1986 | Bolson | 362/192 |
| 4,586,871 A | 5/1986 | Glass | 415/90 |
| 4,613,279 A | 9/1986 | Corren et al. | 415/2 |
| 4,615,799 A | 10/1986 | Mortensen | 210/117 |
| 4,616,298 A | 10/1986 | Bolson | 362/192 |
| 4,636,707 A | 1/1987 | Law | 322/35 |
| 4,676,896 A | 6/1987 | Norton | 210/192 |
| 4,694,224 A | 9/1987 | Nakagawa et al. | 315/177 |
| 4,720,640 A | 1/1988 | Anderson et al. | 290/43 |
| 4,731,545 A | 3/1988 | Lerner et al. | 290/54 |
| 4,737,164 A | 4/1988 | Sarkkinen | 95/68 |
| 4,740,711 A | 4/1988 | Sato et al. | 249/52 |
| 4,746,808 A | 5/1988 | Kaeser | 290/52 |
| 4,752,401 A | 6/1988 | Bodenstein | 210/746 |
| 4,769,131 A | 9/1988 | Noll et al. | 210/85 |
| 4,816,697 A | 3/1989 | Nalbandyan et al. | 290/54 |
| 4,857,204 A | 8/1989 | Joklik | 210/695 |
| 4,868,408 A | 9/1989 | Hesh | 290/43 |
| 4,909,931 A | 3/1990 | Bibi | 210/85 |
| 4,920,465 A | 4/1990 | Sargent | 362/96 |
| 4,923,368 A | 5/1990 | Martin | 415/202 |
| 4,950,130 A | 8/1990 | Erlach | 415/202 |
| 4,960,363 A | 10/1990 | Bergstein | 415/3.1 |
| 4,963,780 A | 10/1990 | Hochstrasser | 310/104 |
| 4,968,437 A | 11/1990 | Noll et al. | 210/748 |
| 4,971,687 A | 11/1990 | Anderson | 210/85 |
| 4,973,408 A | 11/1990 | Keefer | 210/652 |
| 5,035,579 A | 7/1991 | Yada et al. | 416/241 |
| 5,040,945 A | 8/1991 | Levesque | 290/52 |
| 5,043,592 A | 8/1991 | Hochstrasser | 290/52 |
| 5,069,782 A | 12/1991 | Moyher, Jr. et al. | 210/192 |
| 5,100,290 A | 3/1992 | Berger | 415/60 |
| 5,102,296 A | 4/1992 | Kimberlin | 415/186 |
| 5,118,961 A | 6/1992 | Gamell | 290/52 |
| 5,140,254 A | 8/1992 | Katzman | 322/35 |
| 5,230,792 A | 7/1993 | Sauska et al. | 210/97 |
| 5,249,923 A | 10/1993 | Negus | 415/202 |
| 5,263,814 A | 11/1993 | Jang | 415/63 |
| 5,264,747 A | 11/1993 | Kawamura | 310/42 |
| 5,266,215 A | 11/1993 | Engelhard | 210/748 |
| 5,277,542 A | 1/1994 | Nakanishi | 415/75 |
| 5,332,155 A | 7/1994 | Jager | 239/240 |
| 5,344,558 A | 9/1994 | Kool | 210/117 |
| 5,349,985 A | 9/1994 | Fischer | 137/607 |
| 5,425,617 A | 6/1995 | Teran | 415/71 |
| 5,445,729 A | 8/1995 | Monroe et al. | 210/86 |
| 5,468,132 A | 11/1995 | Snell et al. | 418/206 |
| 5,513,539 A | 5/1996 | McLaughlin et al. | 73/865.9 |
| 5,536,395 A | 7/1996 | Kuennen et al. | 210/87 |
| 5,540,848 A | 7/1996 | Engelhard | 210/748 |
| 5,547,590 A | 8/1996 | Szabo | 210/748 |
| 5,644,170 A | 7/1997 | Bynum et al. | 290/43 |
| 5,659,205 A | 8/1997 | Weisser | 290/52 |
| 5,755,553 A | 5/1998 | Laemthongsawad | 415/3.1 |
| 5,780,860 A | 7/1998 | Gadgil et al. | 250/432 |
| 5,793,130 A | 8/1998 | Anderson | 310/50 |
| 5,820,339 A | 10/1998 | Trojahn | 415/202 |
| 5,843,309 A | 12/1998 | Mancil | 210/205 |
| 5,853,572 A | 12/1998 | Kuennen et al. | 210/87 |
| RE36,168 E | 3/1999 | Heide | 310/67 |
| 5,891,329 A | 4/1999 | Massholder | 210/100 |
| 5,927,943 A | 7/1999 | Maier | 415/167 |
| 5,947,678 A | 9/1999 | Bergstein | 415/3.1 |
| 5,948,326 A | 9/1999 | Pate | 261/91 |
| 5,982,059 A | 11/1999 | Anderson | 310/50 |
| 6,011,334 A | 1/2000 | Roland | 310/86 |
| 6,012,474 A | 1/2000 | Takamoto et al. | 137/14 |
| 6,036,333 A | 3/2000 | Spiller | 362/192 |
| 6,040,647 A | 3/2000 | Brown et al. | 310/89 |
| 6,073,445 A | 6/2000 | Johnson | 60/512 |
| 6,080,281 A | 6/2000 | Attia | 240/157 |
| 6,120,691 A | 9/2000 | Mancil | 210/748 |
| 6,139,750 A | 10/2000 | Graham | 210/652 |
| 6,196,793 B1 | 3/2001 | Braaten | 415/191 |
| 6,208,037 B1 | 3/2001 | Mayo, Jr. et al. | 290/54 |
| 6,309,179 B1 | 10/2001 | Holden | 415/202 |
| 6,313,545 B1 | 11/2001 | Finley et al. | 290/54 |
| 6,369,532 B2 | 4/2002 | Koenen et al. | 318/150 |
| 6,375,842 B1 | 4/2002 | Graham | 210/321.74 |
| 6,402,465 B1 | 6/2002 | Maier | 415/159 |
| 6,431,821 B1 | 8/2002 | Feltenberger et al. | 415/3.1 |
| 6,436,299 B1 | 8/2002 | Baarman et al. | 210/748 |
| 6,443,697 B1 | 9/2002 | Rossi et al. | 415/202 |
| 6,447,243 B1 | 9/2002 | Kittle | 415/92 |
| 6,476,513 B1 | 11/2002 | Gueorguiev | 290/55 |
| 6,629,356 B2 | 10/2003 | Wang et al. | 29/596 |
| 6,798,080 B1 | 9/2004 | Baarman et al. | 290/43 |
| 6,885,114 B2 | 4/2005 | Baarman et al. | 290/43 |
| 6,927,501 B2 | 8/2005 | Baarman et al. | 290/43 |
| 7,067,936 B2 | 6/2006 | Baarman et al. | 290/43 |
| 7,119,451 B2 | 10/2006 | Baarman et al. | 290/43 |
| 7,233,078 B2 | 6/2007 | Baarman et al. | 290/43 |
| 7,253,536 B2 | 8/2007 | Fujimoto et al. | 290/43 |
| 7,462,945 B2 * | 12/2008 | Baarman et al. | 290/43 |
| 2002/0041100 A1 | 4/2002 | Yumita et al. | 290/52 |
| 2002/0047374 A1 | 4/2002 | Yumita | 310/81 |
| 2002/0113442 A1 | 8/2002 | Yumita | 290/54 |
| 2002/0122720 A1 | 9/2002 | Esa | 415/159 |
| 2007/0120368 A1 | 5/2007 | Baarman et al. | 290/43 |
| 2007/0140829 A1 | 6/2007 | Maillard De La Morandais | 415/4.1 |

FOREIGN PATENT DOCUMENTS

| | | |
|---|---|---|
| DE | 198 13 544 A1 | 10/1999 |
| DE | 201 05 341 U1 | 9/2002 |
| EP | 1 795 746 A2 | 6/2007 |
| EP | 1 826 182 A1 | 8/2007 |
| GB | 2 225 813 A | 6/1990 |
| GB | 2 376 508 A | 12/2002 |
| JP | 61-76169 | 5/1986 |
| JP | 07-236255 | 9/1995 |
| JP | 2001-020843 | 1/2001 |
| JP | 2001-258290 | 9/2001 |
| JP | 2001334179 | 12/2001 |
| JP | 2002-106456 | 4/2002 |
| WO | WO 01/36876 A1 | 5/2001 |

OTHER PUBLICATIONS

Kim, B.R., et al., "Literature review-efficacy of various disinfectants against Legionella in Water Systems," Water Research, Elsevier Science Publishers, Amsterdam, NL, vol. 36, No. 18, Nov. 2002, pp. 4433-4444, XP004380727.

U.S. Appl. No. 12/506,829, filed Jul. 21, 2009, Baarman et al.

* cited by examiner

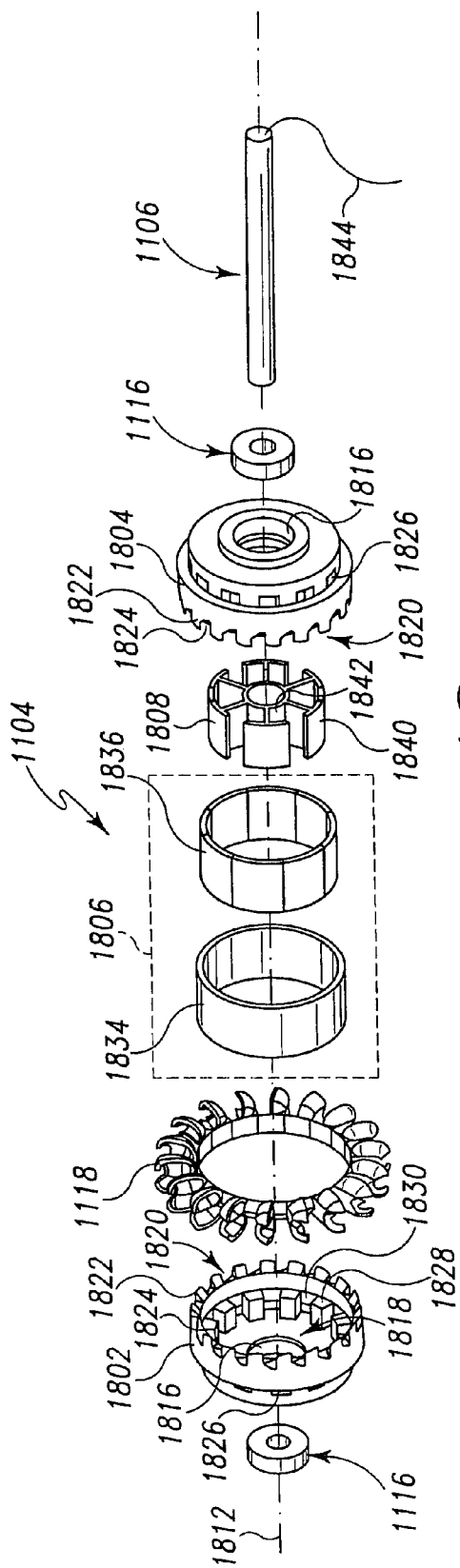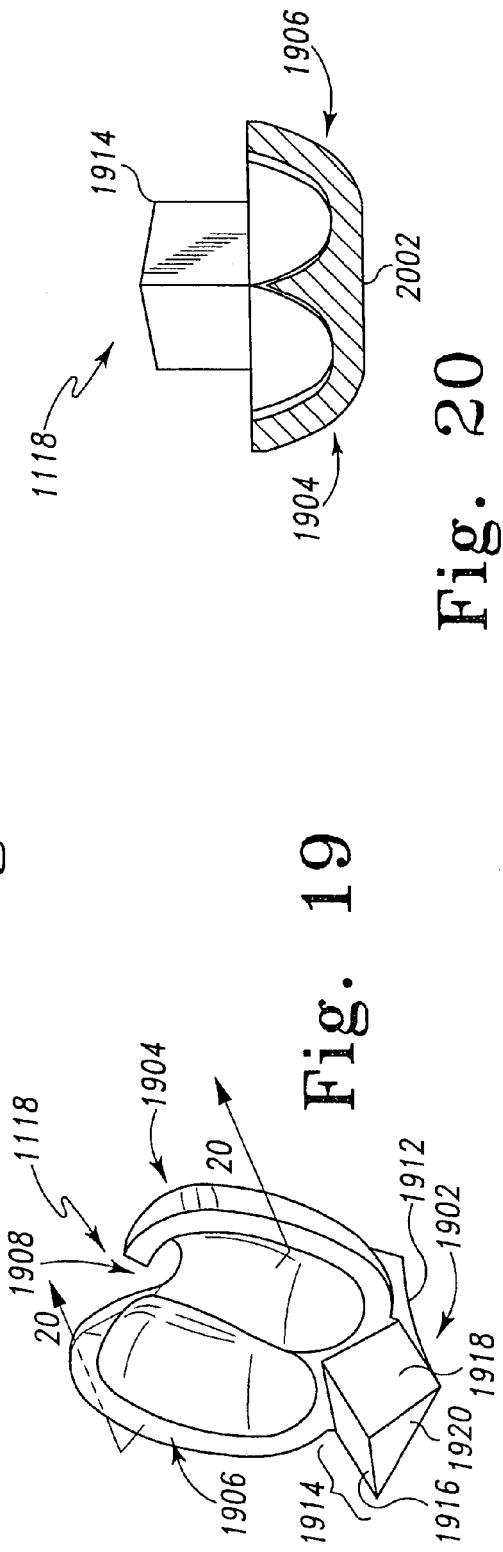
Fig. 18
Fig. 19
Fig. 20

MINIATURE HYDRO-POWER GENTERATION SYSTEM POWER MANAGEMENT

This application is a continuation application of U.S. patent application Ser. No. 11/522,166, filed Sep. 15, 2006 now U.S. Pat. No. 7,605,484, which is a continuation application of Ser. No. 11/110,503 filed Apr. 20, 2005 now U.S. Pat. No. 7,119,451, issued Oct. 10, 2006, which is a divisional application of Ser. No. 10/760,020 filed Jan. 17, 2004 now U.S. Pat. No. 6,927,501, issued Aug. 9, 2005, which is a continuation-in-part application of Ser. No. 10/683,020 filed Oct. 9, 2003 now U.S. Pat. No. 6,885,114, issued Apr. 26, 2005, all of which are herein incorporated by reference.

FIELD OF THE INVENTION

The present invention relates generally to liquid treatment systems and, more particularly, to a miniature liquid treatment system that is self-powered with a miniature hydro-power generation system included in the liquid treatment system.

BACKGROUND OF THE INVENTION

Hydro-electric power generation in which kinetic energy is extracted from flowing pressurized water and used to rotate a generator to produce electric power is known. In addition, use of other pressurized fluids such as gas, steam, etc, to rotate a generator is known. With large hydro-electric power generation operated with a large-scale water source such as a river or dam, thousands of megawatts of power may be generated using millions of gallons of flowing water. As such, conversion of the kinetic energy in the flowing water to electric power may include significant inefficiencies and yet still provide an economical and acceptable level of performance.

As the size of the hydro-electric power generation equipment becomes smaller, the magnitude of electric power produced also becomes smaller. In addition, the amount of flowing water from which kinetic energy may be extracted becomes less. Thus, efficiency of the conversion of the kinetic energy in the flow of water to electric power becomes significant. When there are too many inefficiencies, only small amounts of kinetic energy is extracted from the pressurized flowing water. As a result, the amount of electric power produced diminishes as the size of the hydro-electric power generation equipment becomes smaller.

There are many small scale systems that include flowing pressurized liquid and require electric power to operate. Some examples include residential water treatment systems, automatic plumbing fixtures, flow rate monitors, water testing equipment, etc.

There are several different types of water treatment systems that include a carbon-based filter unit and an ultraviolet (UV) light unit to filter and decontaminate the water before being dispensed for consumption. The carbon-based filter unit uses inert material to filter out particulate and organic contaminants. Ultraviolet radiation that is emitted from the ultraviolet light unit is used to neutralize harmful microorganisms present in the water.

In order to energize the ultraviolet light unit and any other electric power consuming systems that may be in the water treatment system, a power source is required. Conventional water treatment systems use power from a standard electrical outlet or a battery power source to provide the energy necessary to drive all of the components in the water treatment system, including the ultraviolet light unit. In the case of water treatment systems powered by electrical outlets, the system has limited portability and ceases to operate when there is an interruption in the electrical outlet power supply.

Water treatment systems operated from battery power sources contain only a finite supply of energy that is depleted through operation or storage of the water treatment system. In addition, replacement batteries must be readily available to keep the water treatment system operable. If a longer-term battery power source is desired, larger batteries are required that can add considerable weight and size to the water treatment system.

Some existing water treatment systems are capable of using either the standard electrical outlets or the battery power sources where the battery power source can be replenished by the electrical outlet power source. Although these water treatment systems do not require replacement batteries, the capacity and size of the batteries dictate the length of operation of the water treatment system while operating on the battery source. An electrical outlet source must also be utilized on a regular basis to replenish the batteries. In addition, these water treatment systems require additional electrical circuits and components to operate from the two different power sources.

Automatic plumbing fixtures, such as toilet valves and sink faucets may include an electrically operated valve and a sensor. The sensor may sense the presence of a user of the automatic plumbing fixture and operate the electrically operated valve to provide a flow of water in response. Both the electrically operated valve and the sensor require electric power to operate. The power may be obtained by installing an electric cable from a power distribution panel to the automatic plumbing fixture. Where the automatic plumbing fixture is installed in an existing building, installation of a power distribution panel and/or an electric cable can be costly, time consuming and difficult.

For the foregoing reasons, a need exists for miniature hydroelectric generation equipment that is small enough to fit within a system such as a water treatment system, an automatic plumbing fixture, etc. and is capable of operating with enough efficiency to produce sufficient power to operate the system.

SUMMARY OF THE INVENTION

The present invention discloses a miniature liquid treatment system that overcomes problems associated with the prior art. The embodiments of the miniature liquid treatment system may be self-powered by a hydro-power generation system. The liquid treatment system includes a filter, an ultraviolet dosing system and a hydro-generator. The liquid treatment system may be disposed in a housing configured to be mounted at the end of a faucet. The housing may include a first flow path for providing treated liquid and a second flow for providing untreated liquid. The first and second flow paths may be independent flow paths that are selectable by a user of the liquid treatment system using a switching mechanism. The switch mechanism may be coupled to the housing and may be detachably coupled with the end of the faucet.

The liquid treatment system also includes a processor. The processor may be powered by the hydro-generator, or by an energy storage device, such as a battery or a capacitor, that may be recharged by the hydro-generator. In addition, an ultraviolet (UV) light source included in the ultraviolet dosing system may be powered by the hydro-generator, and/or by an energy storage device, such as a battery or a capacitor, that may be recharged by the hydro-generator. The liquid treatment system may also include a UV switch. The UV switch may be controlled by the processor to selectively supply power generated by the hydro-generator to the UV light source. The processor may also monitor the liquid treatment system and provide data storage, alarms and indications related to operation of liquid treatment system.

A user may select treated or untreated liquid and supply a flow of liquid to the liquid treatment system. The flow of liquid may be sprayed in an extruded stream to induce rotation of the hydro-generator. Electric power may be produced by rotation of the hydro-generator. The electric power may energize the processor to begin monitoring the electric power generated by the hydro-generator. Based on the AC electric power, the processor may determine the revolutions-per-minute of the hydro-generator. When the rotational speed of the hydro-generator enters a determined range, the processor may enable the UV switch to provide power generated by the hydro-generator to the UV light source. Following energization, the UV light source may provide UV energy to disinfect the liquid flowing through the first flow path. Alternatively, an energy storage device may be used to energize the UV light source upon initial rotation of the hydro-generator. When the rotational speed of the hydro-generator ramps up to a determined range, the processor may enable the UV switch to provide power generated by the hydro-generator to the UV light source and/or to recharge the energy storage device.

The housing may include a generally cylindrical portion and a generally spherical portion. The filter and the UV dosing system may be disposed in the cylindrical portion, and the hydro-power generation system may be disposed in the spherical portion. The housing may also be configured in a plurality of compartments. A first compartment may include the filter and be subject to liquid communication with liquid flowing along the first flow path. A second compartment may include the UV dosing system and may remain substantially dry. A third compartment that is a power generation module may independently be in liquid communication with a flow of liquid along the first flow path and with a flow of liquid along the second flow path. The power generation module comprises the hydro-power generation system that includes the hydro-generator and a nozzle in the first flow path.

The flow of liquid along the first flow path may be channeled between the filter, the UV dosing system and the hydro-generator by a manifold disposed in the housing. The manifold may be constructed from a single piece of material to include a plurality of passageways. A first passageway formed in the manifold may channel the flow of liquid to the filter. A second passageway may channel the flow of liquid that has been filtered by the filter to the UV dosing system. The manifold may also include a nozzle keeper configured to engage a nozzle that may be mounted on the manifold. The flow of liquid that has been exposed to UV energy may be channeled to the nozzle by the UV dosing system. The nozzle may extrude the flow of liquid as a stream at relatively high velocity. The extruded stream may contact and induce rotation of the hydro-generator.

These and other features and advantages of the invention will become apparent upon consideration of the following detailed description of the presently preferred embodiments, viewed in conjunction with the appended drawings. The foregoing discussion has been provided only by way of introduction. Nothing in this section should be taken as a limitation on the following claims, which define the scope of the invention.

BRIEF DESCRIPTION OF THE DRAWINGS

FIG. 18 represents an exploded perspective view of an inner housing included in the hydro-power generation system illustrated in FIG. 11.

FIG. 19 represents a perspective view of a paddle included in the hydro-power generation system illustrated in FIG. 11.

FIG. 20 represents a cross-sectional view of the paddle illustrated in FIG. 19 taken along line 20-20.

DETAILED DESCRIPTION

Examples of the invention are set forth below with reference to specific configurations, and those skilled in the art would recognize various changes and modifications could be made to the specific configurations while remaining within the scope of the claims. The illustrated embodiments may be used with any system that requires a power supply and includes a water flow; however, the embodiments are designed for plumbing fixtures, systems such as a water treatment system for residential or portable use, etc. Those skilled in the art would also recognize that the embodiments could be used with liquids other than water and use of the term "water" and "hydro" should not be construed as a limitation.

Figure 1:
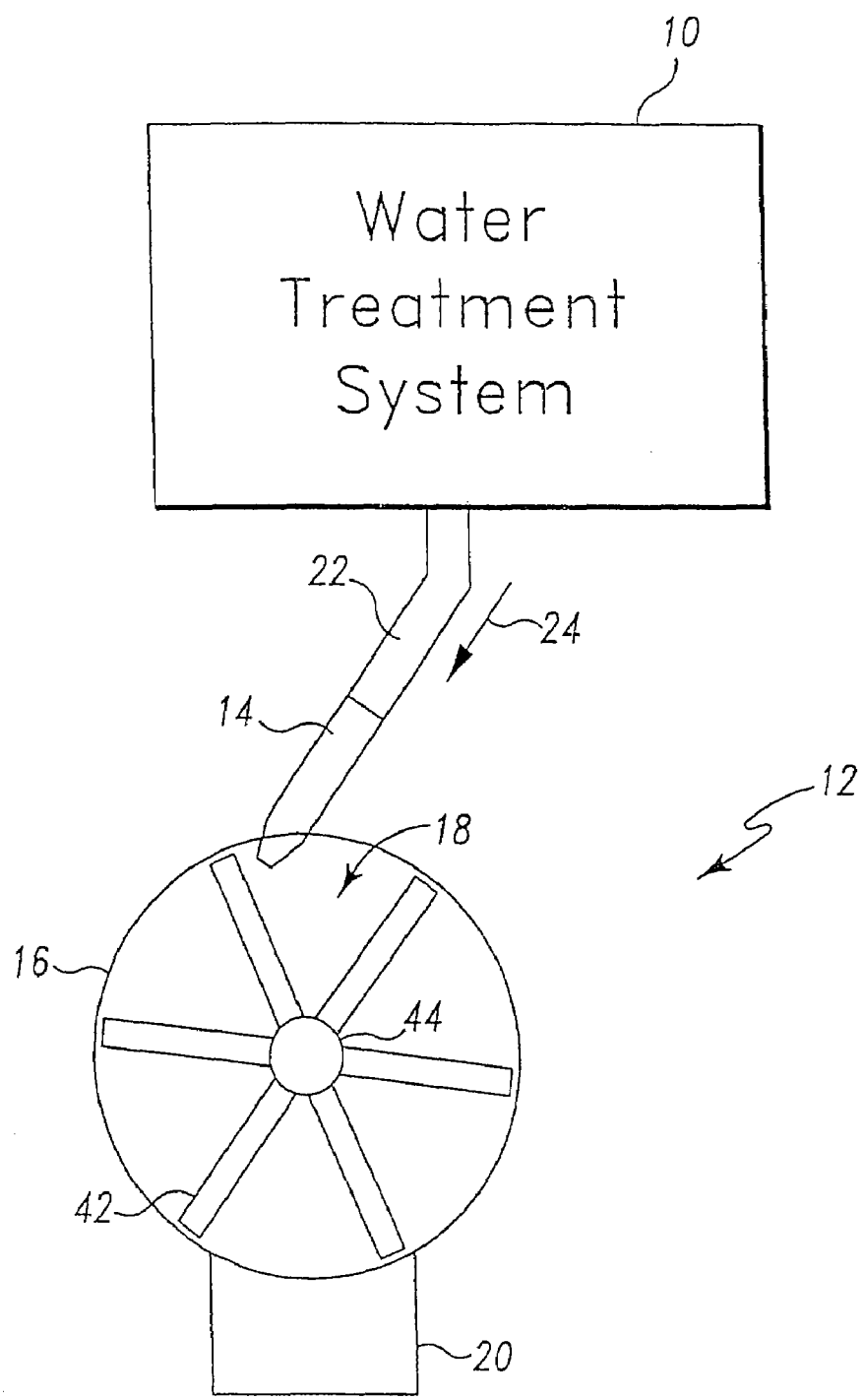
FIG. 1 illustrates a water treatment system coupled to one embodiment of the hydro-power generation system.

FIG. 1 is a side view of a water treatment system 10 connected with a hydro-power generation system 12. In this embodiment, the hydro-power generation system 12 includes a nozzle 14, a housing 16, an impeller 18 and a housing outlet 20. The nozzle 14 is coupled with the water treatment system 10 by a conduit 22. The conduit 22 may be formed of PVC plastic or similar material and may be coupled to the nozzle 14 by threaded connection, friction fit or some other similar connection mechanism.

During operation, pressurized water flows from the water treatment system 10 into the hydro-power generation system 12 via the nozzle 14 as illustrated by arrow 24. The nozzle 14 is coupled with the housing 16 such that water flows through the nozzle 14 and is forced through the housing 16 to the housing outlet 20. In alternative embodiments, the hydro-power generation system 12 may be positioned within the water treatment system 10 or positioned to receive a supply of pressurized water before the water enters the water treatment system 10

Figure 2:
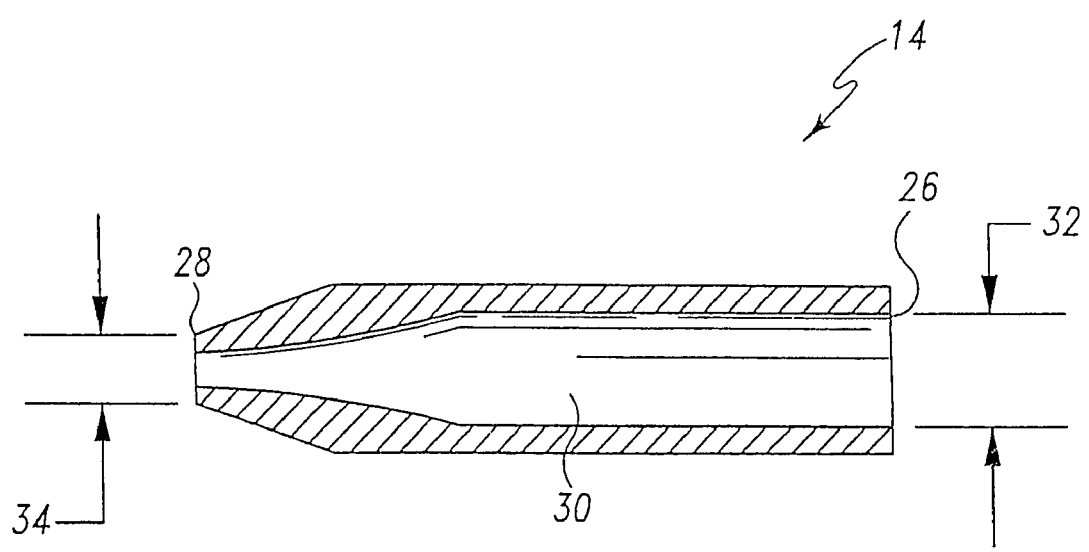
FIG. 2 illustrates a cross section of one embodiment of the nozzle illustrated in FIG. 1.

FIG. 2 illustrates a cross section of one embodiment of the nozzle 14. The nozzle 14 is a sonic nozzle that increases the velocity of pressurized water flowing therethrough. In this embodiment, the nozzle 14 is capable of increasing the velocity of the water to sub-sonic speed. The nozzle 14 is formed of stainless steel or some other similar rigid material and includes a nozzle inlet 26 and a nozzle outlet 28. The nozzle inlet 26 is coupled to the water treatment system 10 as previously discussed. The nozzle outlet 28 is coupled to the housing 16 by friction fit, snap-fit, threaded connection or some other similar coupling mechanism capable of forming a watertight connection therebetween. The nozzle 14 may penetrate the housing 16 in any location that provides proper alignment of the nozzle 14 with the impeller 18 as will be hereinafter discussed.

The nozzle 14 includes a passageway 30 that provides for the flow of water therethrough. The passageway 30 is formed to be a first predetermined diameter 32 at the nozzle inlet 26 and a second predetermined diameter 34 at the nozzle outlet 28. In this embodiment, the second predetermined diameter 34 is about twenty-six percent of the first predetermined diameter 32. The passageway 30 remains the first predetermined diameter 32 for a predetermined length of the nozzle 14. The remaining portion of the passageway 30 is conically shaped by uniformly tapering the passageway 30 to the second predetermined diameter 34. In this embodiment, the passageway 30 of the nozzle 14 tapers at an angle of approximately 18 degrees between the first predetermined diameter 32 and the second predetermined diameter 34.

The configuration of the passageway 30 determines the velocity of the water exiting from the nozzle 14. In addition, the velocity of the water at the nozzle outlet 28 is dependent on the pressure of the water source and the back pressure downstream of the nozzle 14. A desirable predetermined range of the velocity at the nozzle outlet 28 may be determined using an expected range of pressure provided by the water treatment system 10 (illustrated in FIG. 1) at the nozzle inlet 26. For example, in a household water system, the pressure of the water supply is in a range of about twenty to sixty pounds-per-square-inch (PSI). The passageway 30 also provides a continuous and uniform stream of water at the nozzle outlet 28. During operation water flowing through the nozzle 14 flows into the housing 16 within a predetermined range of velocities and with a predetermined trajectory.

Referring back to FIG. 1, the housing 16 forms a conduit that may be composed of plastic or some other similar waterproof material capable of forming a rigid passageway for water. In this embodiment, the housing 16 includes a translucent portion as illustrated in FIG. 1 to allow viewing of the interior of the housing 16. The housing 16 is formed to encompass the impeller 18 that is in fluid communication with water as the water flows through the housing 16 after exiting the nozzle outlet 28.

The impeller 18 includes a plurality of blades 42 that are rigidly fastened to a hub 44. The blades 42 are positioned in the housing 16 such that water flowing from the nozzle 14 impinges upon the blades 42 of the impeller 18 at a predetermined angle. The predetermined angle is determined based on the expected pressure of the water at the nozzle inlet 26, the back pressure at the nozzle outlet 28 and the desired revolutions-per-minute (RPM) of the impeller 18. During operation, the flowing water acts on the impeller 18 causing it to rotate in a single direction within the housing 16. As discussed in detail below, as the impeller 18 rotates, this embodiment of the hydro-power generation system 12 converts the energy in the flowing water to rotational energy, which is then converted to electricity. In this embodiment, the impeller 18 is submerged in the water flowing through the housing 16.

Figure 3:
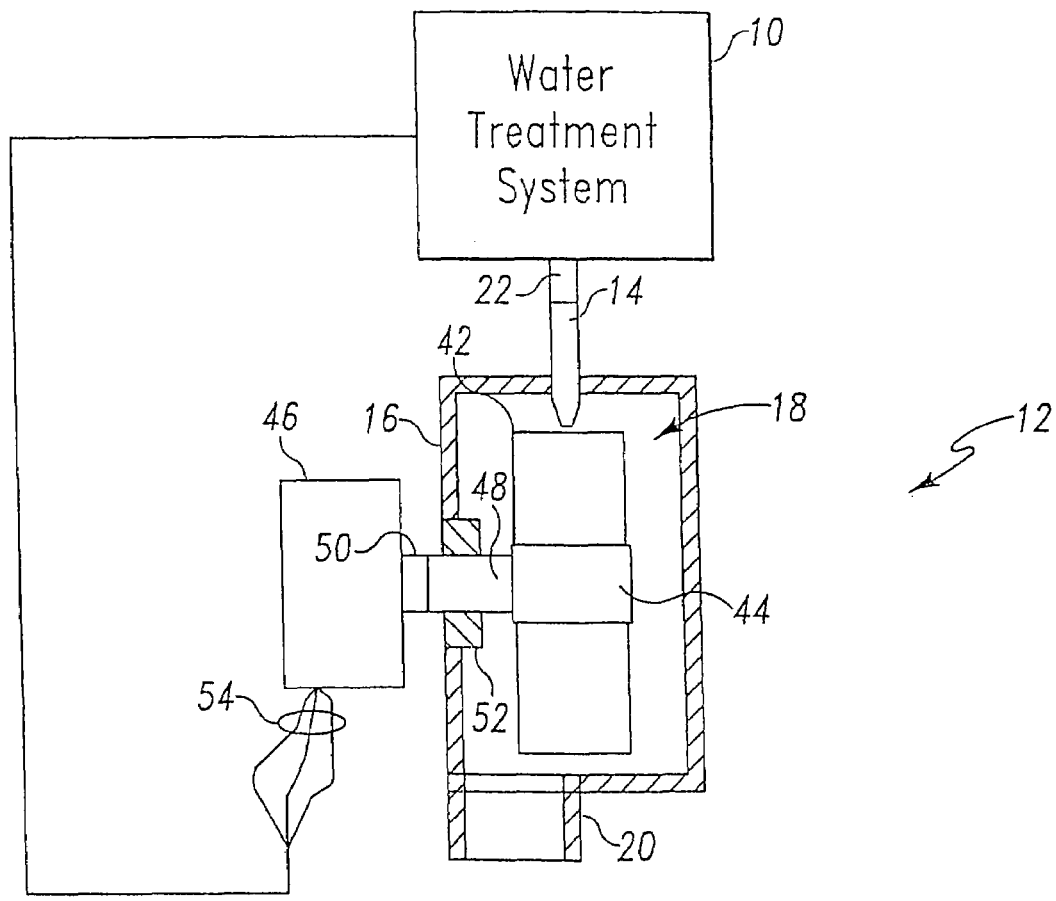
FIG. 3 illustrates the water treatment system and the hydro-power generation system illustrated in FIG. 1 rotated 90 degrees with a portion of the hydro-power generation system sectioned away.

FIG. 3 illustrates the embodiment depicted in FIG. 1 rotated 90 degrees with a portion of the housing 16 sectioned away. As illustrated, the impeller 18 is coaxially fastened to a generator 46 by a longitudinal extending shaft 48. The shaft 48 may be stainless steel or some other similar rigid material that is fixedly coupled with the impeller 18. The hub 44 of the impeller 18 is coaxially coupled to one end of the shaft 48 and a generator shaft 50, which is part of the generator 46, is coaxially coupled to the other end. The rigid coupling of the shaft 48 to the impeller 18 and the generator 46 may be by welding, press-fit or other similar rigid connection.

The rotatable shaft 48 longitudinally extends to penetrate the housing 16 through a watertight seal 52 made of rubber or other similar material. The watertight seal 52 is coupled to the housing 16 and is formed to allow the shaft 48 to rotate freely without the escape of water from within the housing 16. The shaft 48 longitudinally extends to the generator 46 that is positioned adjacent the housing 16. Although not illustrated, the outer surface of the generator 46 may be coupled to the housing 16 by, for example, nuts and bolts, rivets or other similar mechanism capable of fixedly coupling the housing 16 and generator 46.

During operation, as water flows through the housing 16 and the impeller 18 rotates, shafts 48, 50 correspondingly rotate, causing electricity to be produced from the generator 46. In an alternative embodiment, a magnetic coupler (not shown) is used in place of the shaft 48 to eliminate the need for penetration of the housing 16. In this embodiment, the impeller 18 includes magnets with sufficient magnetic strength to rigidly couple with similar magnets positioned on the generator shaft 50 outside the housing 16. During operation, when the impeller 18 rotates, the magnetic attraction of the magnets oriented on the impeller and the magnets oriented on the generator shaft 50 cause rotation of the generator shaft 50 thereby generating electricity from the generator 46.

In this embodiment, the generator 46 may be a permanent magnet generator capable of generating alternating current (AC). The alternating current (AC) may be rectified to produce direct current (DC). In an alternative embodiment, the generator 46 may be capable of generating both AC and DC current. The electricity is transferred from the generator 46 by a plurality of conductors 54 that may be wires, busses or other similar materials capable of conducting electricity. The voltage level of the electricity produced is a function of the revolutions-per-minute of the impeller 18. As previously discussed, the velocity of the water flowing from the nozzle 14 may be designed within a predetermined range thereby controlling the voltage output of the electricity generated by the generator 46.

The alternating current or rectified direct current produced by this embodiment may be used to power the water treatment system 10 and may also be used to charge an energy storage device (not shown) such as, for example, a battery or capacitors. The rotation of the impeller 18 or the duration of the electricity being produced may also provide a mechanism for flow-based measurements such as, flow rates or the quantity of water that has flowed through the water treatment system 10. The rotation of the impeller 18 or the duration of the electricity being produced may be combined with the back electromagnetic force (EMF) of the generator 46 to provide the flow-based measurements. Those skilled in the art would recognize that the hydro-power generation system 12 may also be used in other systems besides the water treatment system 10.

Figure 4:
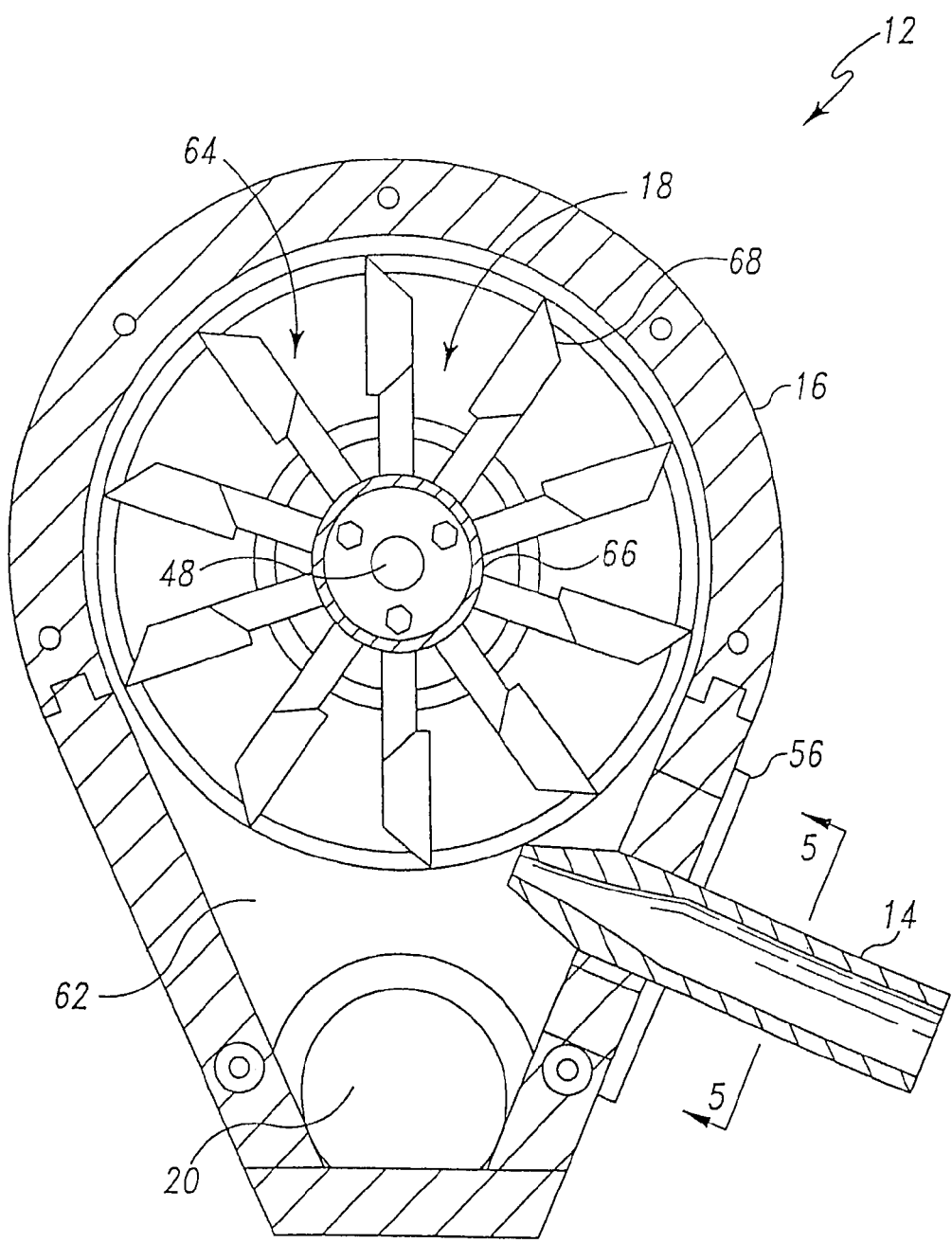
FIG. 4 illustrates a cross-section of another embodiment of the hydro-power generation system.

FIG. 4 illustrates a cross sectional view of another embodiment of the hydro-power generation system 12. This embodiment is similarly coupled to the water treatment system 10 as in the embodiment illustrated in FIG. 1 and includes a nozzle 14, a housing 16, an impeller 18 and a housing outlet 20. Similar to the previously discussed embodiment, the nozzle 14 provides water at high velocity that is directed at the rotatable impeller 18. However, in this embodiment, the impeller 18 is not submerged in water within the housing 16 during operation. As such, the water from the nozzle 14 forms a stream that is directed at the impeller 18.

The nozzle 14 may be a sonic nozzle similar to the previously discussed nozzle 14 illustrated in FIG. 2. The nozzle 14 penetrates the housing 16 and is coupled thereto by a mounting plate 56. The mounting plate 56 is positioned adjacently contacting the outer surface of the housing 16. Those skilled in the art would recognize that other methods exist that could be used to couple the nozzle 14 with the housing 16.

Figure 5:
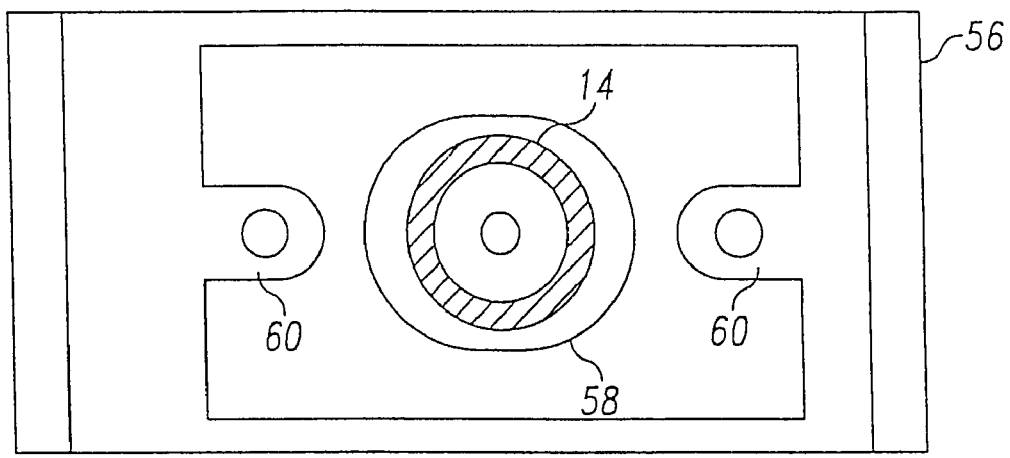
FIG. 5 illustrates a cross-section of the nozzle illustrated in FIG. 4 taken along line 5-5.

FIG. 5 illustrates a cross sectional view of the nozzle 14 mounted in the mounting plate 56 of this embodiment. The mounting plate 56 includes a longitudinal slot 58 and a pair of ears 60 that allow adjustment of the nozzle 14 to an optimal position in relation to the impeller 18. In this embodiment, the nozzle 14 may be fixedly mounted to the housing 16 when the optimal position is achieved by inserting threaded screws in the ears 60. In alternative embodiments, the mounting plate 56 provides a single predetermined desired position of the nozzle 14 when the fasteners such as, for example, threaded screws, rivets or pins fixedly mount the mounting plate 56 on the housing 16.

Referring again to FIG. 4, the desired position of the nozzle 14 is such that the nozzle 14 longitudinally extends into the housing 16. The housing 16 of this embodiment includes a housing cavity 62 that is defined by the inner walls of the housing 16 as illustrated in FIG. 4. The housing cavity 62 is an air space that includes the impeller 18 positioned therein. During operation, water is discharged from the nozzle 14 into the housing cavity 62 with a predetermined trajectory to strike the impeller 18 at a predetermined angle. The predetermined angle is based on the desired RPM of the impeller 18 and the range of the pressure of water supplied to the nozzle 14 from the water treatment system 10. The cooperative operation of the nozzle 14 and the impeller 18 are not limited to operation with pressurized water and other fluids such as, for example, air could similarly be utilized.

As further illustrated in FIG. 4, the impeller 18 includes a plurality of blades 64. Each of the blades 64 of this embodiment are fixedly coupled to an impeller hub 66 at one end and include a paddle 68 formed at the opposite end. The impeller hub 66 is fixedly coupled to a shaft 48 as in the previously discussed embodiments. Those skilled in the art would recognize that the quantity of the blades 64 and the size of the impeller 18 could vary depending on the application.

Figure 6:
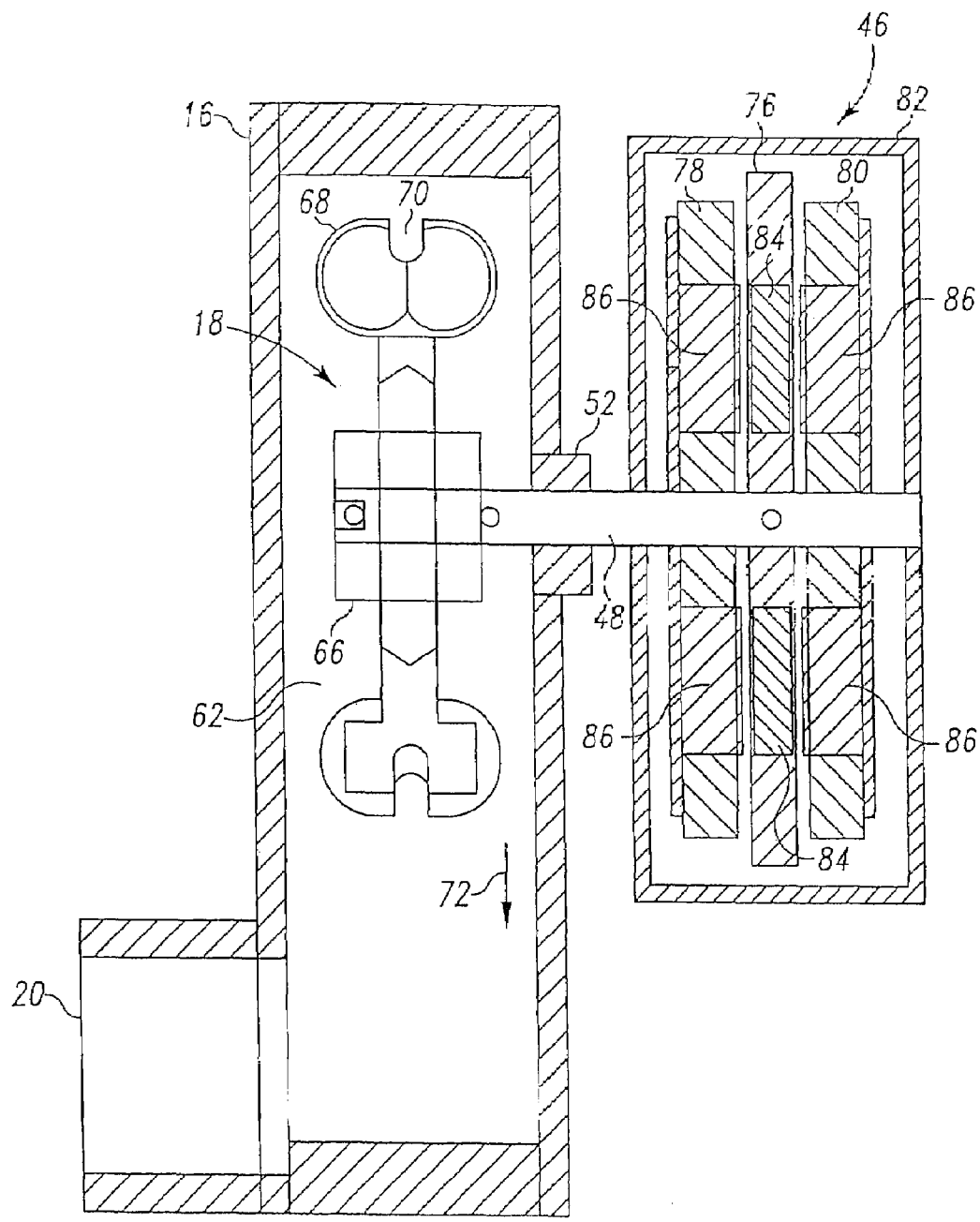
FIG. 6 illustrates the hydro-power generation system illustrated in FIG. 4 rotated 90 degrees with a portion of the hydro-power generation system sectioned away.

FIG. 6 illustrates the embodiment hydro-power generation system 12 illustrated in FIG. 5 rotated 90 degrees with a portion of the housing 16 sectioned away for illustrative purposes. As illustrated, the hydro-power generation system 12 includes the housing 16 coupled to the generator 46 with the shaft 48 as in the previously discussed embodiments. In addition, the shaft 48, which is rotatable, longitudinally extends from the impeller 18 into the generator 46 through the watertight seal 52. In an alternative embodiment, the shaft 48 could be modified with a magnetic coupler, as previously described, thereby eliminating the penetration of the housing 16 and the watertight seal 52. As illustrated, the shaft 48 rotatably positions the impeller 18 in the airspace within the housing cavity 62 with the paddles 68 thereby rotating about the shaft 48.

As illustrated in FIG. 6, each of the paddles 68 of this embodiment are formed in a parabolic shape that includes a slot 70. The parabolic shape of the paddles 68 provide a uniform receiver of the energy present in the water discharged from the nozzle 14 (illustrated in FIG. 5). The slots 70 allow the energy of the discharged water to pass to the next paddle 68 as the impeller 18 rotates. The transitional passing of the energy in the discharged water to the next paddle 68 maximizes the efficiency of the energy transfer from the water to the impeller 18. In alternative embodiments, the blades 64 could be formed in other shapes and configurations that are conducive to the efficient transfer of energy from other fluids discharged from the nozzle 14. For example, when the fluid is air, the blades 64 may be formed as vanes, fins or other similar structure capable of translating the energy from the flowing air to the rotation of the impeller 18.

During operation, after the stream of water strikes the impeller 18 at a predetermined angle, the water falls by gravity as indicated by arrow 72 toward the housing outlet 20. As such, the water collects at the housing outlet 20 and is thereby channeled out of the housing 16. Since the impeller 18 is not submerged in water, the bulk of the energy transferred from the water stream to the impeller 18 is provided as rotational force to the shaft 48.

The rotation of the shaft 48 causes rotation of a portion of the generator 46. One embodiment of the generator 46 includes a rotor 76, a first stator 78, and a second stator 80 positioned within a generator housing 82. The rotor 76 is fixedly coupled to the shaft 48 and rotates therewith. The first and second stators 78, 80 are fixedly coupled to the generator housing 82 and circumferentially surround the shaft 48. The rotor 76 is positioned between the first and second stators 78, 80 to form the generator 46.

The rotor 76 of this embodiment may be in the form of a disk that includes a plurality of permanent magnets 84. The permanent magnets 84 are uniformly place in predetermined positions within the rotor 76 to operatively cooperate with the first and second stators 78, 80. Each of the first and second stators 78, 80 in this embodiment may also form disks that include a plurality of coils 86. The coils 86 are positioned uniformly within the first and second stators 78, 80 to operatively cooperate with the permanent magnets 84. The coils 86 may be electrically connected to form one or more windings that are operable to generate electricity. The number of poles and the design of the first and second stators 78, 80 are dependent on a number of factors. The factors include: the strength of the gaussian field formed by the permanent magnets 84 and the back EMF, as well as the desired RPM and the desired power output of the generator 46.

In this embodiment, the rotation of the rotor 76 causes magnetic flux that is generated by the permanent magnets 84 to similarly rotate thereby producing electricity in the first and second stators 78, 80. The rotor 76 and the first and second stators 78, 80 operatively cooperate to generate alternating current (AC). The AC may be rectified and stabilized by the generator 46 to supply both AC and direct current (DC). In an alternative embodiment, the permanent magnets 84 may be positioned on the first and second stators 78, 80 such that the generator 46 is operable to generate direct current (DC). In another alternative embodiment, the generator 46 is similar to the generator 46 discussed with reference to FIG. 3.

During operation, pressurized water may be supplied from the water treatment system 10 (illustrated in FIG. 1) to the hydro-power generation system 12. As in the previous embodiments, alternative embodiments of the hydro-power generation system 12 may supply water to the water treatment system 10 or be positioned within the water treatment system 10. In this embodiment, water is supplied from the water treatment system 10 to the nozzle 14 as previously discussed.

Pressurized water flows through the nozzle 14 and discharges with high velocity into the housing cavity 62 thereby striking the paddles 68 on the impeller 18 at a predetermined angle of incidence. When the water strikes the paddles 68, the energy in the discharged water is translated to the impeller 18 causing rotation in a single direction. As the impeller 18 rotates, a portion of the discharged water stream also streams through the slots 70 and strikes another of the paddles 68 on the impeller 18. Following the collision of the water with the paddles 68 and the accompanying transfer of energy, the water falls by gravity to the housing outlet 20 and flows out of the housing 16. Accordingly, the housing cavity 62 remains an air space during operation and is not completely filled with water during operation.

The rotation of the impeller 18 causes rotation of the shaft 48 thereby rotating the rotor 76 of the generator 46. In this embodiment, the rotor 76 rotates at about 2400 revolutions-per-minute (RPM). Rotation of the rotor 76 induces the generation of electricity that is supplied to the water treatment system 10. As previously discussed, the range of the voltage level produced by the generator 46 is based on the range of velocity of the water flowing through the nozzle 14. Accordingly, the voltage range of the generator can be selected by selecting a predetermined range of velocity for the flowing water through the nozzle 14

Figure 7:
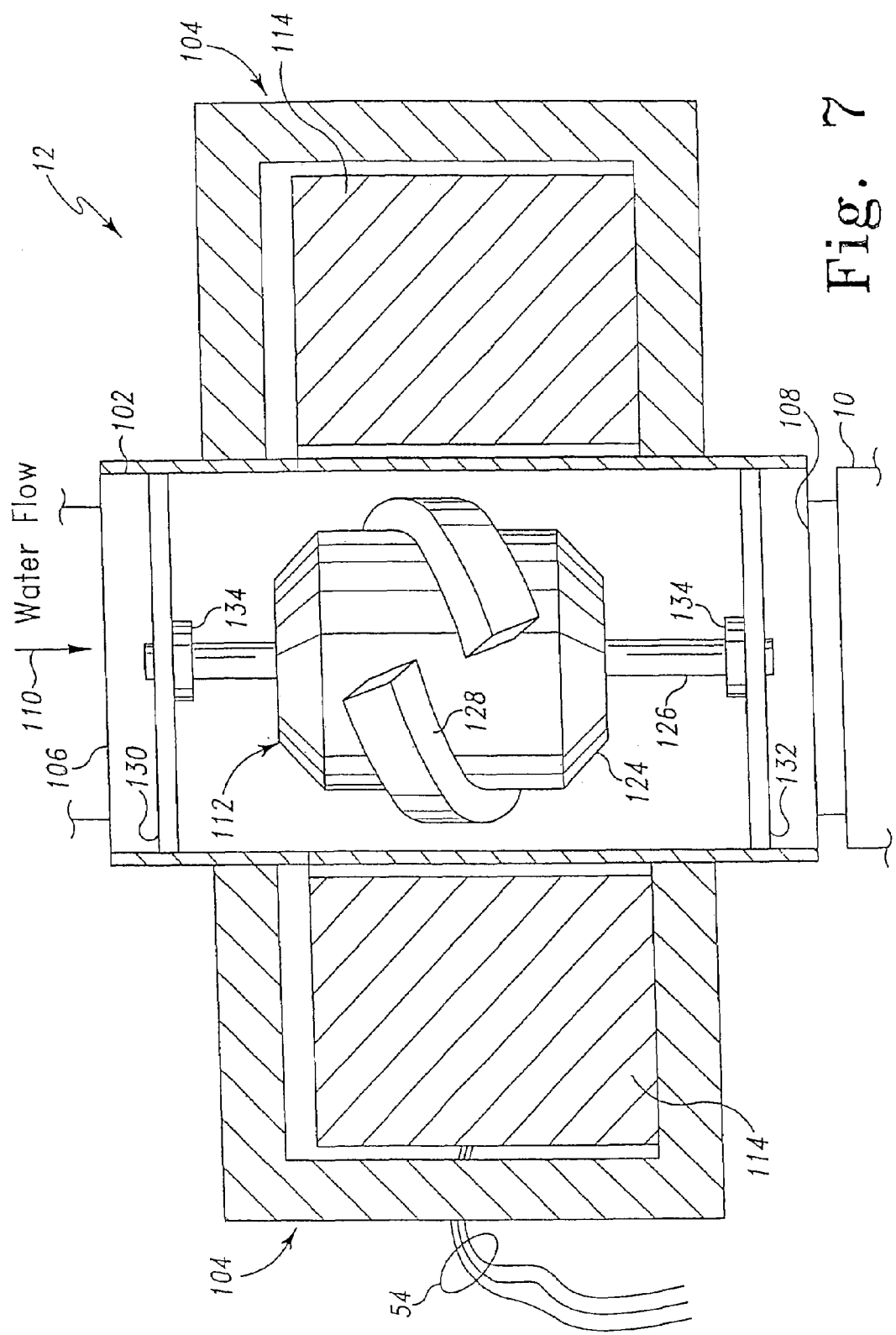
FIG. 7 represents a cross-sectional view of another embodiment of the hydro-power generation system coupled to the water treatment system.

FIG. 7 illustrates a cross-sectional view of another embodiment of the hydro-power generation system 12 which is preferentially coupled with the water treatment system 10. As illustrated, the hydro-power generation system 12 includes a rotor housing 102 and a stator housing 104. The rotor housing 102 forms a conduit that may be composed of plastic or other similar rigid material and includes an inlet 106 and an outlet 108. During operation the inlet 106 receives the flowing water as illustrated by arrow 110 and the outlet 108 channels the flowing water to the water treatment system 10. In alternative embodiments, the hydro-power generation system 12 may be positioned within the water treatment system 10 or positioned to receive water flowing out of the water treatment system 10. As previously discussed, the flow of water through the hydro-power generation system 12 may be controlled by the water treatment system 10.

As illustrated in FIG. 7, the rotor housing 102 contains a rotor 112 and the stator housing 104 contains a stator 114. The rotor 112 of this embodiment may be a twelve-pole permanent magnet rotor having six north/south pole combinations. As set forth in detail below, the stator 114 of this embodiment may be an annular ring designed with eight north/south pole combinations. The rotor 112 and the stator 114 cooperatively operate to produce electricity during operation. As known in the art, a stator contains a stationary winding that can be configured to contain any number of poles depending on the magnitude of the voltage needed at the output. The number of poles in the winding disclosed in the present embodiment should not be construed as a limitation on the present invention.

Figure 8:
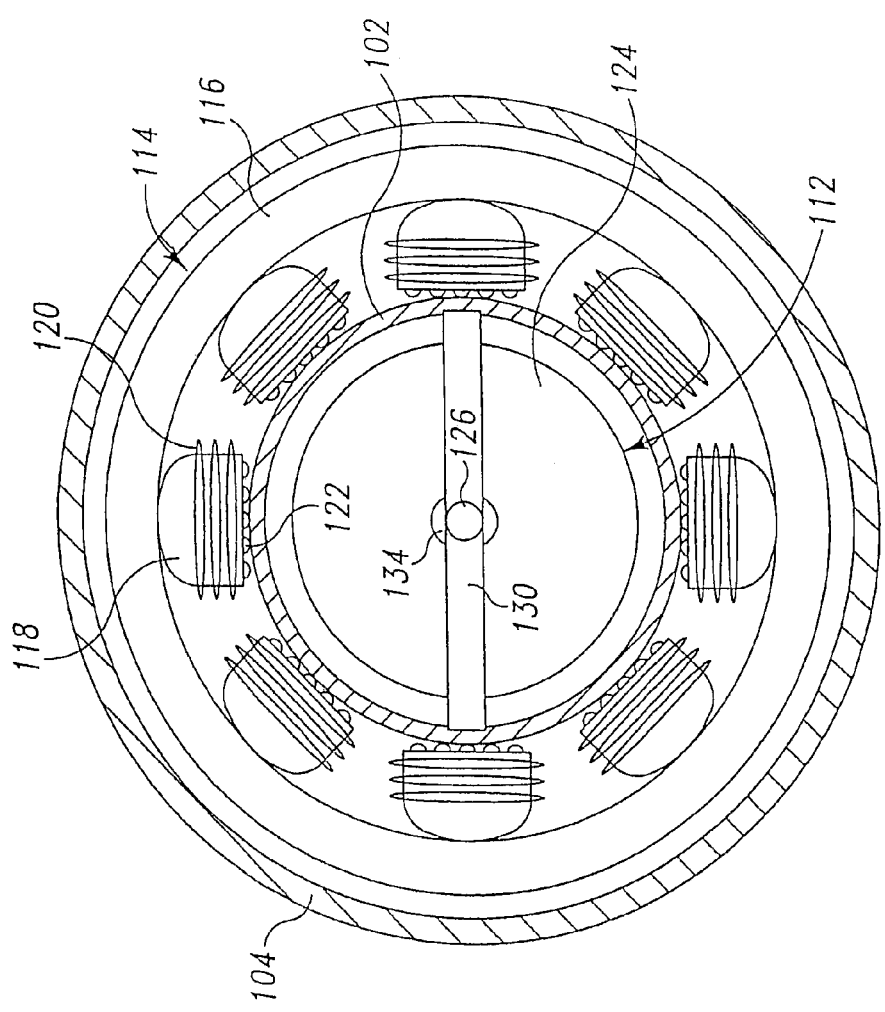
FIG. 8 represents a top view of the embodiment of the hydro-power generation system illustrated in FIG. 7 with a portion of the stator housing sectioned away.

FIG. 8 illustrates a top view of the embodiment depicted in FIG. 7 with the top portion of the stator housing 104 sectioned away for illustrative purposes. The stator 114 is fixedly positioned in the stator housing 104 to circumferentially surround the rotor housing 102. The stator 114 includes a core 116, a plurality of salient poles 118 and a plurality of coils 120. The core 116 may be composed of iron, steel or other similar material and is formed to include the salient poles 118. In this embodiment, there may be eight salient poles 118 that are each surrounded by coils 120.

The salient poles 118 are formed on the stator 114 such that they circumferentially surround the rotor housing 102. Each of the salient poles 118 includes a formed end that is known in the art as a pole shoe 122. The pole shoes 122 are located adjacent the rotor housing 102. The pole shoes 122 conduct a constant magnetic flux formed by the rotor 112 through the coils 120. The coils 120 may be wire or some other similar material capable of conducting electricity and being wrapped around the salient poles 118. Although not illustrated, the coils 120 are electrically connected to form the winding. As known in the art, the number of turns of wire used for each coil 120 is determined by the voltage and power requirements, the minimum and maximum revolutions of the rotor 112, the maximum allowable back-pressure, the required inductance and the magnetic gauss.

Referring again to FIG. 7, the stator 114 is transversely positioned perpendicular to the central axis of the rotor housing 102. Since the stator 114 is positioned outside the rotor housing 102, it is isolated from fluid communication with the water flowing within the rotor housing 102. The stator housing 104 is fixedly coupled to the rotor housing 102 thereby providing a predetermined position on the rotor housing 102 for the stator 114. In this embodiment, the stator housing 104 is coupled with the external surface of the rotor housing 102 by a friction fit. Those skilled in the art would recognize that various other ways of coupling the rotor housing 102 and the stator housing 104 exist.

In this embodiment of the hydro-power generation system 12, the rotor 112 includes a permanent magnet 124 that can be formed of metal, sintered metal, extruded metal, plastic injected or ceramic material. The permanent magnet 124 forms a constant magnetic flux and is coupled with a rotor shaft 126. The rotor shaft 126, which is rotatable, longitudinally extends from opposite ends of the permanent magnet 124 and may be composed of stainless steel or other rigid, corrosion resistant material. The permanent magnet 124 is formed with its central axis coaxial with the rotor shaft 126. The outer surface of the permanent magnet 124 may be formed in a streamline shape to include at least one rotor blade 128. The permanent magnet 124 of this embodiment is formed in a barrel shape with a single helical ridge forming the rotor blade 128. In alternative embodiments, the rotor blade 128 could be turbine blades or other similar devices capable of inducing rotation of the rotor 112 when subjected to flowing water.

As illustrated in FIG. 7, the rotor 112 is positioned within the rotor housing 102 coaxial with the central axis of the rotor housing 102. One end of the rotor shaft 126 of the rotor 112 is inserted in a first collar 130 and the other end of the rotor shaft 126 is inserted in a second collar 132. In this embodiment, the ends of the rotor shaft 126 increase in diameter to form a solid sphere to facilitate fastening to the first collar 130 and the second collar 132. The first collar 130 and the second collar 132 are formed of plastic or other similar material and create a transverse strut perpendicular to the central axis of the rotor housing 102. The first collar 130 and the second collar 132 each contain a bearing 134 or other similar device to allow the rotor shaft 126 to rotate freely. Additionally, the first collar 130 and the second collar 132 are coupled to the rotor housing 102 at a predetermined distance from each other such that the rotor 112 can be suspended therebetween.

The rotor 112 is positioned in the rotor housing 102 such that water flowing through the rotor housing 102 impinges upon the rotor blade 128 that forms a part of the rotor 112. The rotor blade 128 acts as a paddle, causing the flowing water to act on the rotor 112. The flowing water causes the rotor 112 to rotate in a single direction about the central axis of the rotor housing 102. The rotor 112 is positioned within the stator 114 such that the axis of the rotor 112 is concentric with that of the stator 114. The rotor 112 operatively cooperates with the stator 144 to form the generator.

During operation, as water is flowing and the rotor 112 is rotating, the constant magnetic flux generated by the rotor 112 also rotates and penetrates into the stator 114 thereby intrinsically creating power. An air gap of a specified distance must be maintained between the rotor 112 and the stator 114 to allow the constant magnetic flux from the rotor 112 to induce the generation of electricity from the stator 114. In these embodiments, the "air gap" between the permanent magnet 124 of the rotor 112 and the pole shoes 122 of the stator 114 consists of flowing water and the rotor housing 102. The flow of fluid and the rotor housing 102 do not affect the constant magnetic flux. Accordingly, the rotating constant magnetic flux from the rotating rotor 112 induces the production of electricity from the coils 120 of the stator 114.

As the water flows through the rotor housing 102 causing the rotor 112 to rotate, the rotating constant magnetic flux is imparted on the winding of the stator 114 and electricity is produced. The electricity flows through conductors 54 to power a device which is a water treatment system 10 in this embodiment. The hydro-power generation system 12 of this embodiment illustrated in FIGS. 7 and 8 produces alternating current (AC) that may be used to power the water treatment system 10. In an alternative embodiment, the hydro-power generation system 12 may rectify the alternating current (AC) to produce direct current (DC). In another alternative embodiment, the hydro-power generation system 12 supplies both AC and DC current to the water treatment system 10 by rectifying and stabilizing the alternating current (AC). The DC current may also be used to charge an energy storage device (not shown). The rotation of the rotor 112 and the duration that electricity is produced may also be used to provide flow-based measurements such as, the flow rate or the quantity of water flowing through the water treatment system 10.

Figure 9:
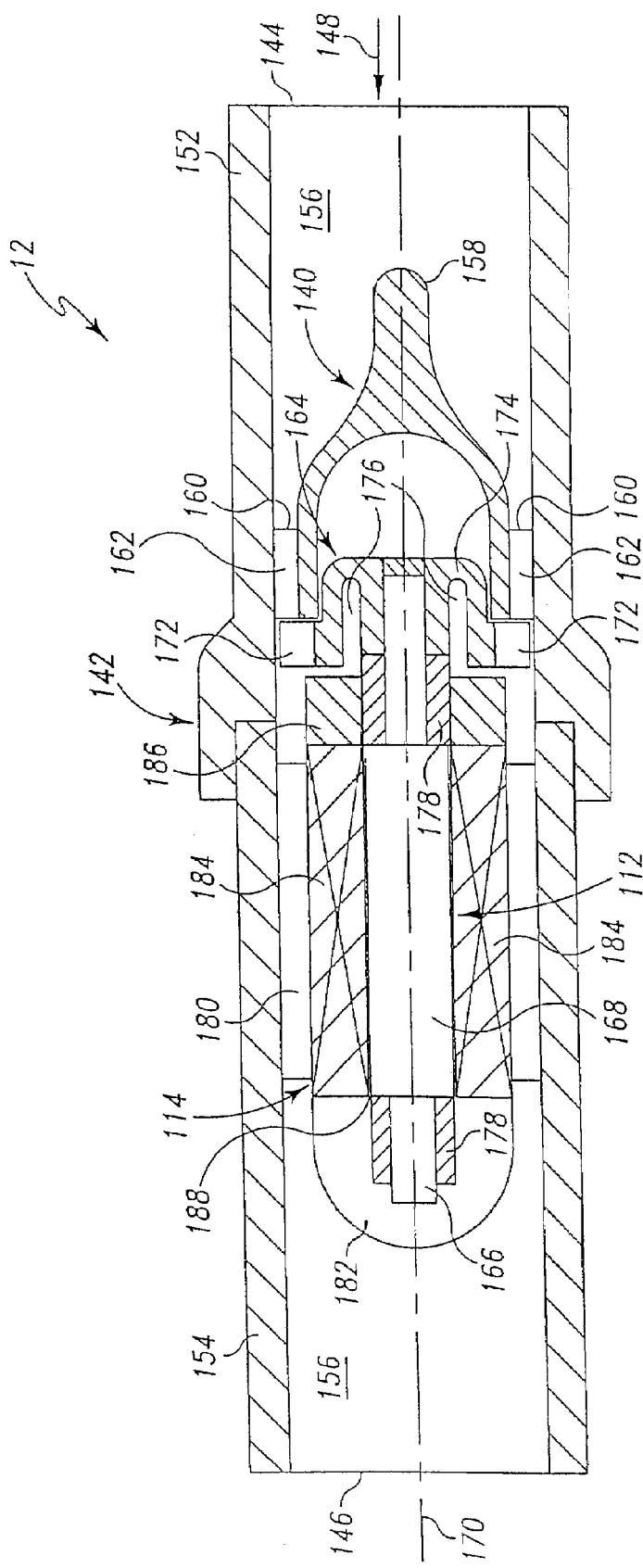
FIG. 9 represents a cross-sectional view of another embodiment of the hydro-power generation system.

FIG. 9 illustrates a cross-sectional view of yet another embodiment of the hydro-power generation system 12 that is similar in concept to the previous embodiment disclosed with respect to FIGS. 7 and 8. This embodiment includes a rotor 112, a stator 114 and a turbine nozzle 140 positioned in a housing 142. The housing 142 forms a conduit that includes an inlet 144 and an outlet 146. As water or some other fluid flows into the inlet 144 as illustrated by arrow 148, the water flows through the housing 142 and is channeled out of the housing 142 by the outlet 146. In one embodiment, the hydro-power generation system 12 may be positioned within a water treatment system 10 (illustrated in FIG. 1), following the water treatment system 10 or supplying water to the water treatment system 10.

The housing 142 may be formed of plastic or similar rigid material capable of channeling water. The housing 142 of this embodiment includes a first section 152 and a second section 154 to facilitate assembly and maintenance. The first and second sections 152, 154 may be fixedly coupled by gluing, friction fit, threaded connection, sonic welding or some other means of providing a similar rigid connection. The housing 142 forms a passageway 156 for the flow of water therethrough. Fixedly positioned within the passageway 156 is the turbine nozzle 140.

The turbine nozzle 140 of this embodiment may be generally conical in shape and may be formed of plastic or some other similar rigid material. The turbine nozzle 140 may be integrally formed to include a tip 158 and a plurality of struts 160. The tip 158 may be centrally located in the passageway 156 and serves to direct the flowing water outwardly toward the inner wall of the housing 142. The struts 160 are fixedly coupled to the inner wall of the housing 142 by, for example friction fit, snap-fit, threaded connection or other similar rigid connection.

The struts 160 fixedly hold the turbine nozzle 140 in the passageway 156 and include a plurality of channels 162 to allow water to flow through the housing 142. The size of the channels 162 may be adjusted to control the velocity of the flowing water. As in the nozzle 14, previously discussed with reference to FIG. 2, a predetermined range of velocity can be determined. The predetermined range of velocity is based on the expected pressure range of the water flowing in the inlet 144 as well as the backpressure of the hydro-power generation system 12. In addition, the struts 160 may be oriented in a predetermined configuration to act as vanes to direct the flowing water. The flowing water may be directed, for example, to act upon the rotor 112 in a predetermined way, to eliminate turbulence, to adjust pressure drop or to increase the efficiency of operation.

Figure 10:
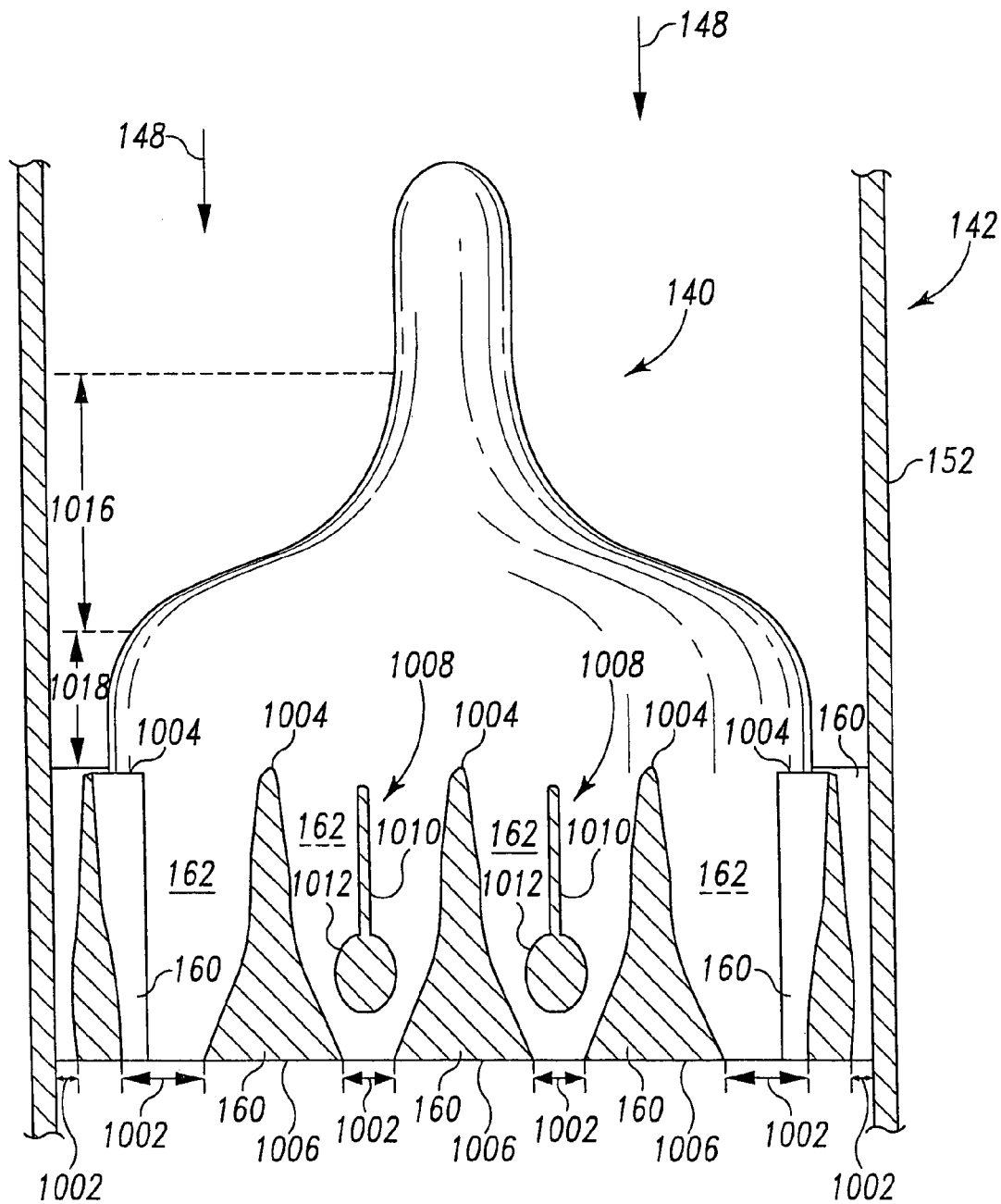
FIG. 10 represents a cross-sectional view of a portion of the hydro-power generation system of FIG. 9.

FIG. 10 is cutaway top view of a portion of the hydro-power generation system 12 of FIG. 9 illustrating the nozzle 140 and the struts 160 within the first section 152 of the housing 142. The struts 160 may be positioned at a determined distance 1002, such as 4.42 millimeters (0.174 inches) from each other around the outside of the nozzle 140 to form the channels 162. Each of the struts 160 includes a leading end 1004 and a trailing end 1006. The leading end 1004 of adjacently located struts 160 may form an entry duct, and the trailing end 1006 of adjacently located struts 160 may form an exit duct. The flow of liquid, as indicated by arrow 148, first reaches the leading end 1004 and enters the entry duct. Within the channels 162, the liquid is increased in velocity prior to reaching the trailing end 1006 of the struts 160.

The width of the channels 162 may become gradually narrower toward the trailing end 1006 as illustrated. As such, the cross-sectional area between the channels is reduced by a predetermined amount such as about 10% to 20%. Since the pressurized liquid is forced into an increasingly narrower channel 162, velocity increases. The gradual reduction in cross-sectional area between the channels 162 minimizes back pressure while increasing the velocity of the flowing liquid. In addition, non-laminar flow of liquid within the channels 162 is minimized by the gradually narrowing channels 162.

The struts 160 may also include a plurality of flow straighteners 1008. The flow straightners 1008 may be included in the channels 162 to further minimize non-laminar flow. Similar to the struts 160, the flow straightners 1008 may be fixedly coupled with the inner wall of the first section 152 and extend into the channels 162. The example flow straightners 1008 may include a blade 1010 coupled with a body 1012. The blade 1010 may be a substantially straight section of the flow straightners 1008 that extends from near the leading end 1004 toward the trailing end 1006 of each of the struts 160. The body 1012 may be spherical shaped body that is positioned a determined distance upstream of the exit duct formed by the trailing ends 1006 of the adjacently positioned struts 160. In other examples, the flow straightners 1008 may be any other hydrodynamic shape to define the flow of liquid and maximize uniform flow thorough the channels 162.

As further illustrated in FIG. 10, the nozzle 140 may be divided into a compression region 1016 followed by a settlement region 1018. Within the compression region 1016, an abrupt transition in the direction of flow of the liquid may occur. The abrupt transition may increase turbulence in the flow of liquid. Turbulence may increase as the volume of liquid capacity within the first section 152 decreases. As the volume decreases, compression and the velocity of the liquid increase. The decrease in volume in the compression region 1016 may be predetermined to achieve a desired flow rate based on the expected pressure range of the flowing liquid. Within the compression region 1016, the flowing liquid is forced outward toward the inner wall of the housing 142 which may increase turbulence and/or non-laminar flow.

The settlement region 1018 provides an area with a uniform volume of liquid capacity that allows turbulence in the flowing liquid to subside and the liquid to have a more laminar flow. The settlement region 1018 may be a predetermined length based on the projected amount of turbulence in the flowing liquid. Non-laminar flow of the liquid may be reduced prior to entering the channels 162. Within the channels 162, the velocity of the flowing liquid is further increased, and the liquid is then directed to the rotor 112.

Referring again to FIG. 9, the rotor 112 of this embodiment includes a turbine rotor 164, a rotor shaft 166 and a permanent magnet 168. The rotor 112 is rotatably positioned within the passageway 156 such that water flowing in the passageway 156 causes rotation of the rotor 112 about a central axis 170 of the housing 142. Rotation of the rotor 112 occurs when the flowing water acts upon the turbine rotor 164. The turbine rotor 164 may be formed of stainless steel, aluminum, plastic or other similar rigid material that is capable of withstanding the rotational forces and the force of the flowing water. The turbine rotor 164 includes at least one turbine blade 172 and a body 174.

The turbine blade 172 is positioned to receive energy from water flowing through the struts 160. The turbine blade 172 may be a plurality of vanes, a helical ridge or other mechanism formed on the body 174 that is capable of converting the energy of the flowing water to rotational energy. The turbine blade 172 of this embodiment is integrally formed with the body 174 and extends until positioned adjacent the inner wall of the housing 142. The body 174 may be formed to define a cavity 176 that circumferentially surrounds a portion of the rotor shaft 166.

It should be noted by the reader that the depth of the channels 162 are less than the depth of the turbine blade 172 with respect to the inner wall of the housing 142. The differential depth provides circulation of the flowing water as will be hereinafter discussed. In addition, the flow path of the water is substantially straight past the stator 114. The volume of the flow path is also larger following the channels 162 to provide a determined drop in pressure of the flowing water. The flowing water therefore discharges substantial amounts of kinetic energy to the rotating turbine blade 172 as the water flows past the turbine blade 172. The kinetic energy in the flowing water is efficiently extracted by the turbine blades 172 without significant losses and inefficiencies since only the turbine blades 172 are directly in the high velocity stream of flowing water.

The rotor shaft 166 is rotatable and may be integrally formed with the turbine rotor 164 or, the rotor shaft 166 may be fixedly coupled thereto by press-fit, threaded connection or similar coupling mechanism. The rotor shaft 166 may be stainless steel or other similar rigid material that may longitudinally extend through the permanent magnet 168. The permanent magnet 168 may be an extruded magnet or plastic injected magnet. Alternatively, the permanent magnet may be formed of metal, sintered metal, ceramic material or some other similar material with magnetic properties. The permanent magnet 168 may be fixedly coupled to the rotor shaft 166 by friction fit, molding or other similar mechanism. The rotor 112 is rotatable held in position by a plurality of bearings 178.

The bearings 178 circumferentially surround a portion of the rotor shaft 166 at opposite ends of the permanent magnet 168. The bearings 178 may be carbon graphite, Teflon, ball bearings, ceramic, ultra high molecular weight (UHMW) polyethylene or other similar bearings capable of withstanding the rotation of the rotor shaft 166. In this embodiment, the bearings 178 are lubricated by water present in the passageway 156. In addition, the flowing water is operable to cool the bearings 178 as will be hereinafter described. The bearings 178 are fixedly coupled and held in position by the stator 114.

The stator 114 of this embodiment includes a plurality of exit guide vanes 180, a fin 182, a plurality of coils 184 and a cap 186. As illustrated in FIG. 9, the stator 114 is fixedly positioned in the passageway 156 by the exit guide vanes 180. The exit guide vanes 180 are fixedly coupled with the inner wall of the housing 142 by, for example, glue, friction fit, snap fit or similar rigid coupling mechanism. The exit guide vanes 180 longitudinally extend parallel with the inner wall of the housing 142 and provide channels for the flow of water therethrough. The exit guide vanes 180 are formed to channel the flowing water to the outlet 146 to reduce turbulence, air bubbles, back pressure and other similar behavior of the flowing water that may effect efficient operation. The fin 182 is similarly formed to channel the flowing water to the outlet 146.

Although not illustrated, the exit guide vanes 180 may be formed in a swirl pattern that resembles a helically shaped coil (or rifling) that is concentric with the central axis 170. The exit guide vanes 180 may gradually un-coil in the direction of the fin 182 to eventually become substantially parallel with the central axis 170. In this configuration, the exit guide vanes 180 may reduce turbulence and create a laminar flow.

During operation, liquid received by the exit guide vanes 180 may include a swirling tendency due to the rotation of the turbine blade 172. The swirling tendency in the liquid may substantially match the swirl pattern of the exit guide vanes 180. Accordingly, the liquid enters the exit guide vanes 180 without abrupt directional changes that can cause turbulence. While being channeled by the exit guide vanes 180, the swirling tendency in the liquid may be gradually minimized by the gradual un-coiling of the exit guide vanes 180. Thus, the liquid may exit the exit guide vanes 180 with a substantially laminar flow to maximize efficient operation.

The coils 184 are formed on a core (not shown) to circumferentially surround the rotor 112 and form a winding. The coils 184 are separated from the rotor 112 by an air gap 188. The coils 184 are fixedly coupled with the exit guide vanes 180. In addition, the coils 184 may be fixedly coupled with the bearings 178 and the fin 182. The coils 184 may be fixedly coupled to the exit guide vanes 180, the bearings 178 and the fin 182 by, for example, glue or by being integrally formed therewith. In this embodiment, the coils 184 are positioned within the passageway 156, but are waterproof to avoid fluid communication with the flowing water. The coils 184 may be made waterproof by being, for example, potted with epoxy, injection molded with rubber or plastic, ultrasonically sealed or otherwise isolated from the water by a similar waterproofing mechanism. In an alternative embodiment, the coils 184 may be located outside the housing 142 as in the embodiment previously discussed with reference to FIGS. 7 and 8.

The coils 184 are also water proofed by the cap 186. The cap 186 is positioned to seal the end of the coils 184 that is adjacent the turbine rotor 164 as illustrated in FIG. 9. The cap 186 may be removably coupled to the coils 184 by threaded connection or may be fixedly coupled to the coils 184 by glue or integral formation therewith. The cap 186 is formed to partially surround the bearing 178 and radially extend a predetermined distance that is equal to the radius of the stator 114. The predetermined distance of the cap 186 extends closer to the inner wall of the housing 142 than the body 174 of the turbine rotor 164. The difference in the distance from the inner wall of the housing 142 to the cap 186 and the body 174 provides for circulation of the flowing water as will be hereinafter discussed.

During operation, water flowing through the inlet 144 and into the passageway 156 experiences a predetermined increase in velocity as the pressurized water flows through the channels 162. The flowing water is directed by the struts 160 to achieve a predetermined angle of incidence on the turbine blade 172 that imparts rotation on the rotor 112. Due to the differential depth of the channel 162, the turbine blade 172 and the cap 182, the flowing water is circulated into the cavity 176. Circulation of the flowing water through the cavity 176 provides cooling and lubrication of the adjacently positioned bearing 178.

In this embodiment, the rotor 112 rotates above about 5,000 revolutions-per-minute (RPM), such as in a range of between about 5,000 RPM and about 10,000 RPM or in a range between about 4,000 RPM and about 12,000 RPM. Rotation above about 5,000 RPM may be based on a liquid flow rate of about 3.78 liters/minute to about 11.35 liters/minute (about 1 to 3 gallons/minute) in a liquid pressure range of about 415 kPa to about 690 kPa (about 60 to 100 lbs./sq. inch). Rotation above about 5,000 RPM may also be based on a liquid flow rate of about 0.76 liters/minute to about 3.78 liters/minute (about 0.2 to about 1 gallons/minute) in a liquid pressure range of about 103.4 kPa to about 415 kPa (about 15 to 60 PSI). Depending on the physical properties of the liquid and/or manufacturing tolerances, the dimensions, the RPM, the pressure and the flow rates discussed herein may vary by as much as 10% to 20%.

To operate in this RPM range, the hydro-power generation system may be miniaturized to reduce inefficiency due to fluid impedance (or windage losses). As used herein, the term "fluid impedance" is defined as fluid friction and/or any other fluid effects that may compromise maximization of the transfer of kinetic energy to rotational energy.

Miniaturization of the hydro-power generation system minimizes surface areas that are subject to fluids as the rotor 112 rotates. In addition, the weight of the hydro-power generation system is minimized. For example, the diameter of the passageway 156 may be in a range of about 6.35 millimeters to about 51 millimeters (about 0.25 inches to about 2 inches). In addition, the depth of the channels 162 may be about 0.76 millimeters to about 2.54 millimeters (about 0.03 inches to about 0.1 inches) and the depth of the turbine blade 172 may be about 0.89 millimeters to about 3.8 millimeters (about 0.035 inches to about 0.15 inches.

The higher RPM that is achievable due to the miniaturization and fluid impedance reductions maximizes power generation efficiency. For example, the generator may produce between about 0.27 and 30 watts when rotating between about 5,000 and 10,000 RPM. In addition, the size (and weight) of the permanent magnet 168 may be dimensioned to optimize the power production of the hydro-power generation system 12.

The high RPM revolution of the rotor 112 within the stator 114 efficiently produces electricity when the hydro-power generation system 12 is operating. The hydro-power generation system 12 is capable of generating alternating current (AC). In alternative embodiments, the hydro-power generation system 12 may produce (DC) current. In another alternative embodiment, the hydro-power generation system 12 may be designed to produce both AC current and DC current by rectification and stabilization of the AC current. As previously discussed, the number of poles and the size and configuration of the coils 184 is dependent on the back pressure, the required RPM's and the target energy output of the hydro-power generation system 12.

Referring now to FIGS. 3, 6, 7, 8 and 9, another embodiment of the hydro-power generation system 12 discussed in conjunction with the embodiments of these figures is operable to supply multiple voltage and current levels. The multiple voltage and current levels are supplied by switching the coils of the hydro-power generation system 12 between a series configuration and a parallel configuration. Although not illustrated, a microprocessor or other similar control unit that can sense the voltage and current output of the hydro-power generation system 12 and the present voltage and current needs of the water treatment system 10 may be used to selectively switch the coils between series and parallel configurations. Alternatively, RPM may be used to selectively switch the coils. Selective switching of the coils may be applied to embodiments that produce direct current (DC) or alternating current (AC).

For example, some ultraviolet (UV) light sources require a relatively low predetermined alternating current for initial energization and a relatively high voltage level. Following initial energization, the UV light source requires a relatively high alternating current but requires a relatively low voltage level to remain energized. In a water treatment system for example, the UV light source may be a low pressure mercury lamp or a cold cathode lamp and the starting voltage and the running state voltage may be provided by a ballast. Alternatively, the hydro-power generation system 12 may provide a ballast function as described below and the ballast may be eliminated. The mercury lamp and/or the cold cathode lamp may remove bacteria and other impurities from water.

During operation, when the hydro-power generation system 12 is generating electricity, the coils may be selectively placed in a series configuration by the microprocessor. The series configuration generates a predetermined alternating current at a predetermined voltage level that is capable of initially energizing the UV light source with the startup voltage. Following initial energization of the UV light source, the coils are selectively reconfigured to a parallel configuration to provide a predetermined alternating current at a predetermined voltage level capable of maintaining energization of the UV light source with the running state voltage. Switching the coils of the hydro-power generation system 12, as previously discussed, may provide for various voltage and current requirements of any electrical device in any system supplied power by the hydro-power generation system 12.

In another embodiment, the hydro-power generation system 12 discussed in conjunction with the previously discussed embodiments may be provided with a plurality of taps representing different groups of coils formed into windings. The taps are operable to supply a plurality of different predetermined voltage levels by electrically connecting different numbers of coils to form the windings. The water treatment system 10 may be configured to operatively switch between the taps during operation using a microprocessor or some other similar device. Accordingly, in the UV light source example previously discussed, one tap may be used for initial energization to provide the startup voltage and another tap may be used for continuous operation to provide the running state voltage. In addition, different taps may be used on an ongoing basis to operate different electrical devices in the water treatment system 10 depending on the power requirements of the electrical devices. Tap switching may also be used to control the RPM of the generator. Where the RPMs are below a desired threshold, for example, taps may be adjusted to drop coils out thereby increasing the RPM. Tap switching of the hydro-power generation system 12 may also provide various voltage levels for any system supplied power by the hydro-power generation system 12.

In yet another embodiment of the hydro-power generation system 12 discussed in conjunction with the previously discussed embodiments, the back electromagnetic force (EMF) that is present is advantageously reduced. As known in the art, the back EMF of a permanent magnet generator is increased by flux concentrators that are formed by metal laminations in the core of the generator. The flux concentrators are operable to improve the generating efficiency of the generator, but supply back EMF that must be overcome to rotate the rotor.

In the application of the hydro-power generation system 12 to a water treatment system 10, some UV light sources have varying power requirements during startup and operation. By using the previously discussed embodiments of the hydro-power generation system 12 and not include the flux concentrators, the operational requirements of the UV light source may be met.

During operation, prior to energization of the water treatment system 10, the rotational load (the back EMF) on the hydro-power generation system 12 may be relatively low. The rotational load may be relatively low since the hydro-power generation system 12 of this embodiment does not include the flux concentrators and the water treatment system 10 is not using power. The elimination of the flux concentrators results in a reduction in cogging torque thereby allowing quick spin-up of the generator. As such, when water flows through the hydro-power generation system 12, the rotor is operable to accelerate to a predetermined relatively high RPM in a relatively short period of time.

The relatively high RPM supplies a predetermined voltage (startup voltage) at a predetermined alternating current (AC) that is capable of initially energizing, for example, the UV light source in the water treatment system 10. Following initial energization of the UV light source, the rotational load on the hydro-power generation system 12 is increased thereby slowing the RPM of the rotor. The slower RPM of the rotor provides a predetermined low voltage (running state voltage) with a corresponding predetermined alternating current (AC) thereby allowing continued energization of the UV light source. The reader should recognize that the "instant-on" capability provided by the hydro-power generation system 12 of this embodiment may eliminate the need for energy storage devices to power the UV light source in the water treatment system 10 since the UV light source will be energized at almost the same time the water begins to flow.

Figure 11:
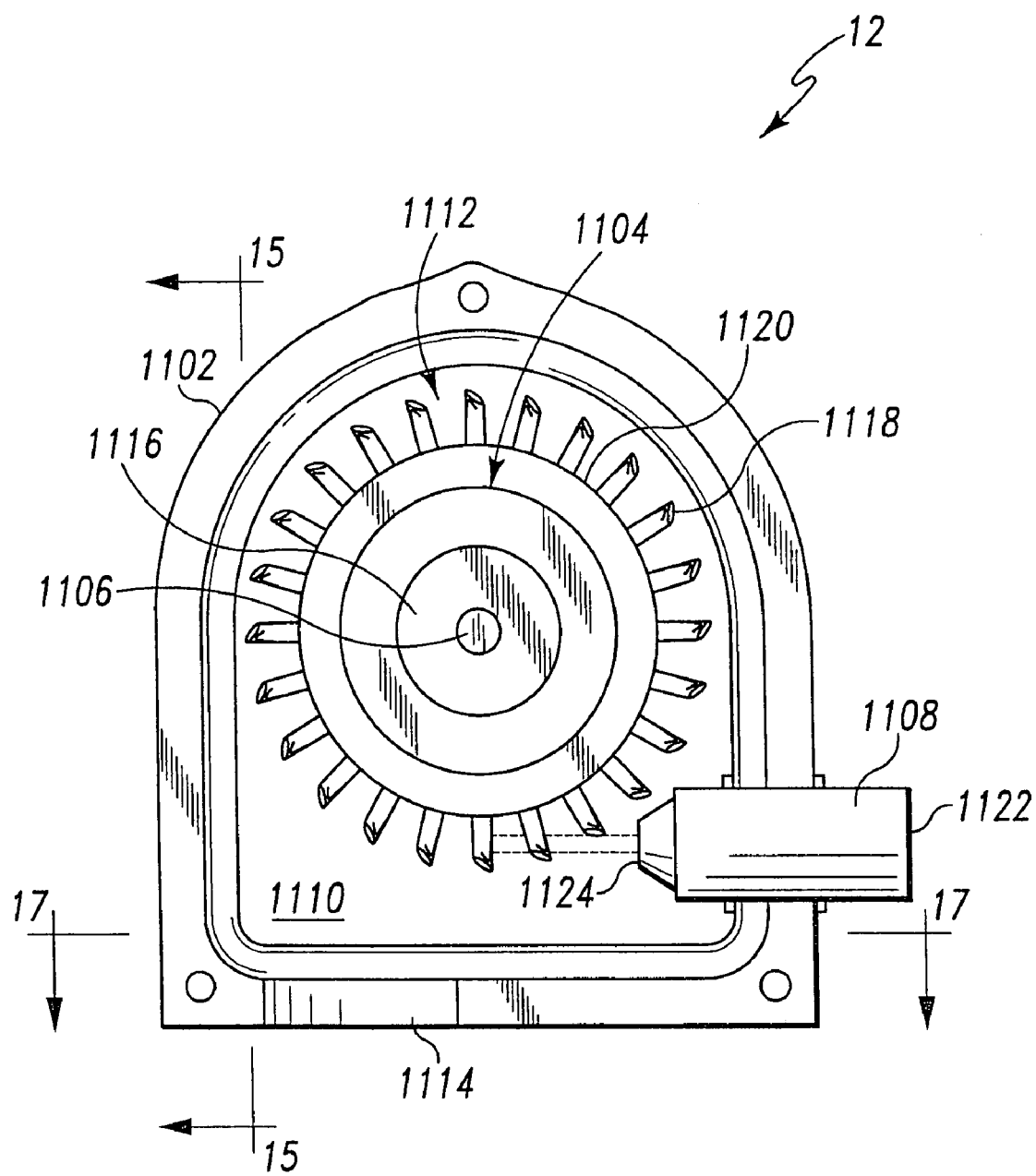
FIG. 11 represents a side view of another embodiment of the hydro-power generation system.

FIG. 11 is another embodiment of the hydro-power generation system 12 depicted in a partial cross-section view. Similar to the previous embodiments, the hydro-power generation system 12 may be used in a water treatment system 10. In addition, the hydro-power generation system 12 may be included in any other form of system with flowing pressurized liquid. The hydro-power generation system 12 may also include features of a water treatment system such as a UV light source, filters, electronics, etc.

The illustrated hydro-power generation system 12 includes an outer housing 1102 depicted with a side cover removed. In addition, the hydro-power generation system 12 includes an inner housing 1104, a centering rod 1106 and a nozzle 1108. The outer housing 1102 may be plastic, metal, carbon fiber or other rigid material and includes a cavity 1110. The cavity 1110 is an airspace that is sized to accommodate the inner housing 1104 without the inner housing 1104 contacting an interior surface 1112 of the outer housing 1102. Also included in the outer housing 1102 is an outlet 1114. The outlet 1114 may be an aperture that allows liquid present in the outer housing 1102 to drain by gravity from the cavity 1110 to maintain the airspace during operation.

The inner housing 1104 may be generally cylindrical and form of plastic, metal, carbon fiber or other similar material. The inner housing 1104 may be mounted in the outer housing 1102 to surround at least a portion of the centering rod 1106 within the cavity 1110 of the outer housing 1102. The centering rod 1106 may be fixedly coupled with the outer housing 1102 and extend into the inner housing 1104. The centering rod 1106 may be any rigid, longitudinally extending material such as stainless steel.

A plurality of bushings 1116 may be coupled with the inner housing 1104 and surround the centering rod 1106. Each of the bushings 1116 may be a sleeve formed from plastic, metal or other similar material. The bushings 1116 may be formed with an aperture to accommodate the centering rod 1106, and an outer surface formed to fit within an aperture in the outer surface of the inner housing 1104. The aperture in the bushing 1116 may be large enough to allow the bushing 1116 to rotate around the centering rod 1106 within the outer housing 1102 without contacting the centering rod 1106. The outer surface of the bushing 1116 may be fixedly coupled with the outer surface of the inner housing 1104 such that the inner housing 1104 and the bushing 1116 rotate together. Alternatively, the bushing 1116 and the inner housing 1104 may rotate independently around the centering rod 1106.

The inner housing 1104 may also include a plurality of paddles 1118 fixedly coupled and extending outwardly from an outer surface 1120 of the inner housing 1104. The paddles 1118 may be formed of plastic, carbon fiber, metal or other similar material. The paddles 1118 may be positioned perpendicular to the outer surface 1120 of the inner housing 1104 such that each of the paddles 1118 are located adjacent to the nozzle 1108 at some point as the inner housing 1104 rotates.

The nozzle 1108 may be mounted to extend into the cavity 1110 between the inner housing 1104 and the outlet 1114 as illustrated. Similar to the nozzle 14 previously discussed with reference to FIGS. 1-5, the nozzle 1108 increases the velocity of pressurized liquid. Pressurized liquid supplied to a nozzle inlet 1122 at a first velocity flows through the nozzle 1108 and is discharged from a nozzle outlet 1124 at a second velocity that is substantially higher than the first velocity. Liquid discharged into the cavity with the nozzle 1108 is directed through the air space at the paddles 1118.

Figure 12:
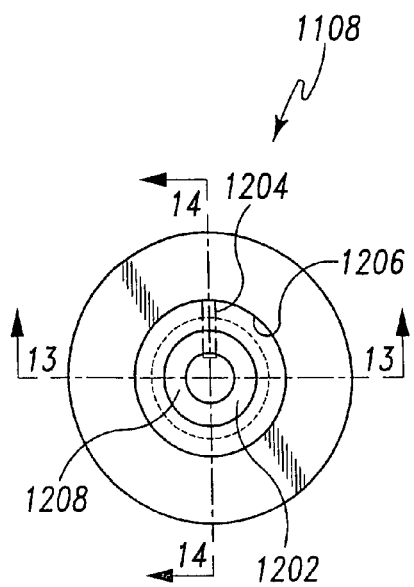
FIG. 12 represents an end view of a nozzle illustrated in FIG. 11.

FIG. 12 is an end view of the nozzle 1108 viewed from the nozzle inlet 1122 (FIG. 11). The nozzle 1108 includes a passageway 1202 that is an axial bore that reduces in diameter toward the nozzle outlet 1124 (FIG. 11). Included in the passageway 1202 is a rib 1204. The rib 1204 is coupled with an inner surface 1206 of the nozzle 1108 and extends outwardly from the inner surface 1206 towards a central axis 1208 of the nozzle 1108.

Figure 13:
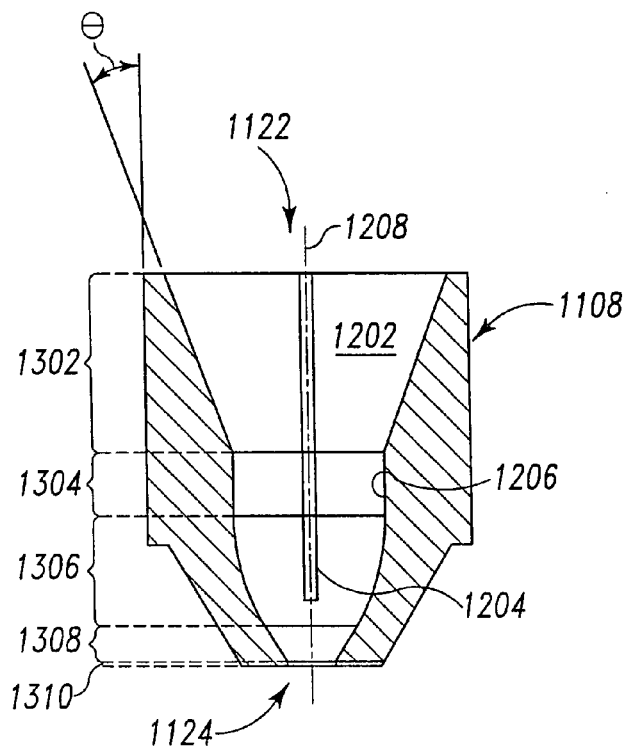
FIG. 13 represents a cross-sectional view of the nozzle illustrated in FIG. 12 taken along line 13-13.

FIG. 13 is a cutaway bottom view of the nozzle 1108 depicted in FIG. 12 that includes the rib 1204. The passageway 1202 through the nozzle 1108 includes a first angled section 1302 adjacent to the nozzle inlet 1122 followed by a first straight section 1304, a tapered section 1306, a second angled section 1308, and a second straight section 1310 that forms the nozzle outlet 1124. The passageway 1202 may be a predetermined entry diameter such as about 10.8 millimeters at the nozzle inlet 1122. Within the first angled section 1302, the diameter of the passageway 1202 may uniformly reduce in diameter toward the nozzle outlet 1124 at a predetermined angle (θ) with respect to the central axis 1208, such as about 20 degrees.

At a first straight section 1304, the diameter of the passageway 1202 may be a predetermined first nozzle diameter such as about 5.8 millimeters. Through the first straight section 1304 of the passageway 1202, the interior surface 1206 may be about parallel with the central axis 1208 and is therefore maintained at the first nozzle diameter. In the tapered section 1306, the interior surface 1202 may have a radius of curvature. The radius of curvature may form a portion of a circle with a predetermined radius, such as about 8.7 millimeters. The diameter of the passageway 1202 in the second angled section 1308 may reduce at a uniform rate toward the nozzle outlet 1124 at a predetermined angle (θ) with respect to the central axis 1208, such as about 20 degrees. The second straight section 1310 may form the nozzle outlet 1124 by maintaining the passageway 1202 at a predetermined second nozzle diameter such as about 1.85 millimeters.

The first and second nozzle diameters may be determined based on the available range of pressure of the liquid supplied to the nozzle 1108. In one example, the diameter of the first straight section 1304 may remain relatively unchanged and the diameter of the second straight section 1310 may be varied based on the pressure of the liquid introduced to the nozzle 1108. For example, the diameter of the first straight section 1304 may remain about 5.8 millimeters and the second straight section 1310 may be formed to be about 1.9 millimeters or less. Accordingly, the diameter of the second straight section 1310 (the nozzle outlet 1124) of the nozzle 1108 is about 33% or less of the diameter of the first straight section 1304 of the nozzle 1108.

In another example, the second straight section 1310 may be formed in a range between about 0.8 millimeters and about 1.9 millimeters (between about 0.03 and 0.075 inches) for use with liquid pressurized at the nozzle inlet 1122 between about 34 kPa and 850 kPa (between about 5 and 125 PSI). In this example, the nozzle 1108 may be between about 14% and about 33% of the diameter of the first straight section 1304 of the nozzle 1108. The resulting flow rate through the nozzle 1108 for this example may be in a range of about 0.44 liters/minute at 34 kPa to about 4.16 liters/minute at about 850 kPa (about 0.115 gallons-per-minute to about 1.1 gallons-per-minute).

The rib 1204 may be any configuration to minimize swirling and other non-laminar behavior of the liquid flowing through the passageway 1102. The illustrated rib 1204 begins at the nozzle inlet 1122 and extends a predetermined distance along the central axis 1208 through the first angled section 1302, the first straight section 1304, and into the tapered section 1306. Although depicted as having a uniform width, in other examples, the rib 1204 may include one or more tapered width sections, bulbs, curves or any other configuration to promote laminar flow of the liquid through the nozzle 1108. In addition, the length of the rib 1204 may be shorter or longer than illustrated to best eliminate swirling of the liquid flowing through the passageway 1202.

Figure 14:
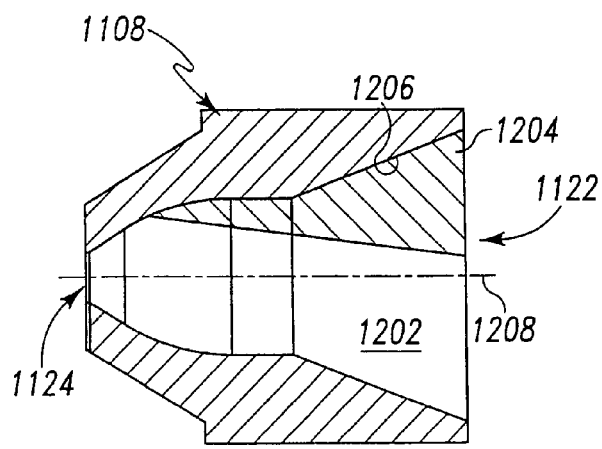
FIG. 14 represents another cross-sectional view of the nozzle illustrated in FIG. 12 taken along line 14-14.

FIG. 14 is a cutaway side view of the nozzle 1108 that includes the rib 1204 depicted in FIG. 12. The example rib 1204 extends outwardly from the interior surface 1206 towards the central axis 1208 a determined first distance at the nozzle inlet 1122 of the passageway 1202. The distance that the rib 1204 extends from the interior surface 1206 gradually diminishes to zero as the rib 1204 extends along the central axis 1208 towards the nozzle outlet 1124. In the illustrated example, the rib 1204 is tapered to extend a distance that becomes progressively further from the central axis 1208 as the rib 1204 extends towards the nozzle outlet 1124 along the central axis 1208. In addition, the distance between the interior surface 1206 and the central axis 1208 becomes less toward the nozzle outlet 1124 further tapering the rib 1204 as illustrated. In other examples, the rib 1204 may form any other shape to reduce swirling effects and promote laminar flow of the liquid through the nozzle 1108.

Referring again to FIG. 11, during operation, liquid flowing through the nozzle 1108 may be maintained with laminar flow while the velocity of the liquid is accelerated within the nozzle 1108. The liquid may be extruded from the nozzle 1108 in a stream at high velocity. Due to the substantially laminar flow, the extruded stream of liquid may remain a well defined stream of about the same diameter as the nozzle outlet 1124 following discharge. Thus, liquid spray produced by the extruded stream of liquid is minimized and the kinetic energy of the flowing liquid may be concentrated in a relatively small area.

The extruded stream of liquid may be directed at the paddles 1118. Upon striking the paddles 1118, the kinetic energy present in the liquid may be efficiently transferred to rotational energy of the inner housing 1104. As the inner housing 1104 rotates, each of the paddles 1118 may enter the extruded stream of high velocity liquid discharged from the nozzle 1108 and receive substantially all the kinetic energy present in the flowing extruded stream of liquid.

Once the kinetic energy is extracted from the liquid, the liquid may fall by gravity to the outlet 1114 and is channeled out of the outer housing 1102. Due to the channeling, the outer housing 1102 remains substantially empty of liquid. Although some liquid is present due to the constant flow of liquid discharged from the nozzle 1108, the channeling may maintain the level of liquid in the outer housing 1102 low enough that the nozzle 1108 and the inner housing 1104 are not submerge in the liquid. Accordingly, the nozzle 1108 and the inner housing 1104 operate in an airspace within the outer housing 1102 with minimized fluid impedance losses.

Some of the liquid may temporarily remain on the paddles 1118, and be thrown by the rotational force of the inner housing 1104 onto the inner surface 1112 of the outer housing 1102. In addition, some of the liquid may impact the paddles 1118 and be deflected onto the inner surface 1112.

The inner surface 1112 may be formed with ducting to minimize liquid spray within the cavity 1110. Minimization of liquid spray within the cavity 1110 minimizes fluid impedance losses of the rotating inner housing 1104 by keeping excess liquid away from the rotating inner housing 1104. The ducting included on the inner surface 1112 may also be formed with a swirl pattern designed to efficiently collect the liquid spray and channel the liquid to the outlet 1114. Accordingly, the cavity 1110 remains substantially empty of liquid and substantially filled with air (or some other gas) during operation such that the nozzle outlet 1124 of the nozzle 108 is not submerged in the liquid.

Figure 15:
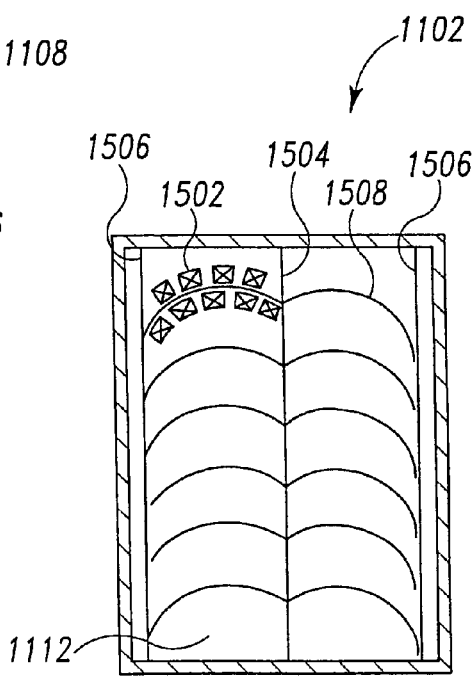
FIG. 15 represents a cross-sectional view of a portion of an outer housing of the hydro-power generation system illustrated in FIG. 11 taken along line 15-15.

FIG. 15 illustrates one example of the inner surface 1112 in a cross-sectional view of the outer housing 1102 of FIG. 11. The inner surface 1112 includes ducting in the form of a plurality of fingers 1502 extending outward from the inner surface 1112 towards the inner housing 1104 (FIG. 11). Each of the fingers 1502 may be formed as individual pyramid shaped members. In other examples, the fingers 1502 may be grooves, rings, struts, tracks or any other form of irregularity in the inner surface 1112 of the outer housing 1102. The fingers 1502 may be positioned in a determined pattern. The pattern may be a swirl pattern based on modeling or analysis of the liquid flung from the rotating inner housing 1104 and paddles 1118 to minimize the liquid spray and maximize channeling of the liquid to the outlet 1114 (FIG. 11).

The fingers 1502 may minimize liquid spray of the liquid that contacts the interior surface 1112 of the outer housing 1102. In addition, the fingers 1502 may be configured to channel the water to a center channel 1504 and outer channels 1506 included in the outer housing 1102. The center channel 1504 and outer channels 1506 may be v-shaped grooves or some other form of conduit to channel the liquid toward the outlet 1114 (FIG. 11). The interior surface 1112 may also include a plurality of branch channels 1508. The branch channels 1508 may be arcuate pathways in the interior surface 1112 that channel the liquid to the center channel 1504 or the outer channels 1506. The channels may also be positioned in a swirl pattern based on modeling or analyzing the liquid flung from the rotating inner housing 1104 to minimize the liquid spray and maximize channeling of the liquid to the outlet 1114 (FIG. 11).

The fingers 1502 may be positioned along each of the branch channels 1508. Liquid that impacts on the fingers 1502 may be "captured" by the fingers 1502. The liquid may flow off the fingers 1502 into the branch channels 1508 and then into the center channel 1504 or the outer channels 1506.

Figure 16:
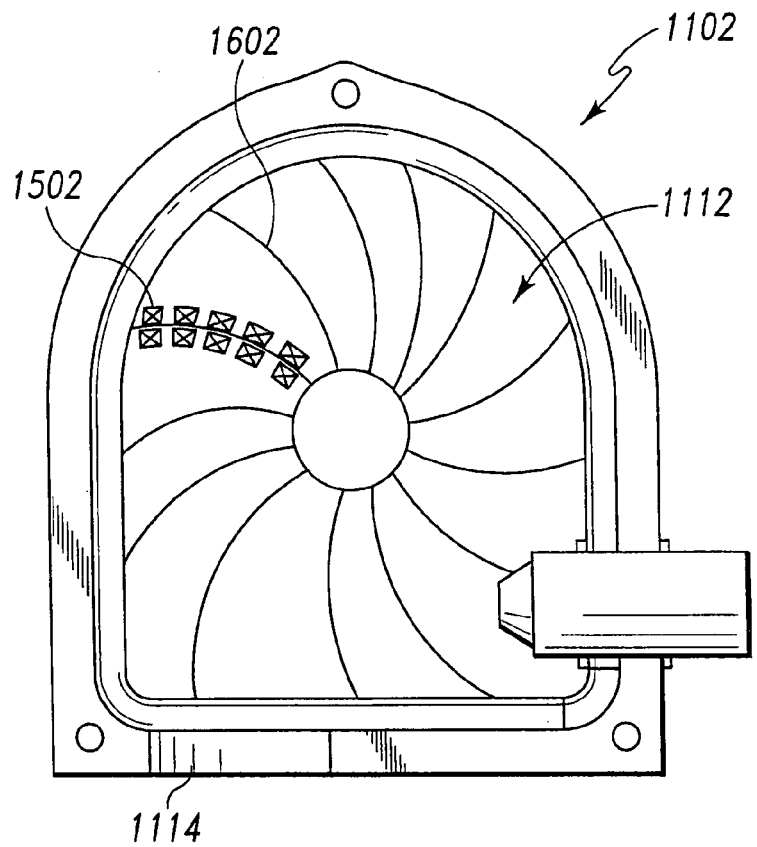
FIG. 16 represents a side view of the hydro-power generation system illustrated in FIG. 11 with an inner housing removed.

FIG. 16 is a side view of the outer housing 1102 depicted in FIG. 11 with the inner housing 1104 and the centering rod 1106 removed for purposes of illustration. The interior surface 1112 of the outer housing 1102 includes the fingers 1502 placed along a plurality of branch channels 1602 forming arcuate pathways for liquid in the interior surface 1112. Liquid "captured" by the fingers 1502 flows off the fingers 1502 into the branch channels 1602 and is channeled to the outer channels 1506 (FIG. 14) and/or the outlet 1114.

Figure 17:
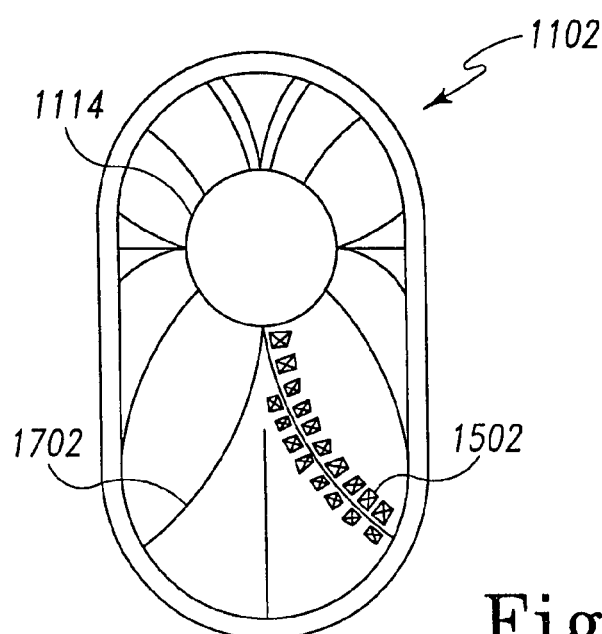
FIG. 17 represents a cross-sectional view of a bottom portion of the outer housing of the hydro-power generation system illustrated in FIG. 11 taken along line 17-17.

FIG. 17 is a cross-sectional view of the bottom of the outer housing 1102 illustrated in FIG. 11 that includes the outlet 1114. The bottom of the housing 1102 similarly includes a plurality of branch channels 1702 that are arcuate passages directing the liquid to the outlet 1114. The fingers 1502 may be placed along each of the branch channels 1702.

FIG. 18 is an exploded perspective view of the inner housing 1104 illustrated in FIG. 11 that includes the centering rod 1106. Also included in the inner housing 1104 are the bushings 1116, the paddles 1118, a first hub 1802, a second hub 1804, a rotor 1806 and a stator 1808. The centering rod 1106 may extend through the inner housing 1104 along a central axis 1812 and cooperatively operate with the bushings 1116 to provide a centering function for the stator 1808. The bushings 1116 may be formed to axially fit within a bushing aperture 1816 formed in a first end of each of the first and second hubs 1802 and 1804.

The first and second hubs 1802 and 1804 may be formed of plastic, carbon fiber or any other rigid material. Each of the first and second hubs 1802 and 1804 may be generally cylindrical and form a cavity having an open end 1818. The open end 1818 may be at a second end opposite the first end that includes the bushing aperture 1816. The first and second hubs 1802 and 1804 may be coupled together at the open ends 1818 to form the outer surface 1120 (FIG. 11) of the inner housing 1104.

Each of the first and second hubs 1802 and 1804 include a retaining ring 1820. The retaining ring 1820 includes a plurality of lugs 1822 extending outwardly around the edge of the open end 1818 parallel with the central axis 1812. A plurality of slots 1824 may be formed between each of the lugs 1822 in the retaining ring 1820. The lugs 1822 may be aligned to adjacently contact each other when the first and second hubs 1802 and 1804 are coupled at the open ends 1818. Thus the slots 1824 may also be aligned between the first and second hubs 1802 and 1804 to form apertures.

The first and second hubs 1802 and 1804 also include a plurality of vents 1826 that may be sequentially disposed concentrically around the outer surface of the inner housing 1104. The vents 1826 form apertures that allow liquid communication between the cavity inside the inner housing 1104 and the outside of the inner housing 1104. Accordingly, liquid may enter or exit the inner housing 1104 through the vents 1826.

When the inner housing 1104 rotates, liquid in the inner housing 1104 flows out through the vents 1826 due to the rotation-related centrifugal force that is created. Thus, fluid impedance losses due to liquid inside the inner housing 1104 are minimized by ongoing evacuation of the liquid through the vents 1826 when the inner housing 1104 rotates at high RPM. The rotating inner housing 1104 may therefore maintain the cavity substantially empty of liquid. The cavity may be substantially dry and filled with air (or some other gas). Although the cavity may be wet, the cavity may remain absent amounts of liquid of sufficient quantity to affect efficient operation. The vents 1826 may also provide airflow through the inner housing 1104 for cooling.

Within the cavity formed in each of the first and second hubs 1802 and 1804 is a plurality of keepers 1828 extending outward from the first and second hubs 1802 and 1804 towards the central axis 1812. The keepers 1828 may be positioned a determined distance apart to form a plurality of notches 1830 between the keepers 1828. The keepers 1828 may be formed as an integral part of the first and second hubs 1802 and 1804. Alternatively, the keepers 1828 may be formed separately of plastic, metal, carbon fiber or any other rigid material that may be coupled with an interior surface of each of the first and second hubs 1802 and 1804 within the respective cavities.

The rotor 1806 may include a keeper ring 1834 and a magnet 1836. The keeper ring 1834 may be a cylindrical sleeve formed with iron or other similar ferrous (or non-ferrous) material. When the first and second hubs 1802 and 1804 are coupled together, a portion of the keeper ring 1834 may be positioned in the cavity of each of the first and second hubs 1802 and 1804. The keeper ring 1834 may couple with keepers 1828 within each of the first and second hubs 1802 and 1804 such that the keeper ring 1834 rotates with the inner housing 1104. The keeper ring 1834 may be configured as a flux concentrator to operate with the magnet 1836 to improve generator efficiency.

The magnet 1836 may be coupled with the keeper ring 1834, and also rotate with the inner housing 1104. The magnet 1836 may be a permanent magnet, such as a sintered or bonded neodymium iron boron (NdFeB) rare earth magnet. The magnet 1836 may be formed as a continuous single structure with the desired number of north and south poles configured along the structure. Alternatively, a plurality of individual magnets may be aligned and coupled with the keeper ring 1834.

The back EMF of the generator may be advantageously reduced by coupling the magnet 1836 directly with the keepers 1828. Thus, the keeper ring 1834 may be eliminated. As previously discussed, reduction in the back EMF allows for faster acceleration, which may be advantageous with some loads, such as providing "instant on" capability of a UV light source.

The stator 1808 may be formed with a plurality of poles 1840 wound with one or more stationary windings (not shown) as previously discussed. The poles 1840 may be metal laminations that are coupled with a mounting plate 1842. The mounting plate 1842 may be a metal, plastic or any other rigid material and may be coupled with the centering rod 1106. The stator 1808 may be positioned in the cavity formed by the first and second hubs 1802 and 1804 such that the magnet 1836 is positioned around the stator 1808 adjacent the poles 1840 with an air gap in between.

The stator 1808 may be operated wet or dry since the winding(s) may be sealed with a non-conducting material, such as an enamel coating on the wire used to form the windings. Alternatively, the winding(s) may be over-molded with plastic, rubber or some other waterproof material. In addition to providing water resistance, such over-molding may also reduce edges and other features of the stator 1808 that may contribute to fluid impedance losses when the inner housing 1104 is rotated at high velocity around the stator 1808.

The combination of the rotor 1806 and the stator 1808 may form a generator that generates three phase power. Alternatively, the generator may generate single phase power. Power generated by the generator may be provided on a power supply line 1844. The power supply line 1844 may be electrically connected to the winding(s) of the stator 1808. The power supply line 1844 may be routed through a passage extending along the central axis 1812 through the centering rod 1106. In addition to power, the rotation of the rotor and/or the power produced may be monitored to perform flow-based measurements.

The air gap between the stator 1808 and the magnet 1836 may be maintained by the magnetic field of the magnet 1836 in combination with the centering rod 1106 and the surrounding bushings 1116. The stator 1808 may be coupled with the centering rod 1106. Accordingly, upon rotation of the inner housing 1104, and therefore the rotor 1806, the rotating magnetic field induces the production of electric power in the winding(s) of the stator 1808.

During operation, the inner housing 1104 may be rotated at relatively high revolution-per-minute (RPM), such as above 5000 RPM, by a single high-velocity stream of liquid. The relatively high RPM may be achieved due to the relatively small size of the inner housing 1104 and minimized fluid impedance losses. The diameter of the generally cylindrical inner housing 1104 may be less than about 40 millimeters, such as in a range of about 40 millimeters to about 10 millimeters. Since the diameter of the nozzle outlet 1124 (FIG. 11) of the nozzle 1108 (FIG. 11) may be in a range of about 1.9 millimeters to about 0.8 millimeters, the diameter of the nozzle outlet 1124 is between about 4.75% and about 8% of the diameter of the housing 1104.

The rotational speed of the inner housing 1104, and therefore the amount of power produced by the generator, may be based on the velocity of the stream of liquid extruded by the nozzle 1108 (FIG. 11) and the diameter of the inner housing 1104. Thus, for a range of diameters of the nozzle outlet 1124 (FIG. 11) of the nozzle 1108 (FIG. 11) and a range of diameters of the inner housing 1104 within a range of liquid pressures and flow rates, a range of power may be output. For example, a range of diameter of the nozzle outlet 1124 of the nozzle 1108 between about 0.8 millimeters and about 1.9 millimeters may extrude between about 0.44 liters/min and about 4.16 liters/min (about 0.115 gal/min and about 1.1 gal/min). The flow rate may be based on a pressure range at the nozzle inlet 1122 (FIG. 11) between about 34 kPa and about 413 kPa (about 5 lb/sq. in and about 60 lb/sq. in). The resulting rotation of the inner housing 1104 may produce between about 0.25 watts and about 30 watts of power. Power from the generator in this example range can drive a UV lamp or an electronics assembly directly and/or may be rectified to charge an energy storage device such as a capacitor, a super capacitor, an ultra capacitor and/or a battery.

The magnet 1836 may also provide balancing and alignment of the inner housing 1104. The weight of the magnet 1836 may be configured to spin balance the rotation of the inner housing 1104 to increase efficiency. Thus, the inner housing 1104 may rotate smoothly at a high RPM with minimized vibration or other effects associated with unbalanced rotation. As previously discussed, the weight of the magnet 1836 may also be minimized due to the efficient power production at high RPM.

In addition, the magnetic field of the magnet 1836 may maintain the alignment of the rotor 1806, and therefore the inner housing 1104, with the stator 1808. The substantially equally distributed magnetic field of the magnet 1836 may axially align the rotor 1806 and stator 1808. Accordingly, the inner housing 1104 may also be axially aligned with the centering rod 1106. The bushings 1116 and the centering rod 1106 may assist in axially aligning the inner housing 1104, however the inner housing 1104 may be suspended in axial alignment with the centering rod 1106 by the magnetic field of the magnet 1836. Thus, frictional losses between the surrounding rotating bushings 1116 and the non-rotating centering rod 1106 may be minimized. In addition, the magnetic field may maintain the positional relationship of the inner housing 1104 with the stator 1808 when the hydro power generator 12 is mounted vertically, horizontally, etc. without the use of stays, latches or any other mechanisms to maintain relative positioning.

As illustrated in FIGS. 11 and 18, the paddles 1118 may form a ring concentrically surrounding the inner housing 1104. The paddles 1118 may be individually manufactured parts that are coupled with the outer surface of the inner housing 1104. Each of the paddles 1118 may be maintained in position in one of the notches 1824 to form the ring when the first and second hubs 1802 and 1804 are coupled together. Alternatively, the paddles 1118 may be individually coupled or coupled as a group to the first and/or second hubs 1802 and 1804 by gluing, welding, friction fit or any other mechanism.

The paddles 1118 may be individually manufactured and then assembled in a ring to reduce costs and improve manufacturability. In addition, the diameter of the inner housing 1104, and therefore the diameter of the ring of the paddles 1118 may be varied without substantial changes to the geometry of the individual paddles 1118. The configuration of each of the individual paddles 1118 as well as the retainer rings 1820 in each of the first and second hubs 1802 and 1804 may cooperatively operate to maintain the position of the paddles 1118 in the notches 1824.

FIG. 19 is a perspective view of an example one of the paddles 1118 illustrated in FIG. 18. The illustrated paddle 1118 may be generally concaved and includes a base 1902, a first paddle section 1904, a second paddle section 1906 and a slot 1908. The base 1902 may be formed to fit within adjoining slots 1824 (FIG. 18) of the first and second hubs 1802 and 1804 (FIG. 18). The base 1902 may include a lower surface 1912 and a foot 1914. The lower surface 1912 may be curved with a predetermined radius of curvature similar to the radius of curvature of the interior surface of the first and second hubs 1802 and 1804 (FIG. 18). The foot 1914 may be generally triangular in shape and include a first angled surface 1916, a second angled surface 1918 and a face surface 1920.

Referring now to FIGS. 18 and 19, when the paddle 1118 is mounted in the inner housing 1104, the base 1902 may be disposed in adjacently positioned notches 1824 of each of the first and second hubs 1802 and 1804. The foot 1914 of each paddle 1118 may be held in the notches 1824 by the lugs 1822 on the first and second hubs 1802 and 1804. In the illustrated example, the first and second angled surfaces 1916 and 1918 may be adjacently contacting one of the lugs 1822 on the each of the first and second hubs 1802 and 1804, respectively. In addition, the face surface 1920 may be adjacently contacting an adjacently mounted paddle 1118.

FIG. 20 is a cross-sectional top view of the paddle 1118 of FIG. 19 that illustrates the first and second paddle sections 1904 and 1906 and the foot 1914. Also illustrated is a back surface 2002 of the paddle 1118. When the paddle 1118 is mounted on the inner housing 1104 (FIG. 11), the back surface 2002 may be adjacently contacting the face surface 1920 (FIG. 19) of the foot 1914 of an adjacently mounted paddle 1118. Thus, the base 1902 (FIG. 19) of the paddle 1118 is effectively held in place by the combination of the lugs 1822 (FIG. 18) and the paddles 1118 positioned adjacently in the ring of paddles 1118. The base 1902 of each of the paddles 1118 may form a portion of an unbroken concentric ring adjacent to the outer surface of the inner housing 1104. The paddles 1118 may be held in position by friction fit, gluing, welding or any other coupling mechanism or material.

Referring again to FIG. 19, the first and second paddle sections 1904 and 1906 may each provide a separate cup or depression capable of accepting a high velocity stream of liquid. As best illustrated in FIG. 20, each of the first and second paddle sections 1904 and 1906 may be elliptical to optimize the flow of liquid striking the paddle sections 1904 and 1906. The slot 1918 allows the stream of liquid to efficiently strike each of the paddles 1118 as the inner housing 1104 (FIG. 11) rotates at high RPM.

The previously described hydro-power generation system 12 may also include capabilities of a water treatment system. In one example, the hydro-power generation system may be mounted to a faucet or other plumbing fixture. The inlet of the faucet mounted hydro-power generation system 12 may be coupled to the water outlet end of the faucet. The hydro-power generation system 12 may include a carbon filter and an ultraviolet (UV) lamp in addition to the previously discussed power generation capability. In addition, the hydro-power generation system 12 may include a liquid diverter to bypass the hydro-power generation system 12 when treated water is not desired. The hydro-power generation system 12 may also include a processing device, such as a microprocessor, to monitor the UV lamp and filter life. The hydro-power generation system 12 may provide liquid flow detection as previously discussed for use in monitoring filter life. In addition, end of life of the UV lamp may be monitored with the microprocessor. Further, switching of taps and/or coils may be dynamically directed by the microprocessor to provide a first voltage for initial energization of the UV lamp and continued energization of the UV lamp as previously discussed.

Other applications involving a pressurized flow of liquid that require a power source may also be provided by the hydro-power generation system 12. For example, plumbing fixtures with motion detectors, electrically operated valves or any other device requiring an electric power source to operate may be included as part of the hydro-power generation system 12.

Figure 21:
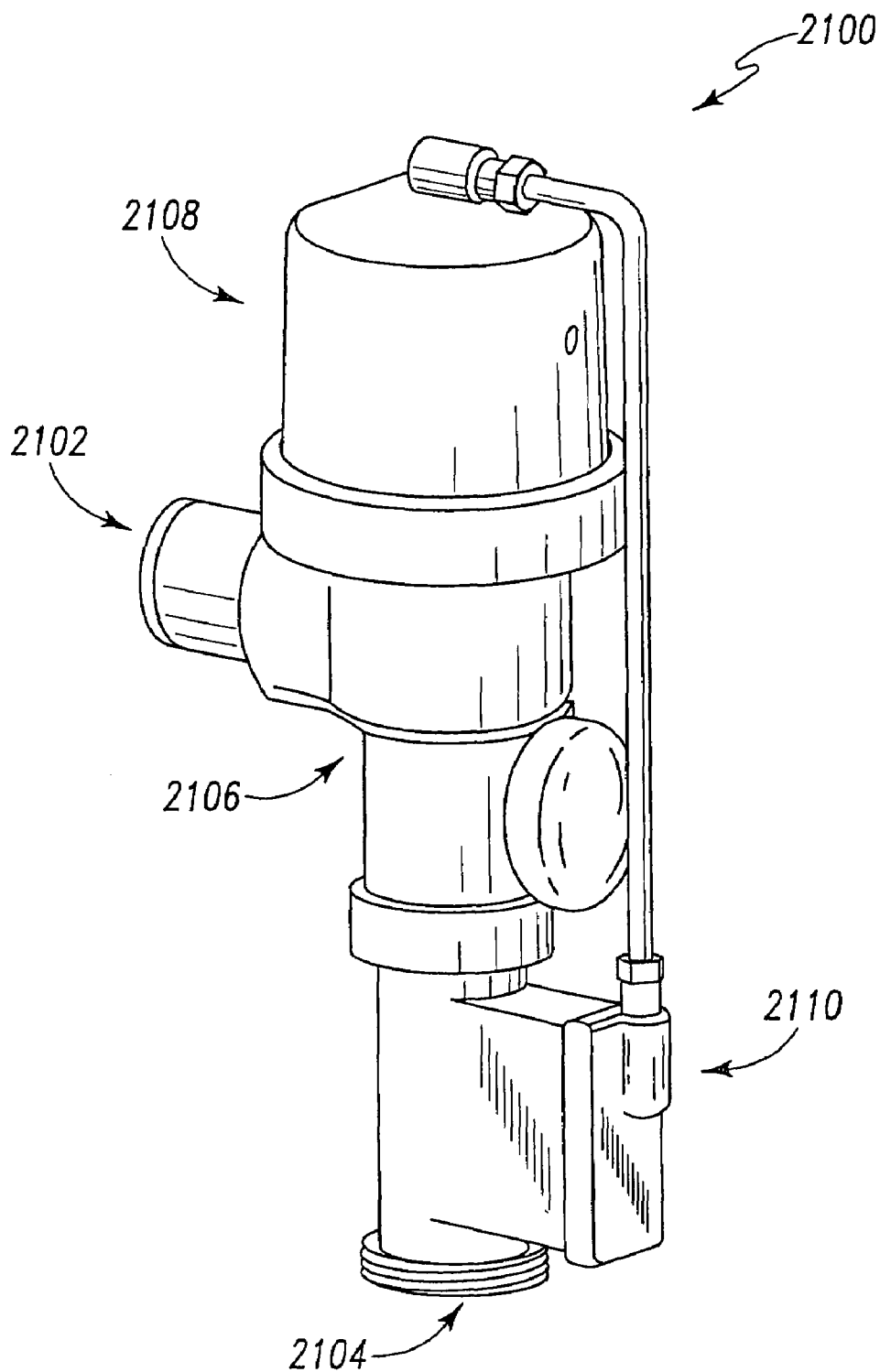
FIG. 21 represents a perspective view of a hydro-power generation system that includes a plumbing fixture.

FIG. 21 is perspective view of an example plumbing fixture 2100 for a toilet, such as a stool or urinal that is included as part of the hydro-power generation system. The plumbing fixture 2100 includes a water inlet 2102 for receiving water and a water outlet 2104 for discharging water. The plumbing fixture 2100 also includes a valve module 2106, an electronics module 2108 and a power generation module 2110. In other examples, a faucet, a shower or any other plumbing fixture having a control valve, a water inlet and a water outlet may similarly be included in the hydro-power generation system. As used herein, the term "plumbing fixture" is defined to include lavatory related devices such as faucets, toilet flush mechanisms, sprayers and showers. In addition, plumbing fixtures may include sprinklers, fountains and any other devices and mechanisms used to control and/or channel the flow of liquids at pressures less than about 1034 kPa (about 150 lbs./sq. inch).

Figure 22:
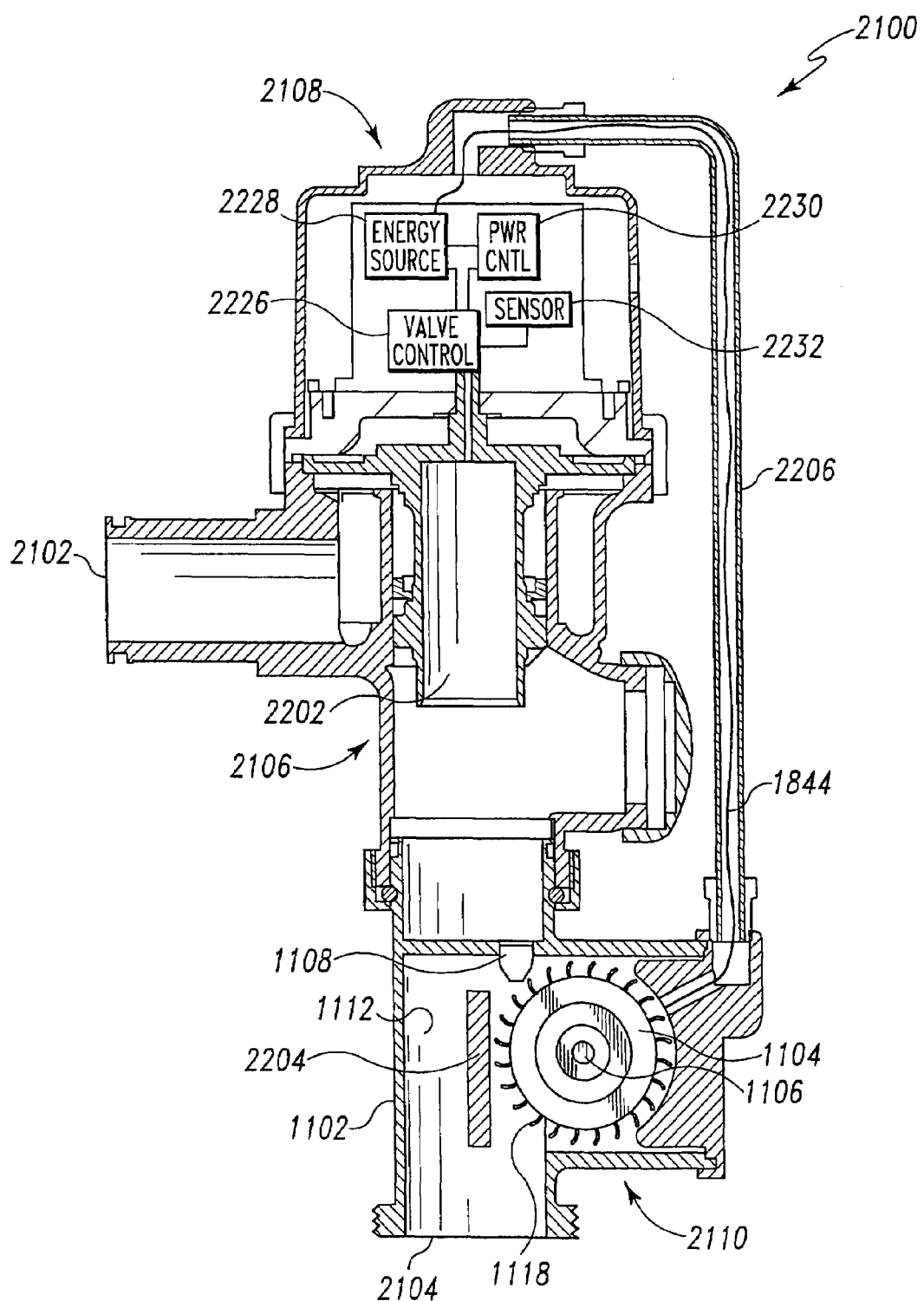
FIG. 22 represents a cross-sectional side view of the plumbing fixture illustrated in FIG. 21.

FIG. 22 is a cut away side view of the example plumbing fixture 2100 illustrated in FIG. 21 that includes the inlet 2102, the outlet 2104, the valve module 2106, the electronic module 2108 and the power generation module 2110.

The valve module 2106 includes an electrically operated valve 2202. The electrically operated valve 2202 may be any electro-mechanical valve device capable of being actuated with voltage and current to open and close a liquid flow path. Upon energization, the electrically operated valve 2202 may move to a position that opens a liquid flow path through the valve module 2106. When the liquid flow path is opened, pressurized liquid supplied at the inlet 2102 may flow through the valve module 2106 and the power generation module 2110 to the outlet 2104. Upon de-energization, the electrically operated valve 2202 may close off the liquid flow path stopping the flow of liquid through the valve module 2106 and the power generation module 2110.

The power generation module 2110 includes the outer housing 1102, the inner housing 1104, the centering rod 1106 and the nozzle 1108 that are similar to the embodiments discussed with reference to FIGS. 11-20. Accordingly, a detailed discussion of these features will not be repeated. In other examples, features and/or components similar to any of the other previously discussed embodiments may be included in the power generation module 2110. The outer housing 1102 also includes a scupper 2204 to channel liquid toward the outlet 2104 following impact with the inner housing 1104. The inner housing 1102 may be removed from the plumbing fixture as a unit for maintenance and/or repair. Pressurized liquid provided to the inlet 2102 is accelerated to a high velocity by the nozzle 1108 and directed in a stream of liquid at the paddles 1118 positioned on the outer surface of the inner housing 1104.

The majority of the kinetic energy in the high velocity stream of liquid is translated to rotational energy to rotate the inner housing 1104 at high RPM. The liquid falls by gravity to the water outlet 2104 of the plumbing fixture 2100. Liquid spray within the cavity of the outer housing 1102 may also be channeled to the water outlet 2104 by the configuration of the interior surface 1112 of the outer housing 1102 and the scupper 2204. High RPM rotation of the inner housing 1104 produces electric power with the permanent magnet generator included in the inner housing 1104. Power may be produced by the generator on the power supply line 1844. The power supply line 1844 may be routed through the passage in the centering rod 1106 and a conduit 2206 to the electronic module 2108.

The electronic module 2108 may include any electrical related circuitry and components for the plumbing fixture 2100. The electronic housing 2108 may include a valve controller 2226, an energy storage device 2228, a power controller 2230 and a sensor 2232. The valve controller 2226 may be part of the electrically operated valve 2202, and may be any device capable of actuating the opening and closing of the electrically operated valve 2202 using voltage and current. The valve controller 2226 may include an electric motor, a rotary actuator, a solenoid or any other device capable of moving a valve mechanism. In addition, the valve controller 2226 may include limit switches or any other form of position sensing device(s) to determine the position of the electrically operated valve 2202. The valve controller 2226 may be powered by the energy storage device 2228.

The energy storage device 2228 may be a battery and/or a capacitor and/or any other circuit or device(s) capable of storing energy in the form of voltage and current. The power controller 2230 is coupled with the valve controller 2226 and the energy storage device 2238. The power controller 2230 may be any circuit or device capable of monitoring a magnitude of voltage in the energy storage device 2228 and controlling operation of the electrically operated valve 2202.

During operation, the magnitude of voltage in the energy storage device 2228 is monitored by the power controller 2230. When the voltage falls below a determined threshold, the electrically operated valve 2202 may be activated to open by the power controller 2230. Power may be supplied from the energy storage device 2228 to the valve controller 2226 to actuate the electrically operated valve 2202. When the electrically operated valve 2202 is opened, pressurized liquid flows through the valve module 2106 to the nozzle 1108. The high velocity stream of pressurized liquid is directed by the nozzle 1108 at the inner housing 1104 to generate electric power. The electric power is used to re-charge the energy storage device 2228.

The sensor 2232 may also activate the electrically operated valve 2202. The sensor 2232 may be a motion sensor, a temperature sensor or any other form or sensing device capable of sensing one or more parameters in the environment around the plumbing fixture 2100. In this example, the sensor 2232 may be a motion sensor capable of sensing motion. In response to motion, the sensor 2232 may actuate the electrically operated valve 2202 to open using power from the energy storage device 2228. The energy storage device 2228 may subsequently be recharged by power from the generator in the power generation module 2110 resulting from the flow of liquid.

Figure 23:
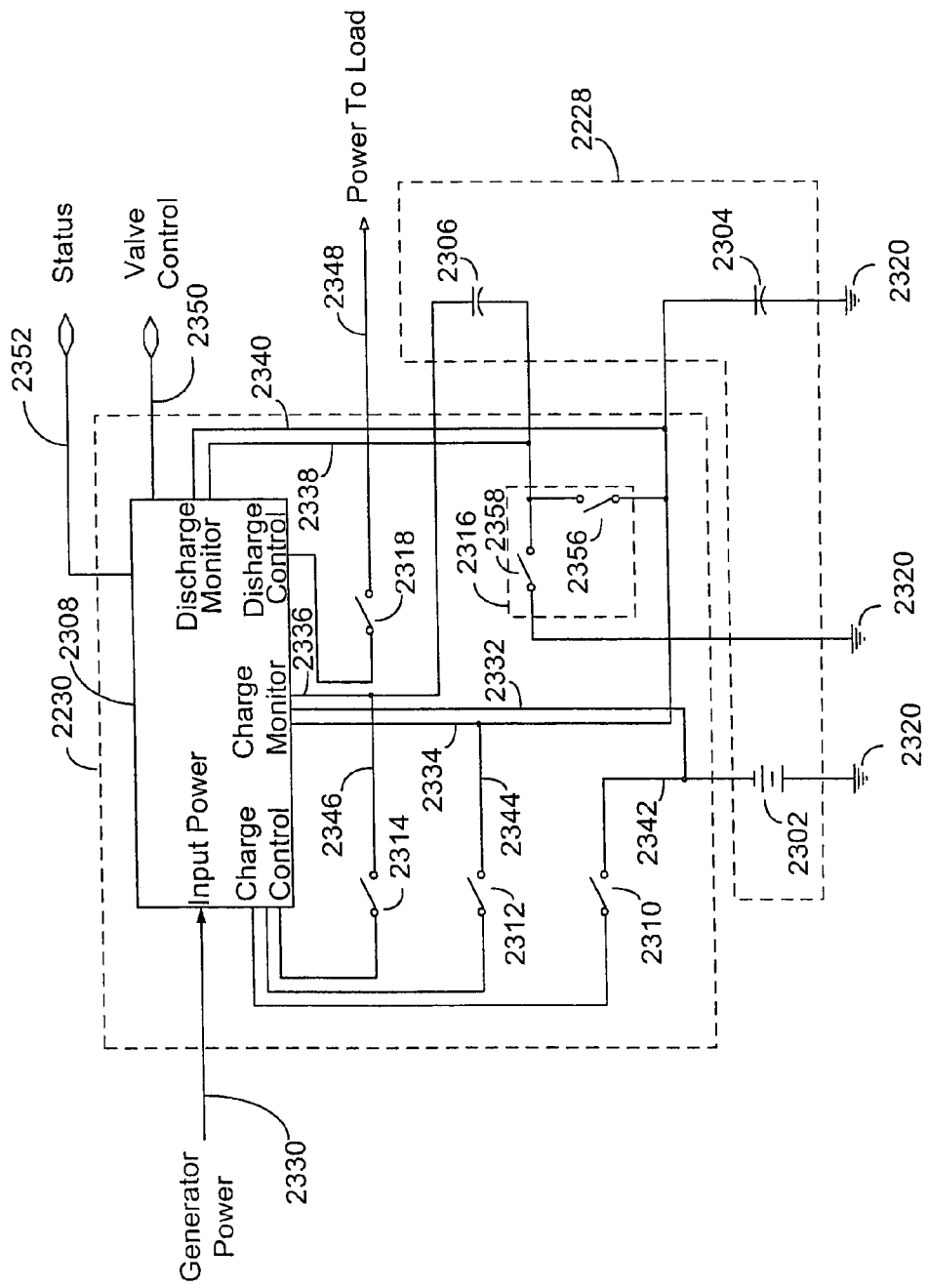
FIG. 23 represents a schematic diagram of an example of a power controller included in the plumbing fixture of FIG. 22.

FIG. 23 is a circuit diagram of an example of the energy storage device 2228 and the power controller 2230. The illustrated energy storage device 2228 includes a first energy storage device 2302, a second energy storage device 2304 and a third energy storage device 2306. The power controller 2230 includes a processor 2308, a first charging switch 2310, a second charging switch 2312, a third charging switch 2314, a series/parallel switch 2316 and a load control switch 2318. In other examples, fewer or greater numbers of energy storage devices and switches may be utilized.

The first, second and third energy storage devices 2302, 2304 and 2306 may be any device capable of storing electric power. In the illustrated example, the first energy storage device 2302 is a battery and the second and third energy storage devices 2304 and 2306 are capacitors to maximize discharge performance. The capacitors may be one or more electrolytic capacitors or electrochemical capacitors such as super capacitors and/or ultra capacitors. In other examples, batteries, capacitors, or any configuration of batteries and capacitors may be used. Each of the first and second energy storage devices 2302 and 2304 are electrically connected with a ground connection 2320. The third energy storage device 2306 may be electrically connected with the ground connection 2320 by the series/parallel switch 2316.

The processor 2308 may be any form of computing device capable of executing instructions to monitor inputs and providing outputs. Inputs to the processor 2308 include input power supplied from the generator in the power generation module 2110 (FIG. 21) on a power input line 2330. The power supplied by the generator may be three phase or single phase AC power that is rectified with one or more diodes to provide DC power to the processor 2308.

Other inputs to the processor 2308 include a first charge indication for the first energy storage device 2302 on a first charging line 2332 and a respective second and third charging indication for the respective second and third energy storage devices 2304 and 2306 on second and third respective charging lines 2334 and 2336. The charging lines 2332, 2334 and 2336 indicate to the processor 2308 the amount of the charge stored in the respective energy storage devices 2302, 2304 and 2306. In addition, in the illustrated example, a first discharge indication and a second discharge indication are provided as inputs to the processor 2308 on a first discharge line 2338 and a second discharge line 2340, respectively. The first discharge indication provides the amount of discharge of the capacitor that is the second energy storage device 2304. The amount of discharge of the capacitor that is the third energy storage device 2306 is provided by the second discharge indication.

Outputs from the processor 2308 include control signals to control operation of the first charging control switch 2310, the second charging control switch 2312 and the third charging control switch 2314. Energization of the first charging control switch 2310 may provide a first charging voltage to the first energy storage device 2302 on a first charging line 2342. A second charging voltage may be provided to the second energy storage device 2304 on a second charging line 2344 when the second charging control switch 2312 is closed. The third charging control switch 2314 may be energized to provide a third charging voltage to the third energy storage device 2306 on a third charging line 2346.

The processor 2308 may also provide output control signals to direct the load control switch 2318 to control the voltage on a load supply line 2348. The load supply line 2348 may provide power to a load. In this example, the load includes the electrically operated valve 2202 (FIG. 22) and the electronics included in the electronics module 2108 (FIG. 21). In other examples, any other load may be supplied from the load supply line 2348.

Power on the load supply line 2348 may be supplied by the processor 2308 from the generator in the power generation module 2110 and/or from the charge stored on one or more of the energy storage devices 2302, 2304 and 2306. For example, when the generator is producing power, the processor 2308 may provide that power directly to the load on the load supply line 2348. In addition, the processor 2308 may provide charging voltage(s) to charge one or more of the energy storage devices 2302, 2304 and 2306 with the power produced by the generator. Alternatively, when, for example, the generator is not producing power (or not producing enough power), the processor 2308 may provide power on the load supply line 2348 from the charge stored in one or more of the energy storage devices 2302, 2304 and 2306.

The processor 2308 may also provide a control output on a valve control line 2350 to control operation of the electrically operated valve 2202. Outputs from the processor 2308 on a status line 2352 may provide operational status. Operational status may include error indications, the state of the charge on the energy storage devices 2302, 2304 and 2306, the position of the electrically operated valve 2202 (FIG. 22), or any other operationally related indications or parameters. The status line 2352 may be coupled with any form of user interface, such as light emitting diode (LEDs), a display, an audible alarm, etc.

The series/parallel switch 2316 includes a series switch 2356 and a parallel switch 2358. The processor 2308 may provide outputs to direct operation of the series switch 2356 and the parallel switch 2358. The series switch 2356 and the parallel switch 2358 may configure the second and third energy storage devices 2304 and 2306 in a parallel configuration or a series configuration.

In the parallel configuration, a lower magnitude of discharge voltage may be supplied individually to the load by the second and third energy storage devices 2304 and 2306. In the series configuration a higher magnitude of discharge voltage may be supplied to the load by the combined discharge of the second and third energy storage devices 2304 and 2306. The processor 2308, the charging control switches 2310, 2312 and 2314, the series/parallel switch 2316 and the load control switch 2318 may be implemented with an application specific integrated circuit (ASIC). Alternatively, separate components, or separate groups of components may be utilized.

Instructions stored in memory may be executed by the processor 2308 to provide charge and discharge control of the first, second and third energy storage devices 2302, 2304 and 2306. Control with the processor 2308 may be based on determined threshold voltages, determined threshold charge levels and the input power supplied by the generator in the power generation module 2110. A first threshold voltage may be a magnitude of input voltage supplied from the generator and/or one or more of the energy storage device 2302, 2304 and 2306. A second threshold voltage may be an output voltage supplied on the load supply line 2348.

The determined threshold charge levels of each of the energy storage devices 2302, 2304 and 2306 may be a fully charged condition that may be determined based on the characteristics of the individual energy storage devices. First, second and third discharge level thresholds for each of the respective energy storage devices 2302, 2304 and 2306 may also be determined. Each of the discharge level thresholds may include a discharge limit and a discharge cutoff. The discharge limit may indicate depletion of the charge level to some level below the fully charged condition. The discharge cutoff may indicate depletion of the charge below a maximum desired level of charge depletion.

In addition, the processor 2308 may include timing capability to provide indication of the status of the energy storage devices 2302, 2304 and 2306. A charge timer may be activated by the processor 2308 to begin timing when one of the energy storage devices is being charged. Based on the charge indication(s) on the charging line(s) of the particular energy storage device(s) being charged, the timing of the charge timer may be used to determine a percentage of fully charged, a charging rate, etc. The charge related determinations may be provided on the status line 2352. Similarly, a discharge timer may be enabled by the processor 2308 to begin timing during a discharge cycle of each of the second and third energy storage devices 2304 and 2306. The discharge indications on the respective discharge lines 2338 and 2340 may be used by the discharge timer to indicate the percentage of discharge, the discharge rate, etc. of each of the second and third energy storage devices 2304 and 2306 on the status line 2352.

When the generator in the power generation module 2110 is producing power, the processor 2308 may selectively charge one or more of the energy storage devices 2302, 2304 and 2306. For example, when the flow of liquid is relatively high at a relatively high pressure, the generator may produce abundant amounts of power at a relatively high voltage. Under these conditions, the processor 2308 may enable the first charging switch 2310, the second charging switch 2312 and the third charging switch 2314 at the same time to charge all of the energy storage devices 2302, 2304 and 2306. Alternatively, when less or lower voltage power is produced, the processor 2308 may activate fewer than all of the first, second and third charging switches 2310, 2312 and 2314.

During operation, when the charge stored in one or more of the energy storage devices 2302, 2304 and 2306 is above the determined discharge limit, the load control switch 2318 may be enabled by the processor 2308 to supply power to the load. When the load consumes power and therefore discharges one or more of the energy storage devices 2302, 2304 and 2306 below the discharge limit, the processor 2308 may activate the electrically operated valve 2202 (FIG. 22) to open with a control signal on the valve control line 2350. As previously discussed, the flow of liquid through the plumbing fixture

2100 (FIG. 21) and the power generation module 2110 induces the production of power by the generator.

Upon sensing input power on the power input line 2330, the processor 2308 may activate one or more of the charging switches 2310, 2312 and 2314 to re-charge the respective energy storage devices 2302, 2304 and 2306. If the energy storage devices 2302, 2304 and 2306 continue to discharge to the cutoff limit, the load control switch 2318 may be disabled by the processor 2308. Upon loss of power to the load on the load supply line 2348, the electrically operated valve 2202 (FIG. 22) may remain open and the generator in the power generation module 2110 may continue to supply power. Alternatively, upon loss of power, the electrically operated valve 2202 may close, input power from the generator may cease and power from the energy storage devices 2302, 2304 and 2306 may be used by the processor 2308 to indicate an error on the status line 2352. The error may be indicated with an indicator such as a flashing light emitting diode (LED).

During discharge of power from one or more of the energy storage devices 2302, 2304 and 2306, the processor 2308 may selectively switch the series/parallel switch 2316 to maximize the discharge time. In addition, voltage on the load supply line 2348 may be maintained by selectively switching the series/parallel switch 2316 as the discharge occurs to maximize efficiency. Further, the processor 2308 may convert the magnitude of the output voltage to other voltage magnitudes with selective switching of the series/parallel switch 2316. For example, an input voltage from the generator of about 6 VDC may be converted to 3 VDC by the processor 2308. In another example, 1.5 VDC supplied from the generator may be converted by the processor 2308 to 6 VDC.

Figure 24:
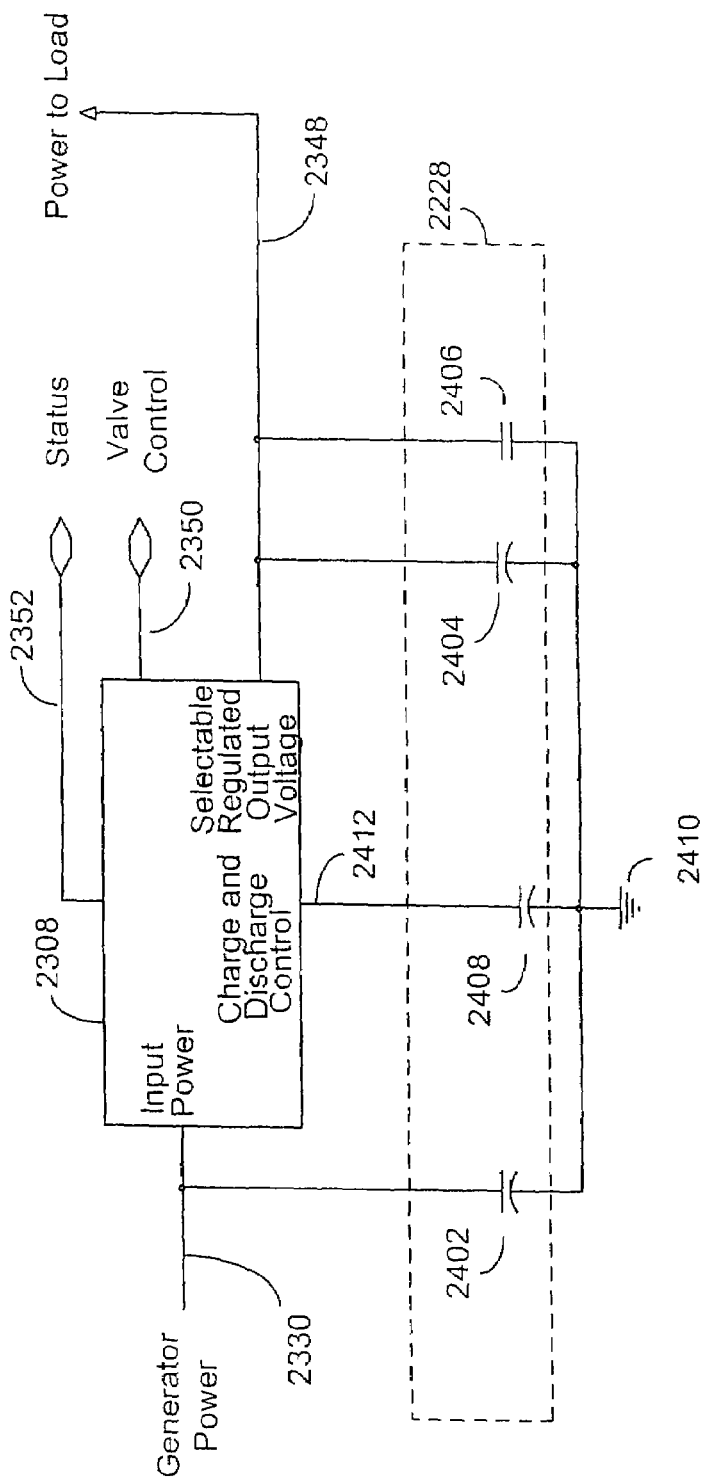
FIG. 24 represents a schematic diagram of another example of a power controller included in the plumbing fixture of FIG. 22.

FIG. 24 is another example circuit diagram of the energy storage device 2228 and the power controller 2230. In this example, the power controller 2230 includes the processor 2308. The energy storage device 2228 includes a plurality of energy storage devices comprising a first capacitor 2402, a second capacitor 2404, a third capacitor 2406 and a fourth capacitor 2408 electrically connected to a ground connection 2410. In other examples, other configurations and numbers of energy storage devices, such as a battery in place of the fourth capacitor 2408 may be used.

The processor 2308 may receive input power on the power input line 2330 from the generator in the power generation module 2110 (FIG. 21). The input power may also charge the first capacitor 2402. Thus, the processor 2308 may be provided with input power from the first capacitor 2402 when the generator stops producing power.

The processor 2308 may control the charge and discharge of the fourth capacitor 2408 with a charge control line 2412. Charging of the fourth capacitor 2408 may be with the power supplied on the power input line 2330. Discharge of the fourth capacitor 2408 may be based on the load being supplied with the load supply line 2348. The load may include the electrically operated valve 2202 (FIG. 22) and/or any other electronics in the electronics module 2108 (FIG. 21).

The processor 2308 may provide regulated output voltage to the load on the load supply line 2348. The power supplied on the load supply line 2348 may be from the generator, the first capacitor 2402 and/or the fourth capacitor 2408. The second and third capacitors 2404 and 2406 may provide noise suppression of any high frequency transients that may be present on the load supply line 2348.

Similar to the example of FIG. 23, the processor 2308 may sense depletion of the charge on the fourth capacitor 2408 below the discharge limit level and transmit a control signal on the valve control line 2350 to open the electrically operated valve 2202 (FIG. 22). The resulting flow of liquid may rotate the generator in the power generation module 2110 (FIG. 21) at high RPM to produce power on the power input line 2330. If the charge on the fourth capacitor 2408 becomes depleted to the discharge cutoff level, an error may be generated on the status line 2350, the electrically operated valve 2202 (FIG. 22) may be deenergized and power to the load may be discontinued.

Figure 25:
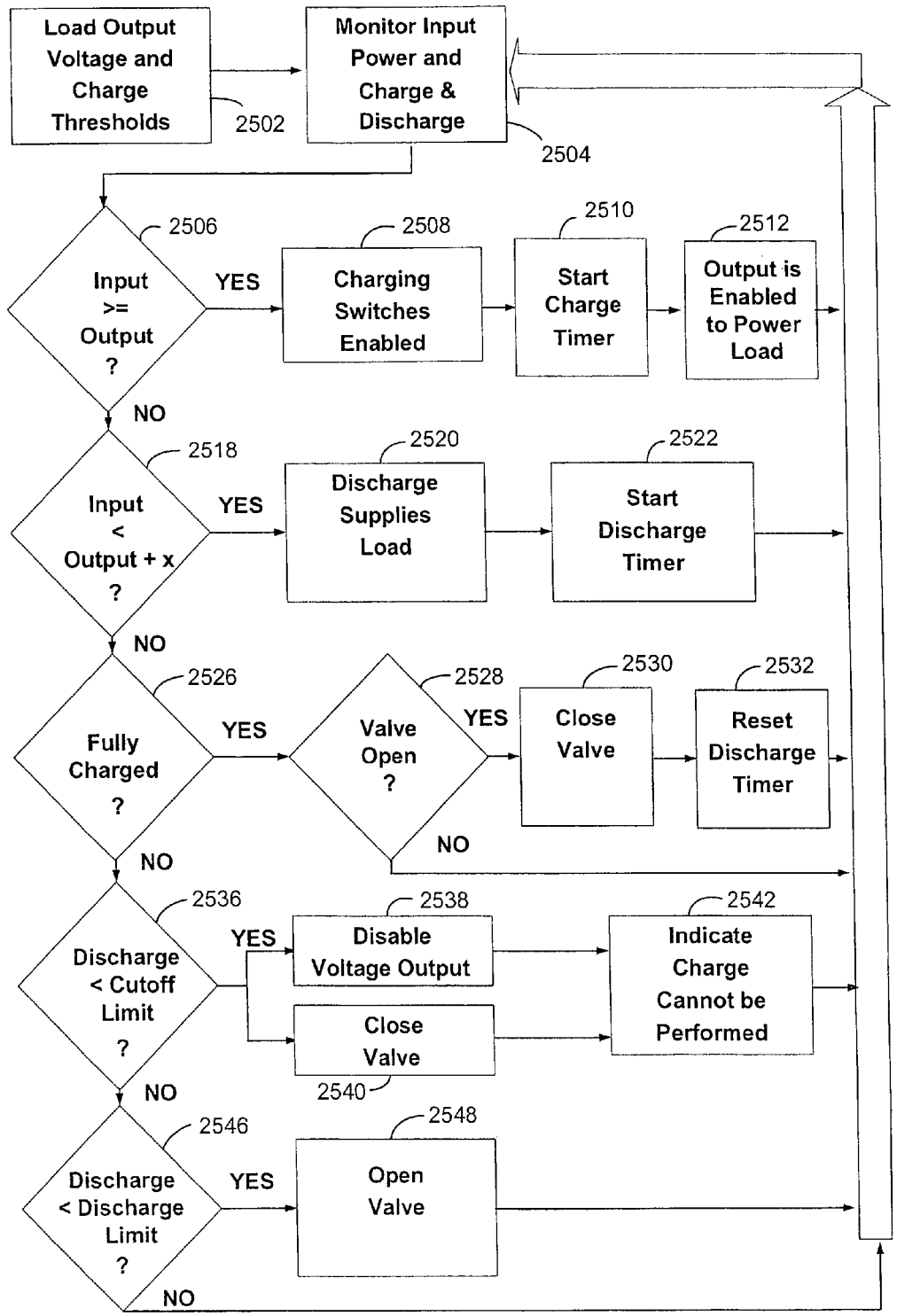
FIG. 25 is a process flow diagram illustrating operation of the hydro-power generation system within the plumbing fixture of FIGS. 21-24.

FIG. 25 is a process flow diagram illustrating example operation of the power controller 2230 of FIGS. 22-23. The operation begins at block 2502 when the desired output voltage to the load, the desired charge level and the desired discharge level thresholds (the discharge limit and the discharge cutoff) are established and stored in the processor 2308. The processor 2308 may execute instructions to monitor the supply voltage on the power input line 2330, and the charge and discharge voltages of the energy storage devices 2302, 2304 and 2306 at block 2504.

At block 2506, the processor 2308 determines if the magnitude of supply voltage is equal to or greater than the desired output voltage to the load. If the supply voltage is greater than the desired output voltage, the processor 2308 activates one or more of the charging switches 2310, 2312 and 2314 to enable the supply of power from the power input line 2330 to charge one or more of the energy storage devices 2302, 2304 and 2306 at block 2508. At block 2510, the processor 2308 may activate one or more charge timers to monitor charging of the energy storage device(s) 2310, 2312 and 2314. In addition, at block 2512, the processor 2308 may enable the supply of power from the input power line 2330 to the load on the load supply line 2348. The operation then returns to block 2504 to continue monitoring the voltages and charges.

If at block 2506, the supply voltage is not greater than or equal to the desired output voltage, the processor 2308 determines if the supply voltage on the input power line 2330 is less than the desired output voltage by a determined amount (x) at block 2518. If the supply voltage is less than the desired output voltage by at least the determined amount (x), the processor 2308 enables one or more of the energy storage devices 2302, 2304 and 2306 to begin discharging stored charge on the stored power lines 2332, 2334 and 2336 at block 2520. The processor 2308 may provide the stored charge as output voltage and current on the load supply line 2348 to supply the load. At block 2522, the processor 2308 may enable a discharge timer to monitor the discharge of power from each of the energy storage devices 2302, 2304 and 2306. The operation then returns to block 2504 to continue monitoring the voltages and charges.

If the supply voltage is not less than the desired output voltage at block 2518, the processor 2308 determines if all of the energy storage devices 2302, 2304 and 2306 are fully charged at block 2526. If all of the energy storage devices 2302, 2304 and 2306 are fully charged, the processor 2308 determines if the electrically operated valve 2202 is open at block 2528. If the electrically operated valve 2202 is not open, the operation returns to block 2504 and monitors the voltages. If the electrically operated valve 2202 is open, the processor 2308 sends a signal on the valve control line 2350 to close the electrically operated valve 2202 at block 2530. The generator in the power generation module 2110 stops producing electric power when the electrically operated valve 2202 is closed.

At block 2532, the discharge timer(s) is reset and the operation returns to block 2504 to monitor the voltages and charges. If the energy storage devices 2302, 2304 and 2306 are not all fully charged at block 2526, the processor 2308 determines if any of the energy storage devices 2302, 2304 and 2306 are discharged to less than the discharge cutoff at block 2536. If the energy storage devices 2302, 2304 and 2306 are discharged to less than the discharge cutoff, the processor 2308 disables the supply of output power on the output power line 2348 at block 2538. In addition, the processor 2308 sends a signal on the valve control line 2350 to close the electrically operated valve 2202 at block 2540. At block 2542, the processor 2308 provides indication on the status line 2352 that charging of the energy storage devices 2302, 2304 and 2306 cannot be performed. The operation then returns to block 2504 to monitor for the voltages and charges.

If at block 2536 none of the energy storage devices 2302, 2304 and 2306 are discharged to less than the discharge cutoff, the processor 2308 determines if any of the energy storage devices 2302, 2304 and 2306 are discharged to less than the discharge limit at block 2546. If any of the energy storage devices 2302, 2304 or 2306 are discharged to less than the discharge limit, the processor 2308 sends a control signal on the valve control line 2350 to open the electrically operated valve 2202 at block 2548. When the electrically operated valve 2202 is opened, the generator in the power generation module 2110 produces power on the power input line 2330. The operation returns to block 2504 to charge the energy storage devices 2302, 2304 and 2306 and supply power to the load from the generator. If at block 2546, none of the energy storage devices 2302, 2304 and 2306 are discharged to less than the discharge limit, the operation returns to block 2504 and monitors the voltages and charges.

In another example, similar to FIG. 21, the hydro-power generation system may include a plumbing fixture that is a faucet system. The faucet system may include the valve module 2106, the electronics module 2108 and the power generation module 2110. The generator in the power generation module 2110 may charge at least one energy storage device in the electronics module 2108. The power controller included in the electronics module 2108 may allow direct charging until the energy storage device(s) is charged. This will allow the faucet system to use stored power beyond the period of time that liquid is flowing through the faucet system. In addition, a simple manual momentary on push button can cause a flow of liquid to rotate the generator within the power generation module 2110 to re-charge the energy storage device(s) if the faucet system is not used for extended periods.

In yet another example, the hydro-power generation system may include a plumbing fixture that is a shower head. The shower head may include a radio and/or other waterproofed electronics. The radio may be waterproof and include AM, FM, compact disc or any other entertainment device. The hydro-power generation system may include features similar to the system illustrated in FIGS. 9 and 10. The generator resulting from the turbine spinning within the stator may be a power source for charging a capacitor, super capacitor or ultracapacitor. This provides a power source for the electronics that requires no maintenance cycle to replace the power source such as when the power source is a battery. The shower head may also include a shower timer with an alarm and pre-warning indicator to keep the shower timed. The alarm may be used to keep the length of the shower to a determined period of time. Further, the shower head may include a clock with a display that is lighted when the shower is running. During periods of no liquid flow, the clock may operate from the energy storage device without lighting to conserve power.

Figure 26:
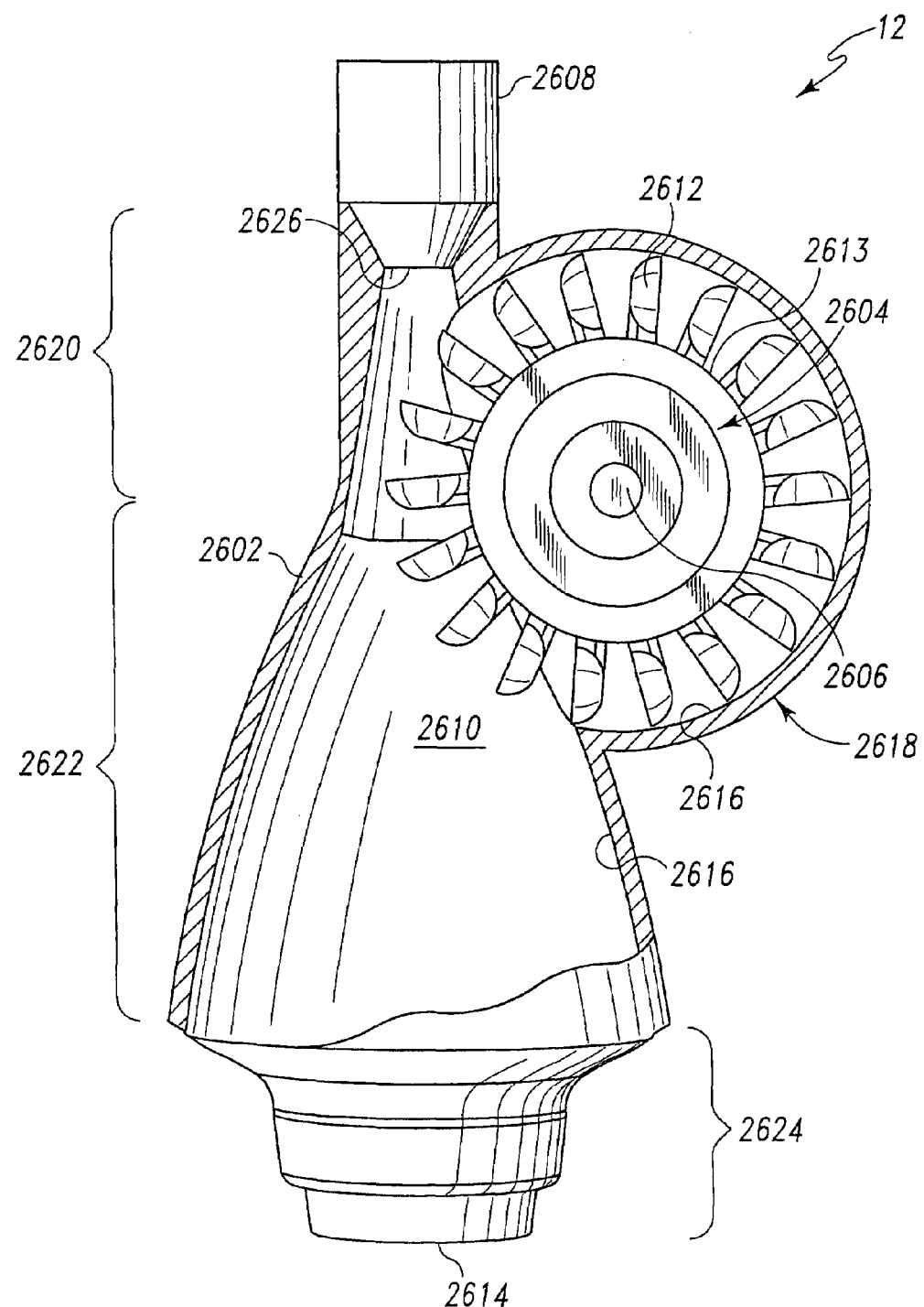
FIG. 26 represents a partially cross-sectioned side view of another embodiment of the hydro-power generation system.

FIG. 26 illustrates yet another example of the hydro-power generation system 12 that includes an outer housing 2602, an inner housing 2604, a centering rod 2606 and a nozzle 2608. The inner housing 2604 is positioned in a cavity 2610 formed within the outer housing 2602 and includes a plurality of paddles 2612 positioned on an outer surface 2613 of the inner housing 2604. The outer housing 2602 includes an outlet 2614 and an interior wall 2616. The features of the hydro-power generation system 12 illustrated in FIG. 26 are similar in many respects to the previously discussed examples of the hydro-power generation system. Thus, for purposes of brevity, the following discussion will focus on differences with the previously discussed examples.

In the illustrated example, the outer housing 2602 includes an inner housing section 2618, a nozzle section 2620, a drain section 2622 and a flow collection section 2624. The inner housing section 2618 is formed to adjacently surround a portion of the inner housing 2604. The paddles 2612 are positioned adjacent to the interior wall 2616 of the inner housing section 2618 to minimize liquid impedance. As in the previous examples, the interior wall 2616 within the inner housing section 2618 may include ducting (not shown) to channel liquid toward the outlet 2614.

The nozzle section 2620 forms the top of the outer housing 2602 and is configured to receive the nozzle 2608. The nozzle 2608 is positioned to penetrate the outer housing 2602 and direct a substantially vertical stream of liquid at the paddles 2612 of the inner housing 2604. The substantially vertical stream of liquid may be discharged from a nozzle outlet 2626 of the nozzle 2608 in a well-defined substantially laminar stream at relatively high velocity. The stream of liquid may substantially maintain the diameter of the nozzle outlet 2626 following discharge. Liquid spray may therefore be minimized and the kinetic energy in the stream of liquid may be focused in a relatively small area.

Figure 27:
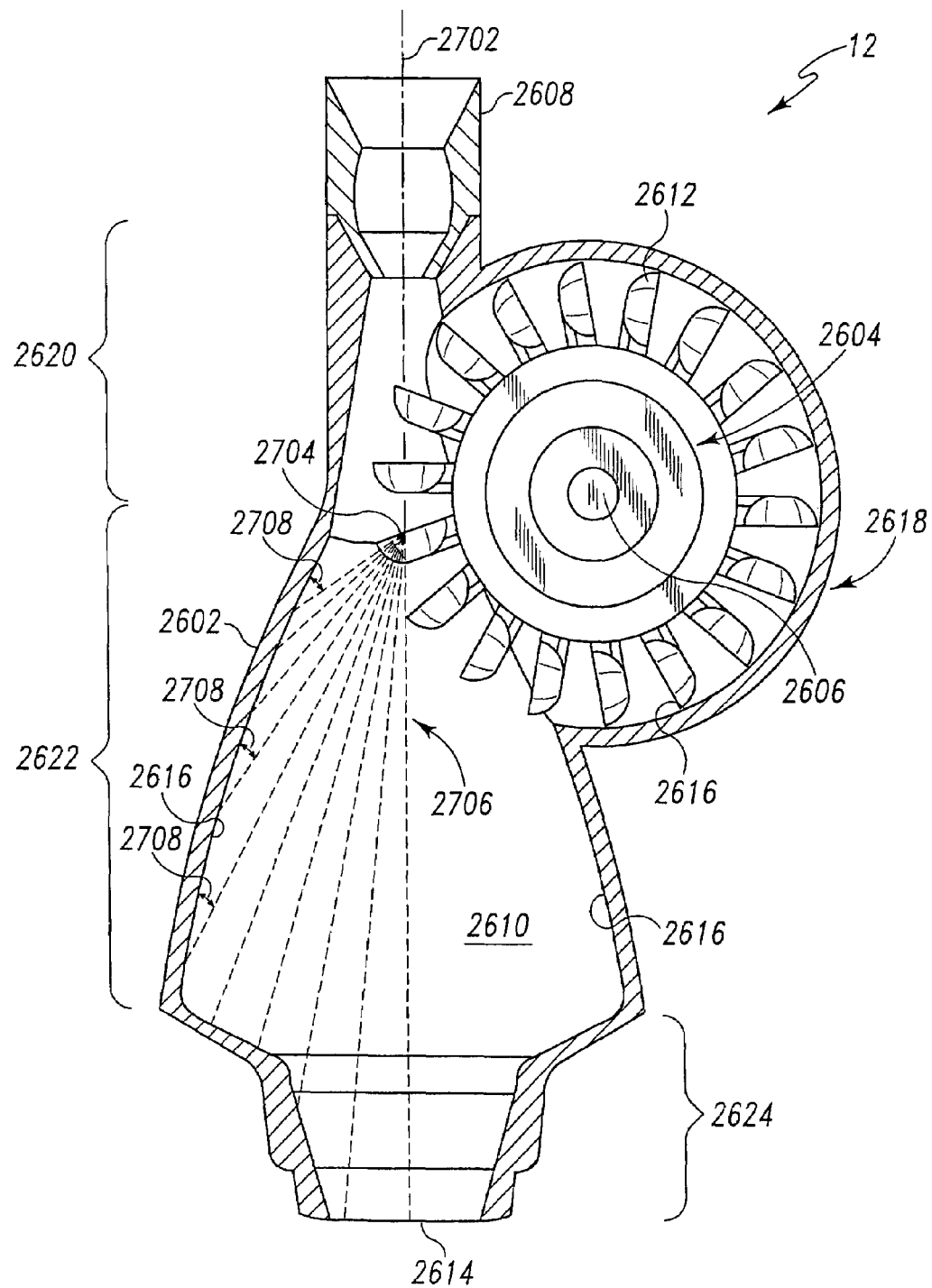
FIG. 27 represents another cross-sectional side view of the hydro-power generation system of FIG. 26.

FIG. 27 is a cutaway side view of the hydro-power generation system 12 that includes the outer housing 2602, the inner housing 2604, the centering rod 2606 and the nozzle 2608. The inner housing 2604 includes the paddles 2612. The outer housing 2602 includes the inner housing section 2618, the nozzle section 2620, the drain section 2622 and the flow collection section 2624.

Following impact of the stream of liquid with the paddles 2612, the stream of liquid may enter the drain section 2622. Due to the impact, the liquid may become a dispersed stream of liquid with a diameter that is larger than the diameter of the nozzle outlet 2624. In addition, liquid spray may be produced by the impact as well as the rotation of the inner housing 2604. The diameter (or spray pattern) of the dispersed stream of liquid may depend on the velocity of the stream of liquid and the amount of electrical load on the generator. When there is little load on the generator, the inner housing 2604 may rotate relatively freely. Thus, the amount of dispersion of the dispersed stream of liquid is relatively small such as for example a dispersion angle of 30 degrees with respect to a central axis 2702 coaxial with the stream of liquid discharged from the nozzle 2608. Conversely, when a large load is present, significant force is required to maintain rotation of the inner housing 2604 and dispersion of the dispersed stream of liquid may result in a dispersion angle as large as 90 degrees with respect to the central axis 2702. Whatever the load, the collision of the liquid with the paddles 2612 may create liquid spray and a dispersed stream of liquid. For purposes of discussion, the dispersion angle of the dispersed stream of liquid is assumed to be about 45 degrees. In other examples, larger or smaller dispersion angles may be used.

Also illustrated in FIG. 27 is an impact point 2704 and a plurality of the trajectory vectors 2706. The impact point 2704 may be the area where the well-defined substantially linear stream of liquid discharged by the nozzle 2608 collides with the paddles 2612. The trajectory vectors 2706 illustrate the paths of the liquid following impact with the paddles 2612 based on the dispersion angle. Liquid following those trajectory vectors 2706 that are closer to the central axis 2702 may directly enter the collector section 2624 and be channeled to the outlet 2614.

Liquid in the trajectories 2706 further away from the central axis 2702, however collide with the interior surface 2616 within the drain section 2622. This liquid is efficiently channeled to the outlet 2614 to minimize fluid impedance. In addition, liquid spray resulting from the collision with the interior surface 2616 is minimized. In the drain section 2622, the interior surface 2616 is configured in a predetermined shape to efficiently channel the liquid to the outlet 2614 and minimize liquid spray. Thus, the previously discussed ducting in the interior surface 2616 is unnecessary. Instead, the interior surface in the second segment 2710 may remain substantially flat and be shaped to act as a reflector and efficiently evacuate liquid from the outer housing 2602 and minimize liquid impedance. Accordingly, the cavity 2610 may be maintained substantially dry with liquid flow rates in a range of about 0.44 liters/minute to about 4.16 liters/minute.

As further illustrated in FIG. 27, the interior surface 2616 within the drain section 2622 may be configured with a predetermined shape. The predetermined shape may be based on a trajectory flow angle 2708 that is formed between each of the trajectory vectors 2706 and the interior surface 2616 within the drain section 2622. The trajectory flow angle 2708 is defined as the angle at the intersection of the interior surface 2616 and the trajectory vectors 2706 followed by the dispersed stream of liquid and liquid spray resulting from impact with the paddles 2612. The shape of the interior surface 2616 may be designed to maintain the trajectory flow angle 2708 followed by the dispersed stream of liquid at less than about twenty degrees. The trajectory flow angle 2708 may vary by plus and minus five degrees based on manufacturing tolerances and/or physical properties associated with the liquid.

The shape of the interior surface 2616 of the second segment 2710 in the illustrated example is configured as a generally cone-shaped rocket nozzle. The shape of the interior surface may be based on modeling or analysis of the behavior of the dispersed stream of liquid resulting from impact with the rotating paddles 2612. By maintaining the trajectory flow angle 2708 followed by the dispersed stream of liquid within about twenty degrees of the interior surface 2616, the liquid may remain in a more organized state with less non-laminar flow.

The more organized state may allow for relatively faster evacuation of the cavity 2610. Thus, the overall size of the outer housing 2602 may be minimized while still maintaining the inner and outer housings 2602 and 2604 substantially dry when liquid is being discharged from the nozzle 2608. In addition, the flow of liquid out of the outlet 2614 may have some magnitude of velocity due to the similarity of the shape of the interior surface and the trajectory vectors 2706. Further, the more organized state of the flowing liquid may minimize liquid spray, and turbulent flow, thus minimizing fluid impedance and maximizing the transfer of kinetic energy to rotational energy.

The shape of the drain section 2622 of the outer housing 2602 may also be implemented on the previously discussed examples of the hydro-power generation system. For example, referring to the hydro-power generation system 12 of FIG. 11, the outer housing 1102 may be rotated ninety degrees such that the nozzle 1108 discharges a stream of fluid vertically. In addition, the outlet 1114 may be moved to the wall of the outer housing 1102 that is opposite the nozzle 1108 and the outer housing may be re-shaped to achieve trajectory flow angles for the trajectory vectors of about twenty degrees or less. In the example hydro-power generation system of FIG. 21, the outer housing 1102 upstream of the outlet 2104 of the plumbing fixture 2100 may simply be re-shaped to achieve trajectory flow angle for the trajectory vectors of about twenty degrees or less.

Figure 28:
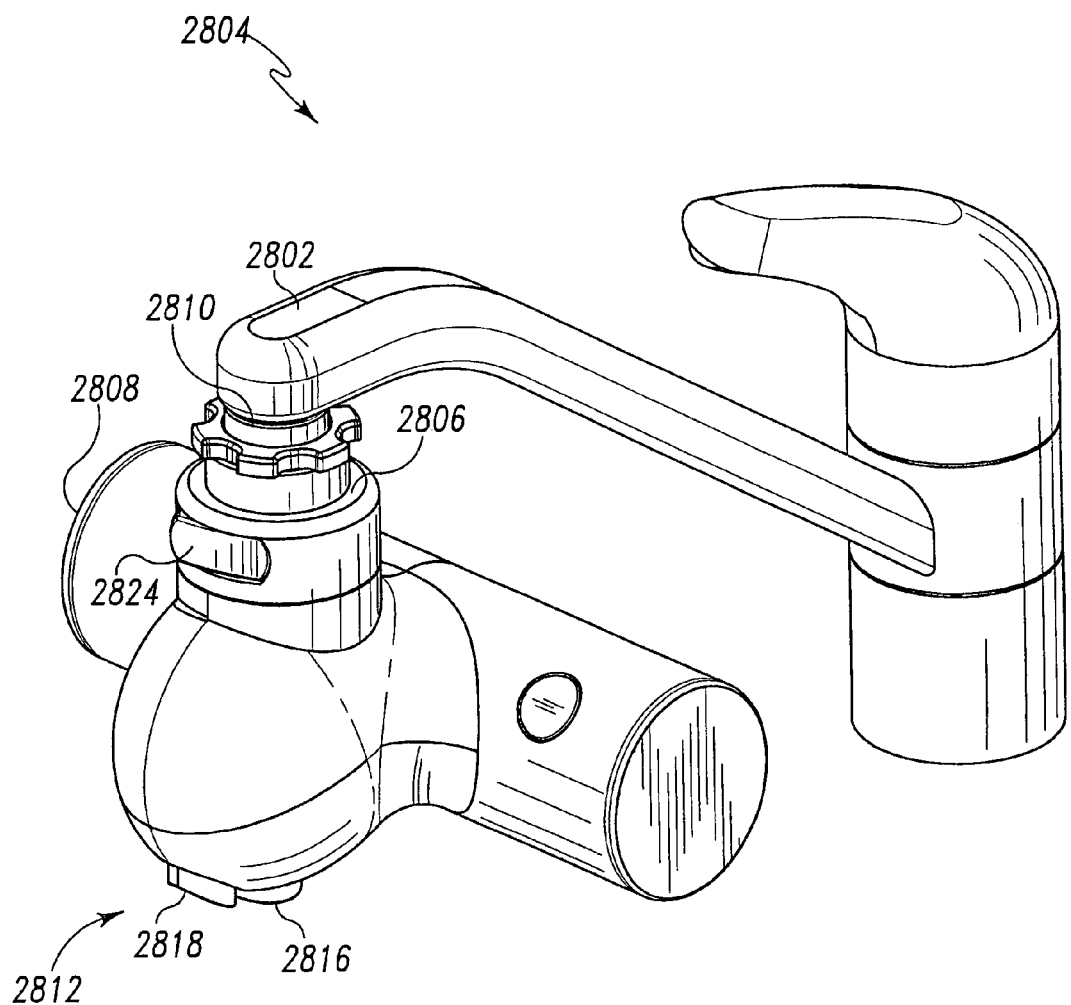
FIG. 28 represents a perspective view of a water treatment system.

FIG. 28 is a perspective view of another example plumbing fixture that is a faucet 2802. The faucet 2802 may be a sink faucet as illustrated, a sillcock, a shower head, or any other plumbing fixture capable of selectively providing a flow of liquid, such as water. Mounted to the end of the faucet 2802 is a water treatment system 2804. In other examples, the water treatment system 2804 may be coupled with a plumbing fixture by hoses or other conduits and be a counter top configuration, an undercounter configuration, etc. In addition, in other examples, the components of the water treatment system 2804 may be separated. For example, some components may be mounted at the end of a faucet and other components that are part of a countertop configuration or an undercounter configuration may be coupled with the end of faucet mounted component(s) by hoses or some other type of conduit.

The illustrated example water treatment system 2804 includes a switch mechanism 2806 coupled with a housing 2808. The switch mechanism 2806 may be coupled with the housing 2808 by snap fit, friction fit, threaded connection, welding or any other coupling mechanism. Alternatively, the switch mechanism 2806 may be formed as part of the housing 2808. The housing 2808 and the switch mechanism 2806 may be formed of plastic, carbon fiber, steel, aluminum and/or any other non-porous material.

The water treatment system 2804 includes an inlet 2810 to receive the flow of liquid from the faucet 2802 and an outlet 2812 for the discharge of the flow of liquid from the water treatment system 2804. The outlet 2812 includes a first outlet 2816 and a second outlet 2818. Liquid flowing from the first outlet 2816 may flow through a first flow path and be treated by the water treatment system 2804. Liquid flowing from the second outlet 2818 may flow through a second flow path and be untreated. The switch mechanism 2806 includes a switch 2824 that may be toggled to select whether liquid will flow from the first outlet 2816 or the second outlet 2818. In other examples, additional outlets included in the water treatment system 2804 may be selectable with one or more switches to provide a flow of treated or untreated liquid. For example, the water treatment system 2804 may include an outlet selectable with a switch to provide a shower spray pattern of untreated liquid similar to a sink sprayer.

Figure 29:
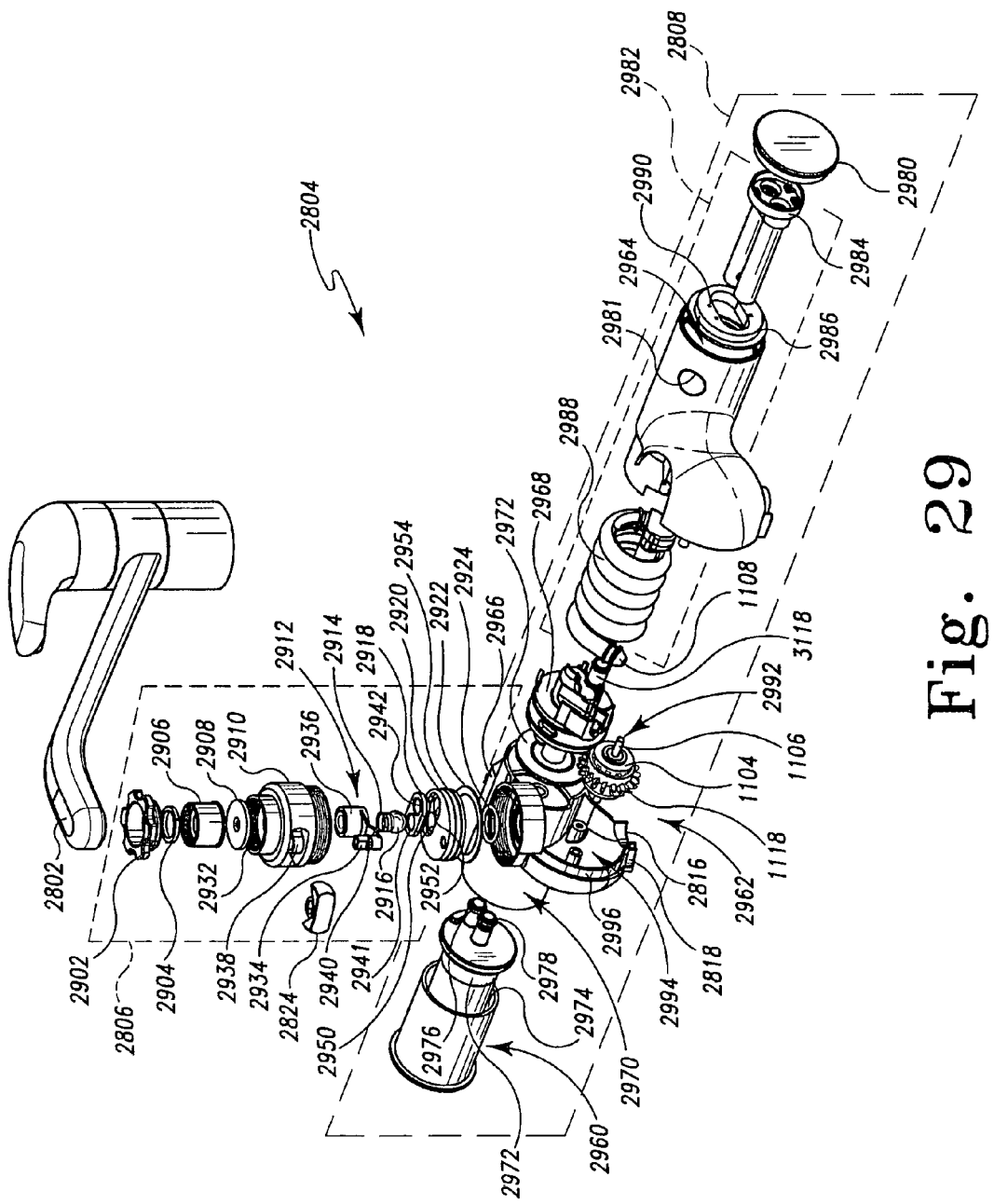
FIG. 29 represents an exploded perspective view of the water treatment system illustrated in FIG. 28.

FIG. 29 is an exploded perspective view of an example of the water treatment system 2804 of FIG. 28. The water treatment system 2804 includes the switch mechanism 2806 and the housing 2808. The switch mechanism 2806 is coupled with the housing 2808 and detachably coupled with the faucet 2802 and allows the selection of a treated or an untreated flow of liquid from the water treatment system 2804.

The switch mechanism 2806 includes the switch 2824, a collar 2902, an upper first gasket 2904, an adapter 2906, an upper second gasket 2908, a valve body 2910, a lever 2912, a spring 2914, a ball 2916, a valve seal 2918, a valve core 2920, an outer lower gasket 2922 and an inner lower gasket 2924. The components forming the switch mechanism 2806 may be steel, plastic, aluminum and/or any other non-porous material. The collar 2902 may be coupled with the valve body 2908 by a threaded connection, as illustrated, a bayonet mount, or any other coupling mechanism. The adaptor 2906 may be held against the valve body 2910 with the collar 2902. The upper first gasket 2904 and the upper second gasket 2908 may be positioned between the collar 2902 and the adaptor 2906 and the collar 2902 and the valve body 2910, respectively. The adaptor 2906 may be formed to create a liquid tight connection, such as the illustrated threaded connection, with the faucet 2802. Alternatively, the adaptor 2906 may form a liquid tight connection with the faucet 2802 by any other form of coupling. Liquid flowing from the faucet 2802 may flow through the collar 2902, the first upper gasket 2904, the adaptor 2906, the upper second gasket 2908 and into the valve body 2910.

Liquid flows into a cavity 2932 formed in the valve body 2910. The lever 2912 includes a first post 2934 and a second post 2936 and is formed to fit within the cavity 2932. The first post 2934 extends through the valve body 2910 and through a ring 2938 that may be formed on the valve body 2910. An o-ring 2940 on the first post 2934 may provide a liquid tight seal to prevent the flow of liquid leaking from the cavity 2932. The first post 2934 is coupled with the switch 2824 such that when the switch 2824 is toggled, the first post 2934 may rotate, thereby pivoting the second post 2936 within the cavity 2932. The second post 2936 may be formed to accommodate the spring 2914 and the ball 2916 such that the spring 2914 maintains constant pressure by the ball 2916 on the seal 2918. Pivoting the second post 2936 may move the ball between a first seat 2941 and a second seat 2942 included in the seal 2918. The first and second seats 2941 and 2942 may each include an orifice providing a separate flow path to the valve core 2920. The valve core 2920 may be formed to accommodate the seal 2918 and includes a first orifice 2950 and a second orifice 2952.

Figure 30:
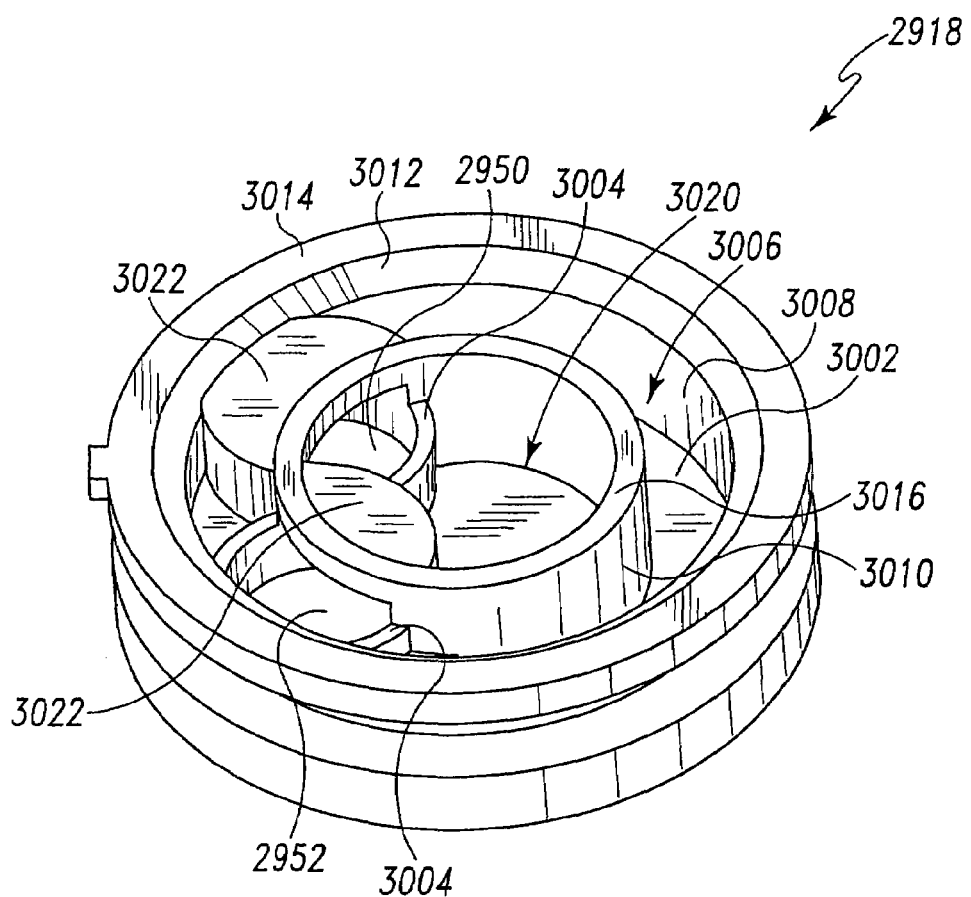
FIG. 30 represents a perspective view of a valve body included in the water treatment system of FIG. 29.

FIG. 30 is a perspective bottom view of the example valve core 2920 illustrated in FIG. 29. The first and second orifices 2950 and 2952 penetrate an upper wall 3002 of the valve core 2920 and are each concentrically surrounded by a lip 3004. Each of the first and second seats 2941 and 2942 (FIG. 29) may be received by the respective first and second orifices 2950 and 2952 and extend toward the lip 3004. The valve core 2920 also includes an outer cavity 3006 formed by the upper wall 3002, an outer wall 3008 and an inner wall 3010 that both extend perpendicular to the upper wall 3002. The outer wall 3008 extends to an outer beveled surface 3012 and an outer lower surface 3014 that is parallel with the upper wall 3002. The inner wall 3010 extends perpendicular to the upper wall 3002 to an inner lower surface 3016 that is also parallel with the upper wall 3002. The inner wall 3010 and the upper surface 3002 form an inner cavity 3020 within the outer cavity 3006. The inner cavity 3020 is separated completely from the outer cavity 3006 by the inner wall 3010.

Each of the first and second orifices 2950 and 2952 are partially enclosed by a cover 3022 that extends from the lip 3004. The cover 3022 partially enclosing the first orifice 2950 extends from the lip 3004 to the outer beveled surface 3012 and is formed to channel liquid flowing through the first orifice 2950 to only the inner cavity 3012. The cover 3022 partially enclosing the second orifice 2952, on the other hand, extends from the lip 3004 to the inner lower surface 3016 and is formed to channel liquid flowing through the second orifice 2952 to only the outer cavity 3006. Thus, the first orifice 2950 and inner cavity 3020 form a portion of the first flow path (treated liquid) and the second orifice 2952 and the outer cavity 3006 form a portion of the second flow path (untreated liquid). The first and second cavities 3006 and 3020 provide separate and independent flow paths due to the inner wall 3010.

Referring again to FIG. 29, the cavity 2932 of the valve body 2910 is formed to accommodate the lever 2912, the spring 2914, the ball 2916, the seal 2918 and the valve core 2920. The valve core 2920 also includes a valve seal 2954 to prevent leakage of flowing liquid from the cavity 2932. The valve body 2910 may be coupled with the housing 2808 by a threaded connection such that the housing 2808 maintains the valve core 2920, etc. in the cavity 2932. In other examples, the valve body 2910 and the housing 2808 may be coupled by any other mechanism.

Referring now to FIGS. 29 and 30, the outer lower gasket 2922 and the inner lower gasket 2924 form a seal between the switch mechanism 2806 and the housing 2808. The outer lower gasket 2922 may be positioned adjacent to the outer lower surface 3014 and the inner lower gasket 2924 may be positioned adjacent to the inner lower surface 3016. Thus, the inner lower gasket 2924 maintains separation of liquid flowing in the first and second flow paths, and the outer lower gasket 2922 prevents the escape of liquid flowing in the second flow path. Liquid flowing in either the first or the second flow path flows into the housing 2808.

The housing 2808 may be formed from plastic, carbon fiber, aluminum, steel or any other non-porous material. As illustrated in FIG. 29, the housing 2808 includes a plurality of modules comprising a first compartment that is a filter module 2960, a second compartment that is a power generation module 2962, a third compartment that is an ultraviolet (UV) dosing module 2964 and a fourth compartment that is an electronics module 2966. The filter module 2960 and the ultraviolet dosing module 2964 are positioned adjacently and form a generally cylindrical portion of the housing 2808. The power generation module 2962 forms a generally spherical shaped portion of the housing 2808 mounted on the cylindrical portion of the housing 2808. In other examples, the configuration and/or shape of the water treatment system 2804 may vary and include fewer or more modules within the housing 2808 to accommodate the functionality of the water treatment system 2804.

The housing 2808 also includes a manifold 2968 that may be inserted into a central portion 2970 of the housing 2808. The manifold 2968 may be plastic, carbon fiber, aluminum, steel, or any other non-porous material. In the illustrated example, the manifold 2968 is positioned adjacent the power generation module 2962 between the filter module 2960 and the ultraviolet dosing module 2964 in the generally cylindrical portion of the housing 2808. The manifold 2968 includes a manifold cover 2972 positioned adjacent to the filter module 2960. The manifold 2968 forms part of the first flow path and receives liquid flowing out of the inner cavity 3020 (FIG. 30) of the valve core 2920. The manifold 2968 channels the flow of liquid between the filter module 2960, the ultraviolet (UV) dosing module 2964 and the power generation module 2962. The single piece construction of the manifold 2968 advantageously avoids multiple hoses, fittings and connections and permits the watertight flow of liquid between the modules. Accordingly, manufacturing efficiencies, ease of maintenance and reliability may be improved.

Figure 31:
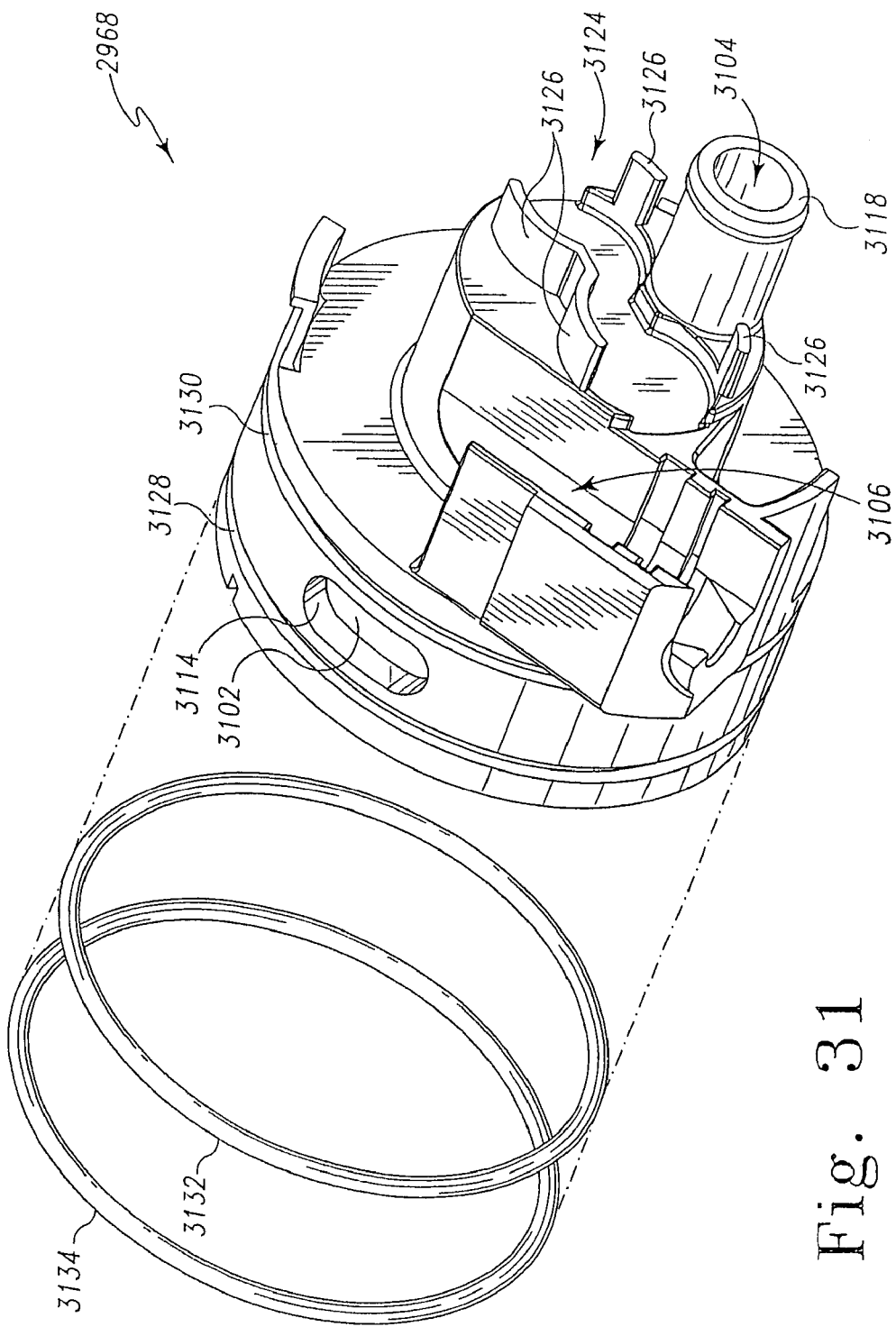
FIG. 31 represents a perspective view of a manifold included in the water treatment system of FIG. 29.

FIG. 31 is a perspective view of the example manifold 2968 illustrated in FIG. 29. The manifold 2968 includes a first passageway 3102 and a second passageway 3104 that are formed to accommodate a flow of liquid. Each of the first and second passageways 3102 and 3104 form a portion of the first flow path (treated liquid flow path). The first passageway 3102 includes a first passageway inlet 3114 and the second passageway 3104 includes a second passageway outlet 3118.

Figure 32:
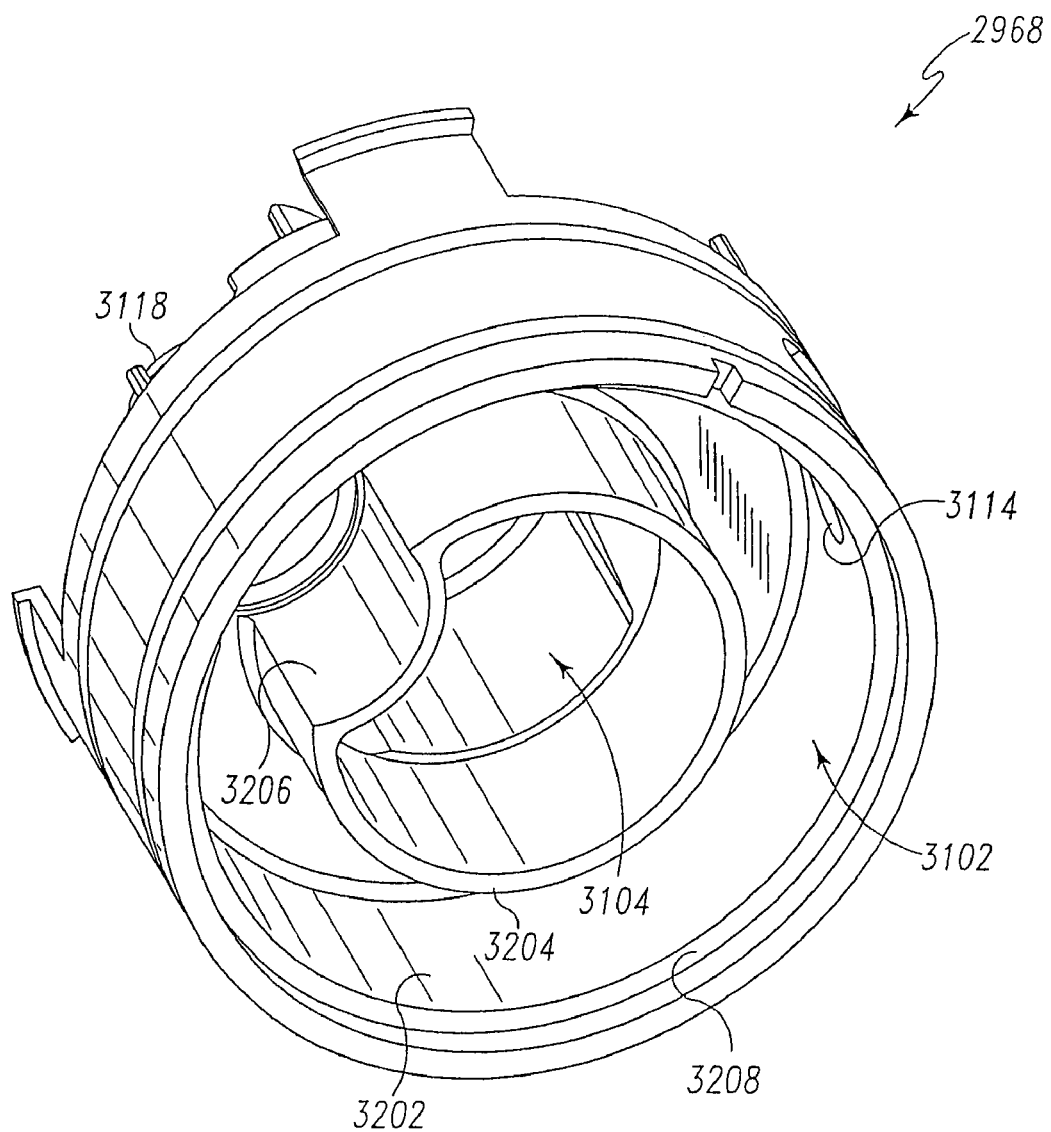
FIG. 32 represents another perspective view of the manifold of FIG. 31.

FIG. 32 is a perspective view of the opposite side of the example manifold 2968 illustrated in FIG. 31 depicting the first passageway 3102, the second passageway 3104, the first passageway inlet 3114 and the second passageway outlet 3118. The generally cylindrical first passageway 3102 is concentrically positioned to surround the generally cylindrical second passageway 3104. A manifold inner wall 3202 and a manifold dividing wall 3204 define the first passageway 3102. The dividing wall 3204 also defines the second passageway 3104 and maintains separation of the first and second passageways 3102 and 3104. The dividing wall 3204 includes a trough 3206 to accommodate a portion of the manifold cover 2972 (FIG. 29). The manifold inner wall 3202 includes a ridge 3208 to couple the manifold cover 2972 (FIG. 29) to the manifold 2968 by, for example, ultrasonic weld. In other examples, the manifold cover 2972 may be coupled with the manifold 2968 by threaded connection, snap-fit, gluing or any other coupling mechanism.

Referring again to FIG. 31, the manifold 2968 also includes a nozzle keeper 3106 and a lamp seat 3124. The nozzle keeper 3106 is configured to engage and maintain the nozzle 1108 (FIG. 29) rigidly coupled contiguous with the manifold 2968. The nozzle 1108 also forms a portion of the first flow path. The lamp seat 3124 includes a plurality of fingers 3126 that rigidly extend outward from the manifold 2968 toward the UV dosing module 2986. The fingers 3126 are configured to cradle and support a UV light source (not shown) included in the UV dosing module 2986 (FIG. 29).

Also included in the manifold 2968 are a first groove 3128 and a second groove 3130 that are formed to accommodate a first gasket 3132 and a second gasket 3134, respectively. The illustrated manifold 2968 is generally cylindrical, and is formed to provide a liquid-tight seal in the generally cylindrical portion of the housing 2808. The liquid-tight seal is formed between the first and second gaskets 3132 and 3134 and an inner wall of the housing 2808 when the manifold 2968 is inserted into the central portion 2970 of the housing 2808 and positioned to receive a flow of liquid from the valve core 2920 (FIG. 29). Liquid received into the housing 2808 from the inner cavity 3020 (FIG. 30) of the valve core 2920 may be channeled to the first passageway 3102 through the first passageway inlet 3114. The first passageway 3102 channels the flow of liquid to the filter module 2960.

As illustrated in FIG. 29, the filter module 2960 includes a filter 2972 disposed in a filter cavity 2974. The filter 2972 may be formed with any porous material that removes particulate, etc. from liquid passed through the filter 2972. In addition, the filter 2972 may include materials, such as activated carbon, etc. to remove odors, chlorine, organic chemicals, etc. from the flow of liquid. The entire filter 2972 and/or portions of the filter 2972 may be replaceable. The filter module 2962 forms a portion of the first liquid flow path and may be filled with liquid flowing through the housing 2808 along the first liquid flow path. In the example configuration illustrated, liquid flowing in the first liquid flow path flows through a filter inlet line 2976 and floods the portion of the filter cavity 2974 surrounding the filter 2972. The flow of liquid passes through the filter 2972 and out of the filter cavity 2974 through a filter outlet line 2978 to the manifold 2968.

Figure 33:
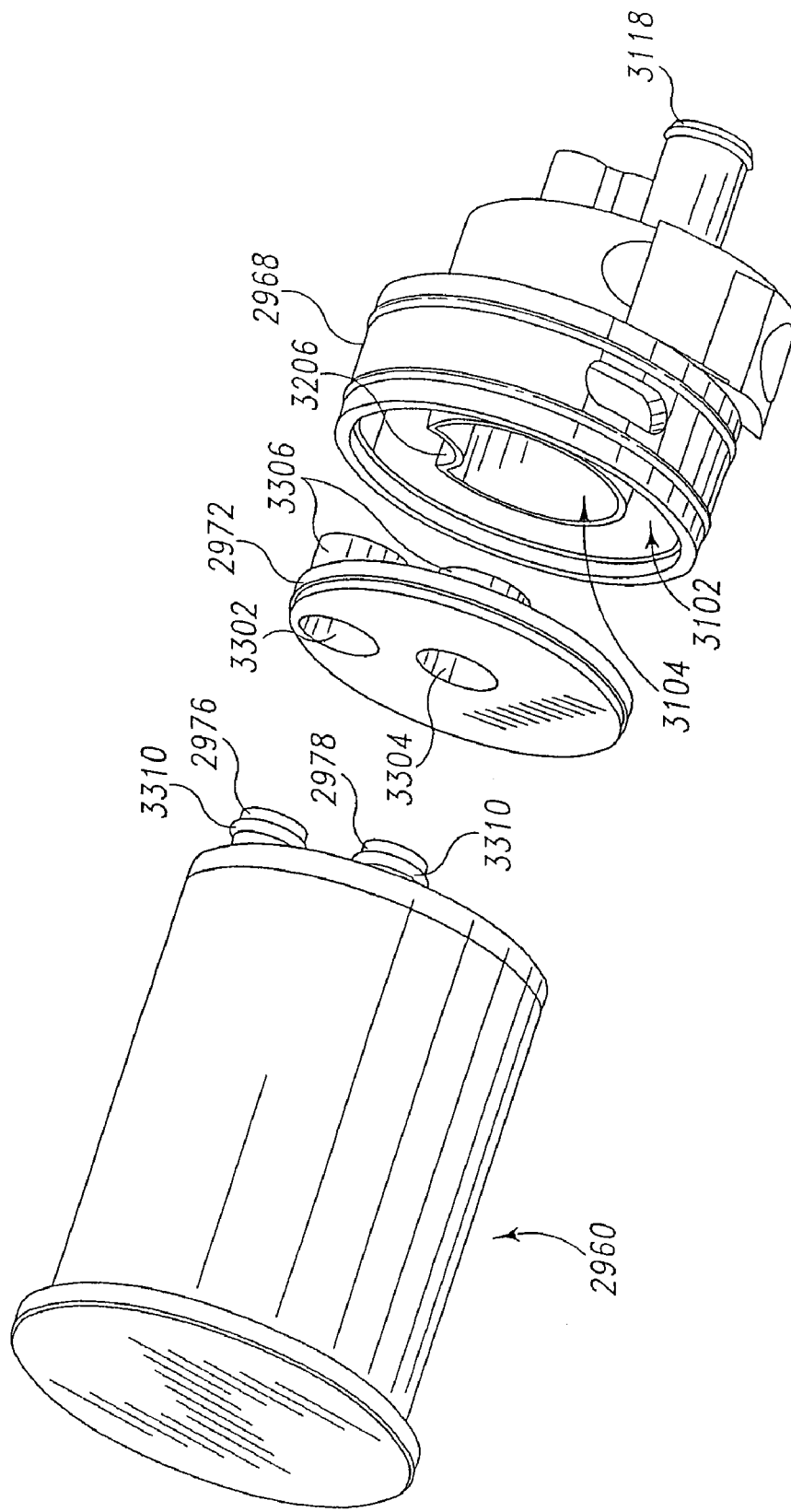
FIG. 33 represents an exploded perspective view of a filter module and a manifold included in the water treatment system illustrated in FIG. 29.

FIG. 33 is an exploded perspective view of the filter module 2960, the manifold 2968 and the manifold cover 2972. The manifold cover 2972 may be formed of plastic, carbon fiber, aluminum, steel or any other material formable to cover the first and second passageways 3102 and 3104. The manifold cover 2972 includes a first cover channel 3302 and a second cover channel 3304 formed with a respective lip 3306. The lip 3306 of the first cover channel 3302 is formed to extend into the first passageway 3102 and be received by the notch 3206. In addition, the first cover channel 3302 may be formed to receive the filter inlet line 2976 and provide a liquid tight connection using a filter gasket 3310. A flow of liquid in the first passageway 3102 may flow through the first cover channel 3302 and into the filter inlet line 2976. The lip 3306 of the second cover channel 3304 may be formed to extend into the second passageway 3104. In addition, the second cover channel 3304 may be formed to receive the filter outlet line 2978 and provide a liquid tight connection using a filter gasket 3310. The flow of fluid through the filter outlet line 2978 may be received by the second passageway 3104 through the second cover channel 3304. Liquid flowing through the second passageway 3104 flows through the second passageway outlet 3118 to the UV dosing module 2964.

Referring again to FIG. 29, the UV dosing module 2964 includes an end cap 2980, a view port 2981 and a UV dosing system 2982. The end cap 2980 forms a portion of the housing 2808 and provides removable access to the UV dosing system 2982. The end cap 2980 may be coupled with the remainder of the housing 2808 by threaded connection, snap-fit or any other detachable coupling mechanism. The view port 2981 may be a window material, such as polycarbonate, to allow visual confirmation that the UV dosing system 2982 is operating.

The UV dosing system 2982 includes a UV light source 2984, a socket 2986 and a reactor vessel 2988. The UV light source 2984 may be any device(s) capable of emitting ultraviolet energy, such as UVC energy in a range of about 100 to about 280 nanometers of UV light, to neutralize biological organisms, such as bacteria, algae, etc. that may be present in the flowing liquid. Example UV light sources include a low-pressure mercury type, a cold cathode type, or a light emitting diode (LED) type. The illustrated UV light source 2984 is a two bulb UV light source that may be continuously operated with an operational wattage, such as about three to about six watts alternating current. In addition, the UV light source 2984 may be initially energized with a determined magnitude of watts, such as, about eight to about twelve watts alternating current. The UV light source 2984 is typically removable and may be electrically coupled with the socket 2986. In the illustrated example, the UV light source 2984 includes posts (not shown) that are inserted into apertures 2990 in the socket 2986 to form an electrical connection.

The socket 2986 may be mounted concentrically in the housing 2808 by threaded connection, glue, fasteners or any other mechanism. The UV light source 2984 may be coupled with the socket 2986 to be adjacent the reactor vessel 2988. The reactor vessel 2988 may be any material that is transparent to ultraviolet energy, such as Teflon, and is capable of being formed into a helically shaped channel for a flow of liquid. The transparent material may allow the liquid flowing through the reactor vessel 2988 to be exposed to ultraviolet energy produced by the UV light source 2984. In the illustrated example, the reactor vessel 2988 is formed with a central cavity that may accommodate the UV light source 2984. The UV light source 2984 may be mounted concentric with and surrounded by the reactor vessel 2988 such that exposure to ultraviolet energy of liquid flowing through the reactor vessel 2988 is maximized. The end of the UV light source 2984 opposite the socket 2986 may engage and rest in the lamp seat 3124 previously discussed with reference to FIG. 31 to maintain the position of the UV light source 2984 in the cavity of the reactor vessel 2988.

Figure 34:
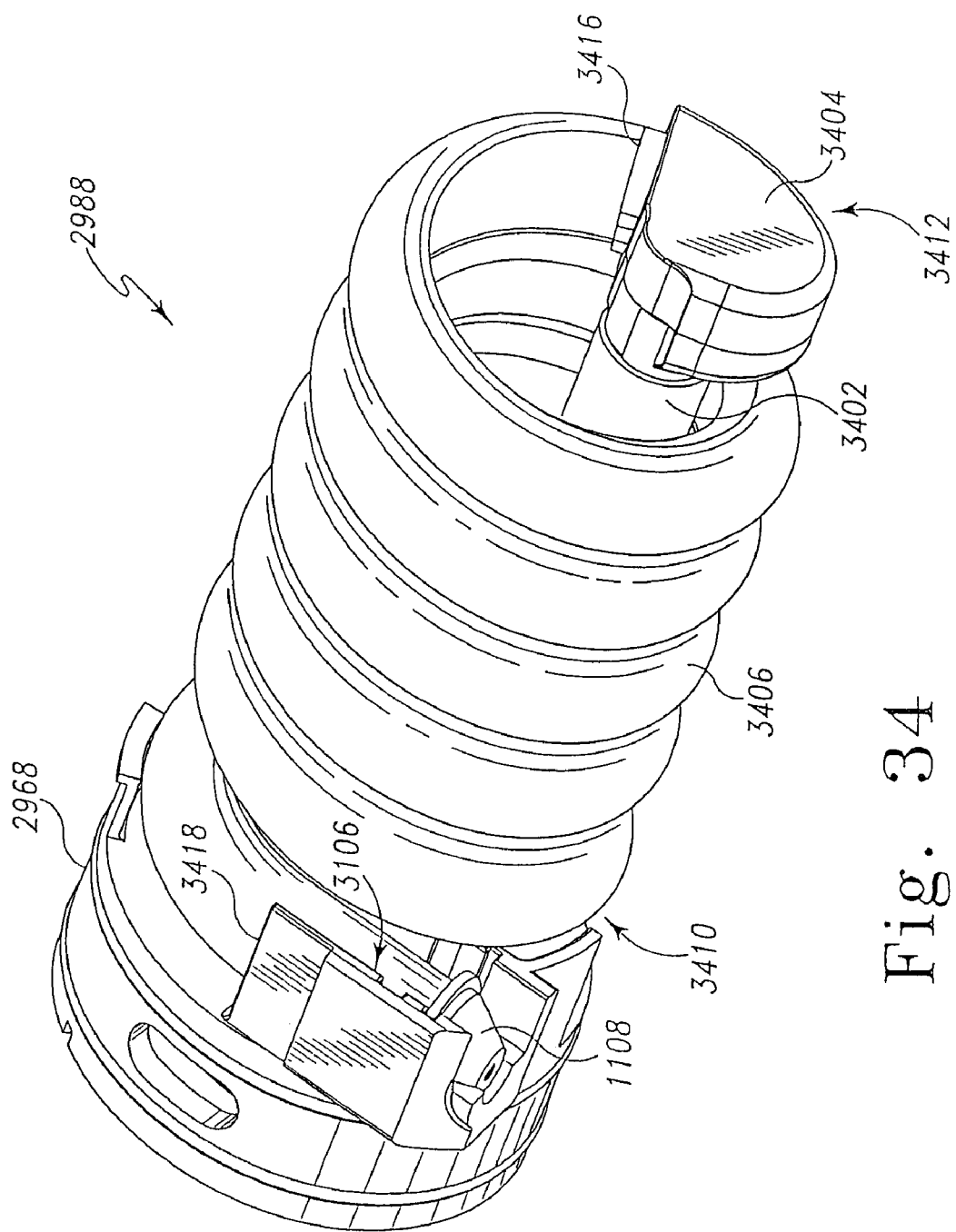
FIG. 34 represents an exploded perspective view of a manifold and a reactor vessel included in the water treatment system illustrated in FIG. 29.

FIG. 34 is a perspective view of the manifold 2968 coupled with the reactor vessel 2988 illustrated in FIG. 29. The reactor vessel 2988 includes a straight section 3402, an elbow 3404 and a helical section 3406 that are part of the first flow path. Although not illustrated, the second passageway outlet 3118 (FIG. 31) is coupled with the straight section 3402 using a water tight connection, such as a friction fit. The straight section 3402 is a conduit that extends through the helical section 3406 from near a first end 3410 to near a second end 3412 of the reactor vessel 2988. The elbow 3404 provides a water tight connection between the straight section 3402 and the helical section 3406.

Figure 35:
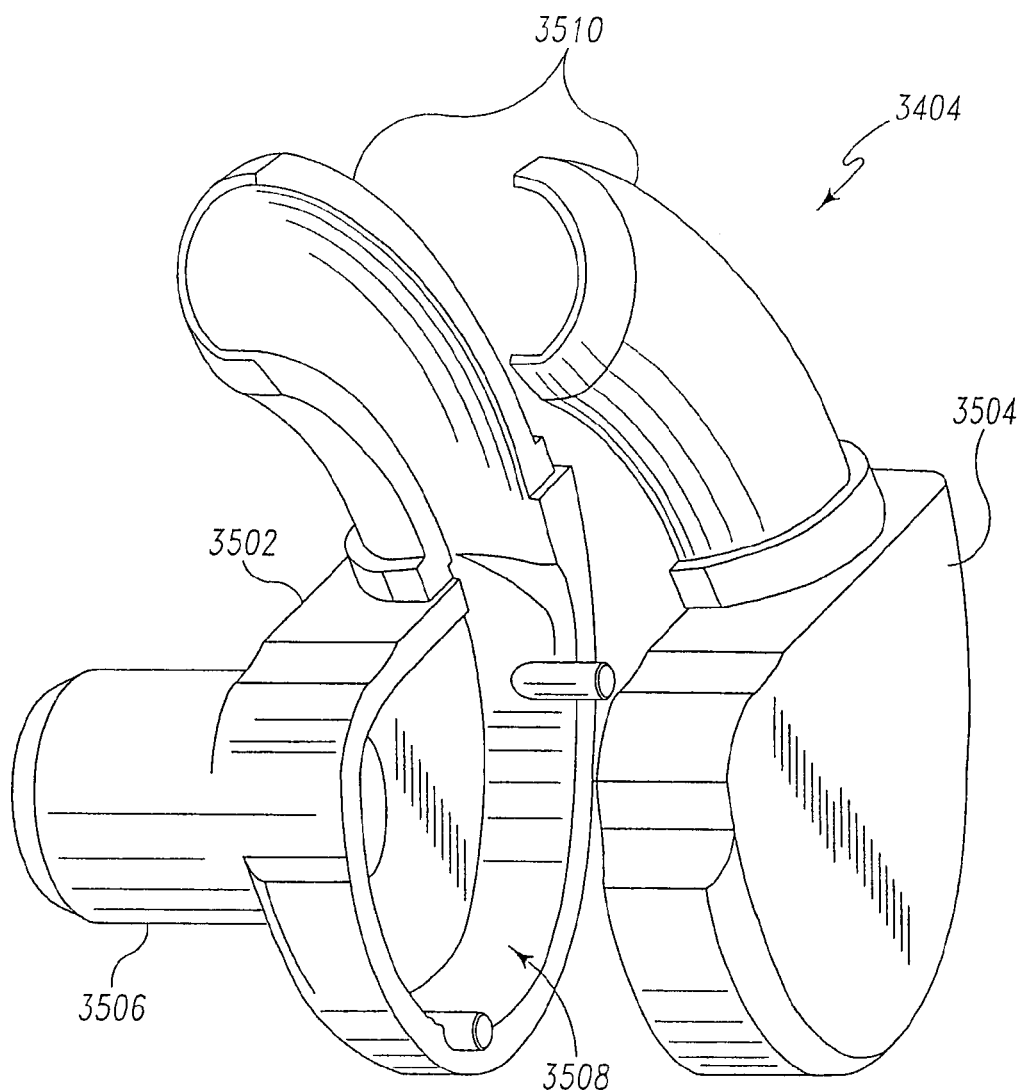
FIG. 35 represents an exploded perspective view of an elbow included in the reactor vessel illustrated in FIG. 34.

FIG. 35 is a perspective view of an example elbow 3404. The elbow 3404 includes a first half 3502 and a second half 3504 that may be formed of plastic, carbon fiber, aluminum, steel or any other non-porous material. The first and second halves 3502 and 3504 may be coupled by gluing, ultrasonic welding or any other coupling mechanism capable of creating a water tight seal. The first half 3502 includes an inlet nipple 3506 that is generally straight and formed to be received in the straight section 3402 (FIG. 34) of the reactor vessel 2988 (FIG. 34). The inlet nipple 3506 defines a passage way into an elbow cavity 3508 defined by the first and second halves 3502 and 3504. An outlet nipple 3510 that is generally curved with a radius of curvature similar to the helical section 3406 is also formed by the first and second halves 3502 and 3504. A flow of liquid entering the elbow cavity 3508 via the inlet nipple 3506 may exit the elbow cavity 3508 via the outlet nipple 3510 to the helical section 3406 (FIG. 34) of the of the reactor vessel 2988 (FIG. 34). Alternatively, the straight section 3402 and the helical section 3406 may be formed as a single continuous passageway and the elbow 3404 may be omitted.

As illustrated in FIG. 34, the helical section 3406 includes a helical inlet 3416 and a helical outlet 3418. The helical inlet 3416 is formed to accept the outlet nipple 3510 and create a water tight connection. The helical outlet 3418 is at the first end 3410 adjacent to the inlet to the straight section 3402. Accordingly, liquid flows into, and out of, the reactor vessel 2988 at the same end. The helical outlet 3418 is formed to couple with the nozzle 1108 (FIG. 29) and form a watertight seal. FIG. 34 also depicts the nozzle 1108 engaged in the nozzle keeper 3106 and a cavity within the helical section 3406 formed to receive the UV light source 2984 (FIG. 29).

Referring to FIGS. 29 and 34, the reactor vessel 2988 forms a helix with an outside diameter that fits within the UV dosing module 2964 of the housing 2808 and an inside diameter that accommodates the UV light source 2984 and the straight section 3402. Within the UV dosing module 2964, the reactor vessel 2988 may be surrounded by a reflector (not shown) to reflect UV energy emitted by the UV light source 2984 towards the cavity within the helical section 3406. Alternatively, the inner wall of the housing 2808 adjacent the reactor vessel 2988 may have a reflective surface. When the UV light source 2984 is concentrically positioned in the helical section 3406, liquid may flow parallel with the UV light source 2984 through the straight section 3402 and circulate around the UV light source 2984 through the helical section 3406 to maximize radiation exposure of the flow of liquid. Liquid may flow from the second passageway outlet 3118 through the straight section 3402, the elbow 3404, the helical section 3406 and the helical outlet 3418 to the nozzle 1108. Since liquid flows only in the reactor vessel 2988, the UV dosing module 2964 remains substantially dry.

The flow of liquid from the helical section 3406 may enter the nozzle 1108 and be extruded from the nozzle 1108 as a stream of liquid. At point of entry into the nozzle 1108, the flow of liquid has been filtered by the filter module 2960 and dosed with UV energy by the UV dosing module 2964 and is considered treated liquid. As used herein, the terms "treated liquid" and "treated water" describe liquid that has been filtered and subject to UV energy.

As previously discussed, the nozzle 1108 increases the velocity of pressurized liquid. Pressurized liquid supplied at a first velocity flows through the nozzle 1108 and is discharged from the nozzle 1108 at a second velocity that is substantially higher than the first velocity. The nozzle 1108 is configured to convert the flow of liquid to a stream of liquid that is extruded from the nozzle 1108. The extruded stream of liquid is discharged by the nozzle 1108 in the power generation module 2962.

As illustrated in FIG. 29, the power generation module 2962 includes the previously discussed hydro-power generation system. The hydro-power generation system comprises the nozzle 1108 and a hydro-generator 2992. The hydro-generator 2992 includes a generator housing that is the inner housing 1104, the centering rod 1106 and the paddles 1118 that are similar to the embodiments discussed with reference to FIGS. 11-27. Accordingly, a detailed discussion of the previously discussed features of the hydropower generation system will not be repeated. It should be understood that features and/or components similar to any of the previously discussed embodiments of the hydro-power generation system may be included in the power generation module 2962.

The power generation module 2962 also includes an outer housing 2994 that forms a first liquid flow passage that is part of the first flow path (treated liquid flow path) through the housing 2808. The outer housing 2994 may be similar to the outer housing 1102 discussed with reference to FIGS. 11-22 and/or the outer housing 2602 discussed with reference to FIGS. 26-27. The first outlet 2816 that provides treated liquid is supplied from the liquid flowing through the outer housing 2994.

The power generation module 2962 further includes a second liquid flow passage. The second liquid flow passage is an untreated liquid passageway 2996 that forms part of the second flow path. The second outlet 2818 may provide untreated liquid supplied from the untreated liquid passageway 2996. The untreated liquid passageway 2996 is formed with the outside surface of the outer housing 2992 and the inside surface of the housing 2808. In other words, the untreated liquid passageway 2996 is for untreated liquid and flows separately and independently around the outside of the outer housing 2992 within the power generation module 2962 to the second outlet 2818.

Thus, the power generation module 2962 supplies both the first and the second outlets 2816 and 2818. The first liquid flow passageway formed within the outer housing 2992 provides treated liquid to the first outlet 2816, and the untreated liquid passageway 2996 provides untreated liquid to the second outlet 2818. A flow of liquid in one of the first or the second liquid flow passage remains apart from and independent of the other liquid flow passage.

Figure 36:
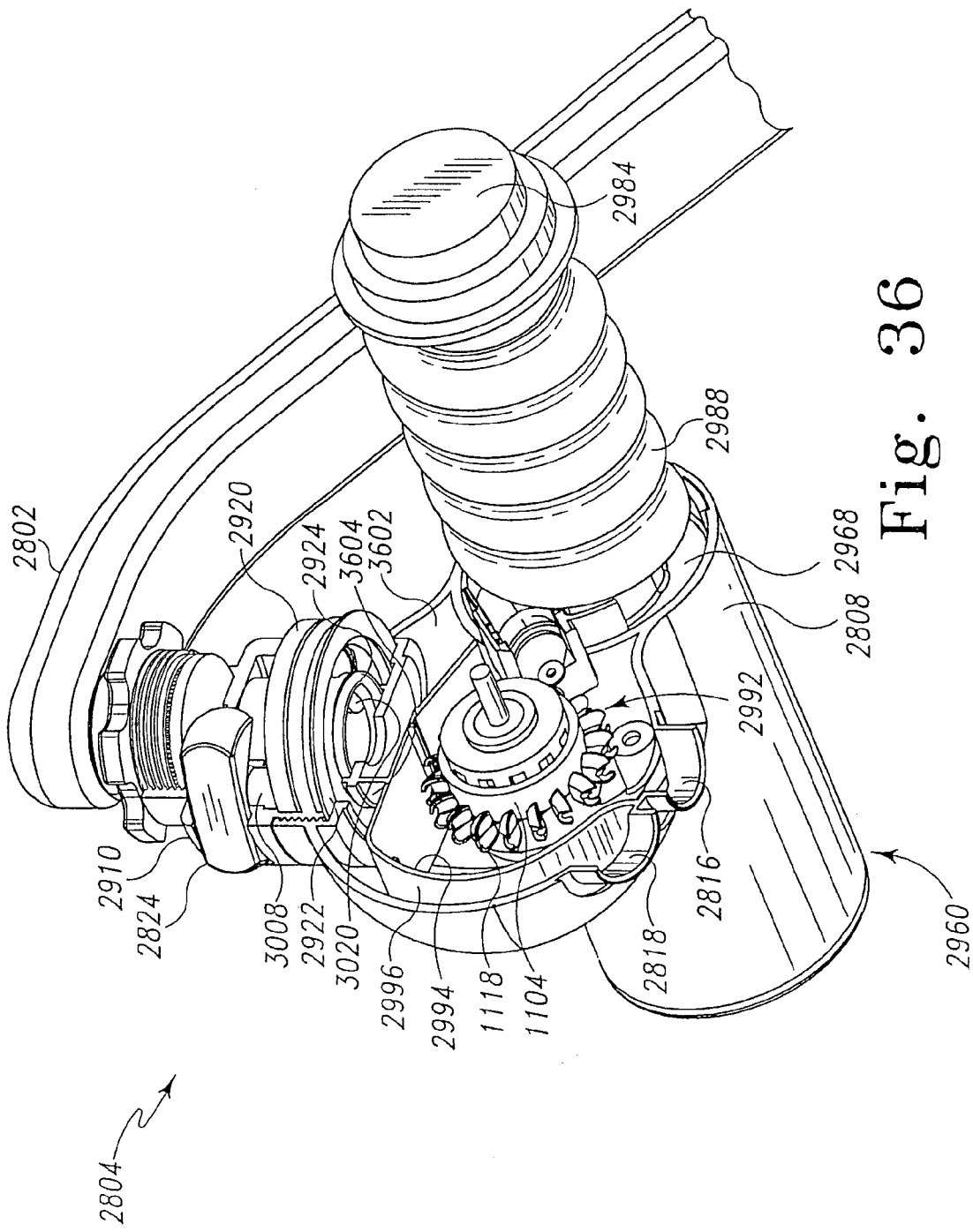
FIG. 36 represents a perspective view of the water treatment system illustrated in FIG. 28 with a portion of the housing removed.

FIG. 36 is a side view of the water treatment system 2804 illustrated in FIGS. 28-35 with a portion of the housing 2808 removed. During operation, when the switch 2824 is in a first position, pressurized liquid flows from the faucet 2802 through the valve body 2910 to the inner orifice 2950 (FIG. 29) and into the first cavity 3020. The inner lower gasket 2924 prevents leakage of the flow of liquid into the outer cavity 3006. The flow of liquid is channeled through a treated liquid passageway 3602 in the housing 2808 to the first passageway inlet 3114 of the manifold 2968. Liquid flowing along the first flow path (treated liquid path) in the housing 2808 does not enter the second flow path (untreated liquid passageway 2996) due to a barrier 3602. As previously discussed, the liquid flows through the filter module 2960 and the reactor vessel 2988 and is sprayed into the outer housing 2994 at high velocity by the nozzle 1108.

The extruded stream of liquid travels through air and strikes the hydro-generator 2992. More specifically, the extruded stream of liquid strikes the paddles 1118 mounted on the surface of the inner housing 1104 to rotate the inner housing 1104. Rotation of the inner housing 1104 generates power to energize and maintain the UV light source 2984. Alternatively, an energy storage device 3740 may be used in conjunction with the hydro-generator to initially energize and maintain energization of the UV light source 2984 as described later. Following impact with the paddles 1118, the liquid is contained in the outer housing 2994 and flows to the first outlet 2816 where it is available as treated liquid for a user of the water treatment system 2804.

When the switch 2824 is toggled to a second position, pressurized liquid from the faucet 2802 flows through the valve body 2910 along the second flow path to the second orifice 2952 (FIG. 30) and into the outer cavity 3006. The outer lower gasket 2922 and the inner lower gasket 2924 prevent leakage of the flow of liquid out of the outer cavity 3006. From the outer cavity 3006, the liquid is channeled to the untreated liquid passageway 2996 and then to the second outlet 2818.

Referring again to FIG. 29, operation, monitoring and control of the water treatment system 2804 may be provided with the electronics module 2966. In the illustrated example, the electronics module 2966 may be a watertight compartment forming a portion of the housing 2808. In other examples, the electronics module 2966 may be multiple smaller compartments, watertight components and/or any other configuration providing the functionality described.

Figure 37:
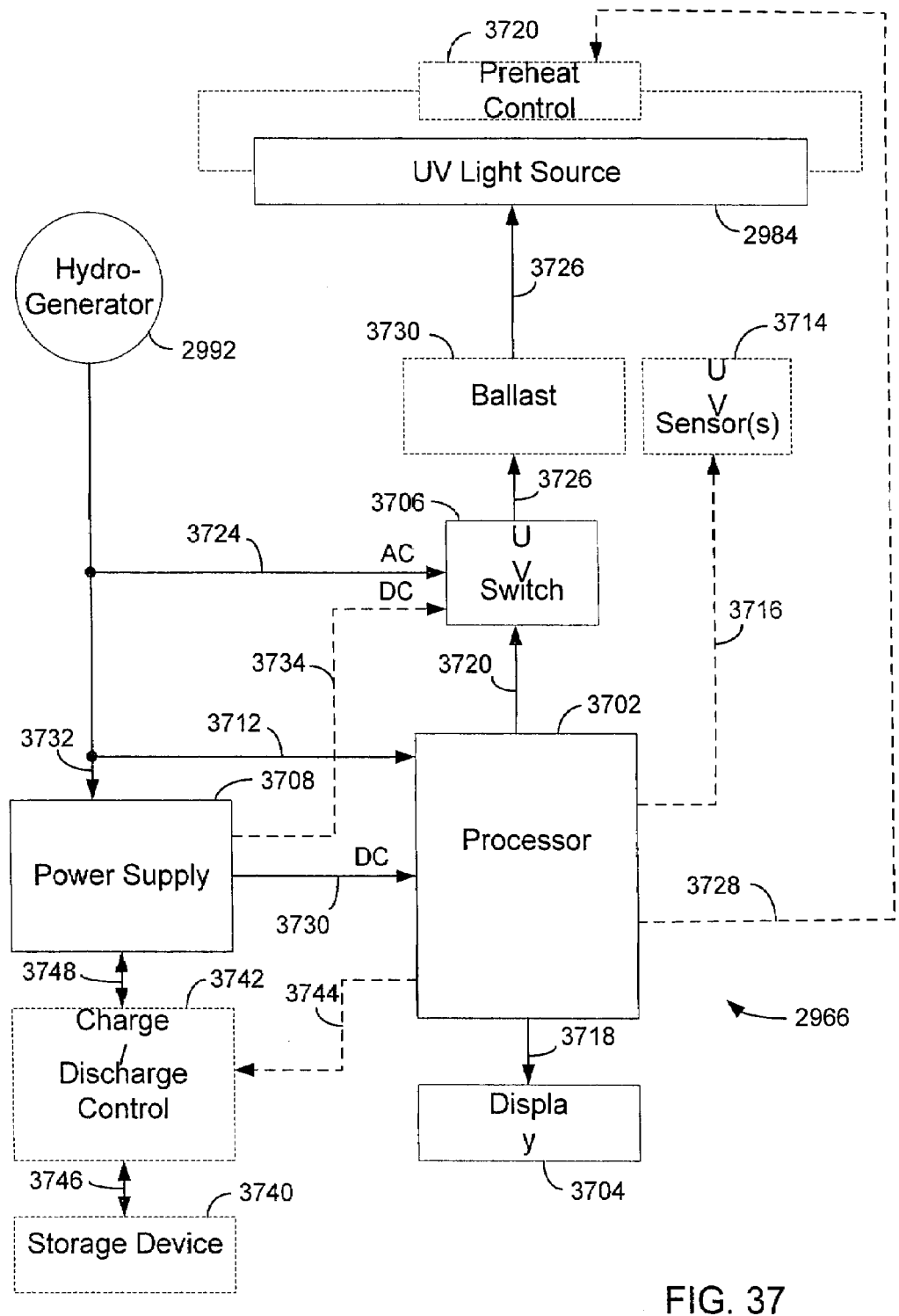
FIG. 37 is a block diagram of a portion of the water treatment system illustrated in FIG. 29.

FIG. 37 is a block diagram of the electronic module 2966 that also includes the UV light source 2984 and the hydrogenerator 2992. The example electronics module 2966 includes a processor 3702, a display 3704, a UV switch 3706 and a power supply 3708. In other examples, additional or fewer components may be used to describe the functionality of the electronic module 2966.

The processor 3702 may be any device capable of executing logic and/or instructions in conjunction with receiving inputs and/or generating outputs to at least one of indicate, monitor, control and operate the water treatment system. The processor 3702 may include memory, such as a memory device, to store instructions and data. The memory may include volatile and non-volatile memory devices. In addition, the processor 3702 may include signal conversion capability such as, analog and digital conversion capability. The processor 3702 may also include signal input/output capability to transmit and receive electric signals and an external communication port(s) to transmit and receive data and/or instructions.

Monitoring, indication, control and distribution of the power generated by the hydro-power generation system may be performed with the processor 3702. Monitoring of the hydro-generator 2992 may include receiving the revolutions-per-minute (RPM), the power output, the temperature, and/or any other operational parameter related to the hydro-generator 2992. In the illustrated example, the processor 3702 receives a signal representative of the power output of the hydro-generator 2992 on a power output line 3712. Based on the frequency of the alternating current (AC) power produced by the hydro-generator 2992, the processor 3702 can determine the RPM of the hydro-generator 2992. The RPM (AC power) may also be used by the processor 3702 to determine a flow rate of the liquid flowing through the first flow path (the treated liquid flow path). Accordingly, filter life, UV light source life, total gallons, or any other usage related parameters may be tracked and recorded by the processor 3702.

As an option, the electronics module 2966 may also include one or more sensors 3714, such as UV sensors, class A sensors, flow sensors, etc. The sensor(s) 3714 may be monitored by the processor 3702 on a sensor monitor line 3716 to determine for example, if the UV light source is operating, UV dosage received by the liquid flowing through the system, flow volumes and rates, etc. Alternatively, the processor 3702 may have stored in memory a predetermined table of lamp dose curves. The lamp dose curves may provide adequate dose levels of UV energy based on the magnitude of power supplied to the UV light source 2984 and length of time of exposure of a flow of liquid to the UV energy.

Using the table and the power output of the hydro-generator 2992, the processor 3702 may determine the amount of on-time needed for the UV light source 2984 to reach dose. As used herein, the term "dose" refers to the amount of UV energy output needed to satisfactorily decontaminate a flow of liquid flowing at a measure flow rate through the reactor chamber 2988 (FIG. 29). By having this table of information and the knowing the present power output level of the hydrogenerator 2992, the microprocessor 3702 may determine the required on-time for the lamp to reach the required dose. It should be recognized that "on-time" of a UV light source refers to the period of time required to strike an arc and ionize the gas to obtain plasma that emits UV energy (the initial light output (ILO)).

System status indication may also be driven by the processor 3702. The display 3704 may be any form of visual and/or audio indication, such as light emitting diodes (LEDs), a liquid crystal display (LCD), light indicators, a piezo, annunciators, etc. The display 3704 may be on/in the electronics module 2966. Alternatively, the display 3704 may be positioned elsewhere on/in the housing 2808 (FIG. 29) in a readily viewable location, such as on/in the generally spherically portion of the housing 2808 (FIG. 29). Visual and/or audio indications driven by the processor 3702 via the display 3704 may indicate remaining life (usage) of the UV light source 2984, remaining life (usage) of the filter 2972 (FIG. 29), if and when UV light source 2984 has reached dose, lack of power to energize the UV light source 2984, system fault, system operational, liquid flow rate or any other system and/or operational indication/status. The processor 3702 may provide signals on a display line 3718 to drive the display 3704.

Control with the processor 3702 may include startup and operational control of the UV light source 2984. As previously discussed, the UV light source 2984 may be initially energized and then continuously energized with electric power generated by the hydro-generator 2992. The processor 3702 may monitor the RPM and/or the power output of the hydro-generator 2992 and energize the UV light source 2984 when the RPM and/or power output is within a determined range. It should be understood that the RPM and the power output generated by the hydro-power generator are interrelated. Accordingly, as RPM increases, power output correspondingly increases, and as RPM decreases, power output correspondingly decreases. The determined range of power output may be selected to minimize the on-time of the UV light source 2984. In other words, the startup time needed for the UV light source 2984 to reach dose may be minimized by the processor 3702. The startup time may be minimized by the processor by selectively energizing the UV light source 2984 during optimum operational conditions, such as when the RPM of the hydro-generator is within a determined range. Minimization of the startup time may provide desirable "instant on" capability of the water treatment system. The instant on capability may minimize the amount of untreated liquid flowing through the first flow path.

The startup time of the UV light source 2984 may also be advantageously reduced based on the configuration of the UV light source 2984. Parameters related to the configuration of the UV light source 2984 that may be advantageously configured may include the size of the filaments of the UV light source 2984, the gas mixture within UV light source 2984 and application of an optional preheat control 3720.

A high energy start of the UV light source 2984 to strike the arc may raise the plasma within the UV light source 2984 to a thermionic temperature. A thermionic temperature that maximizes stability and robustness of the UV energy provided by the UV light source 2984 is desirable. Too low of a thermionic temperature may cause the plasma formed by a high energy start to be unstable. If, on the other hand, the thermionic temperature is too high, the reaction may degrade.

A range of plasma thermionic temperatures may be developed for the UV light source 2984. To obtain a plasma thermionic temperature within the determined range, a determined range of startup voltage (and hence RPM) may be applied to the UV light source 2984 at the direction of the processor 3702. The determined range of plasma thermionic temperatures may be above the plasma thermionic temperature needed to simply form the plasma without stability considerations. Since the plasma thermionic temperature may need to be higher to be within the determined range, the determined range of startup voltage may also be larger in magnitude. The filaments within the UV light source 2984 may be correspondingly sized relatively large to accommodate the magnitude of startup voltage desired to be within the desired thermionic temperature range. Thus, the startup voltage supplied by the hydro-generator 2992 at the direction of the processor 3702 may be larger in magnitude without undesirable effects, and startup time can be minimized.

To maximize the thermionic temperature of the reaction that forms the plasma, a determined mixture of neon and argon may be used in the UV light source 2984. For example, the mixture may be in a range of up to about 5% neon and the remainder argon. Alternatively, the range of neon may be about 5% to about 15%. In still another alternative, the neon may be about 25% or less and the argon may be about 75% or less.

Since power generated by the hydro-generator 2992 may be used to strike the arc and ionize the gases to produce the desired thermionic temperature of the reaction in a desired temperature range, a worst case liquid flow rate and liquid temperature may be used to determine the power generated and thus the resulting thermionic temperature. Once the optimum thermionic temperature range is determined, the processor 3702 may monitor the parameters of the hydro-generator 2992 to energize the UV light source 2984 only when a thermionic temperature within the optimum thermionic temperature range will result when the gases are ionized.

The UV switch 3706 may be controlled by the processor 3702 to control the supply of power from the hydro-generator 2992 to the UV light source 2984. The UV switch 3706 may be a relay, a FET, or some other switching mechanism that may be driven by the processor 3702. The processor 3702 may direct the UV switch 3706 with an enabling signal provided as an output signal on an enablement line 3722. The UV switch 3706 may receive power from the hydro-generator 2992 on a high voltage power line 2724, and transfer the power generated by the hydro-generator 2992 to the UV light source 2984 over a supply power line 3726 when enabled.

The UV dosing system 2988 (FIG. 34) and the hydro-generator 2992 may also be designed to be "load matched" to provide sufficient dose to the flow liquid under various liquid flow conditions. The change in voltage output of the hydro-generator 2992 as the flow rate of the liquid changes may be determined. In addition, the change in UV energy output of the UV light source 2984 as a result of the fluctuating voltage (RPM) of the hydro-generator 2992 may also be determined. Based on these determinations, the hydro-generator 2992 and the UV light source 2984 may be designed to be load matched to provide sufficient dose under any flow rate condition in an expected range of liquid flow rates. In addition, other aspects of the UV dosing system 2988 such as the length of the straight and helical sections 3402 and 3406 (FIG. 34) may be designed to provide sufficient dose under varying flow rates.

The preheat control 3718 may be a mechanical control such as a glow bulb coupled with the UV light source 2984. The glow bulb may short the filaments in the UV light source 2984 when ionization of the gas commences. Once ionization is complete and the reaction in the UV light source 2984 reaches the desire range of thermionic temperature, the glow bulb may remove the short. Alternatively, a thyristor or a thermocouple may perform similar function. In another alternative, the preheat control 3718 may be a shorting switch such as a reed relay or a triac that is controlled by the processor 3702. The processor 3702 may selectively energize and de-energize the shorting switch to minimize on-time of the UV light source 2984 to reach dose. Energization and de-energization of the preheat control 3718 may be enabled by signals from the processor 3702 on a preheat line 3728.

The power supply 3708 may utilize the output power of the hydro-generator 2992 to provide a regulated DC control voltage to supply the processor 3702. The regulated DC control voltage may be supplied to the processor 3702 on a DC control line 3730 as soon as the hydro-generator 2992 begins to rotate. As a result, the processor 3702 may be initially energized and commence with monitoring the power output of the hydro-generator 2992 at substantially the same time the hydro-generator 2992 begins to rotate.

The hydro-generator 2992 may be operated as a high voltage generator in a high voltage mode, or as a low voltage generator in a low voltage mode. For example, in the high voltage mode, the hydro-generator 2992 may include coils configured to produce a high voltage power output to power the UV light source 2984. Alternatively, in the low voltage mode, the hydro-generator 2992 may include coils configured to produce a relatively low voltage power output to power the UV light source 2984.

As used herein, the term "high voltage mode" refers to any magnitude of operational voltage produced by the hydro-generator 2992 that is large enough to directly startup and operate the UV light source 2984. For example, the high voltage mode may provide about 300-400 VAC of initial energization voltage (startup voltage when there is no load on the hydro-generator 2992) and about 20-40 VAC to maintain energization of the UV light source 2984 once startup is complete. The term "low voltage mode" refers to any magnitude of voltage output by the hydro-generator 2992 that may be used by a ballast to startup and operate the UV light source 2984 as discussed later. For example, the hydro-power generator may provide about 6-20 VAC in the low voltage mode. In other examples, other voltage modes and configurations may be used with the hydro-generator 2992 to startup and operate the UV light source 2984.

If the hydro-generator 2992 is operated in the high voltage mode, the high voltage power output may be supplied to the UV switch on the high voltage power line 3724. In addition, the hydro-generator 2992 may include coils configured to provide a lower voltage power output to supply the power supply 3708 on an AC output line 3732. The relatively high voltage AC power supplied to the UV switch 3706 may be used directly by the processor 3702 to strike the arc in the UV light source 2984 when optimum operating conditions are present.

If the hydro-generator 2992 is operated in the low voltage mode to produce a relatively low voltage power output to supply the UV light source 2984, the electronics module 2966 may include a ballast 3730. The ballast 3730 may be coupled in the supply power line 3726 between the UV switch 3706 and the UV source 2984. The UV switch 3706 may also be coupled with the power supply 3708. In this configuration, the UV switch 3706 may be supplied a rectified unregulated DC voltage, such as about 3-12 VDC, by the power supply 3708 based on the supply of power from the hydro-generator 2992 operating in the low voltage mode. The rectified DC voltage may be supplied on a DC voltage supply line 3734. The rectified DC voltage may be converted back to AC power by the ballast 3730 and supplied to the UV light source 2984 upon activation of the UV switch 3706 by the processor 3702 when optimum operating conditions are reached.

At startup with the hydro-generator 2992 operated in the high voltage mode, the UV light source 2984 utilizes minimal current and high voltage as previously discussed. During ionization, the impedance of the UV light source 2984 changes from a relatively high impedance, such as 1 megaohm, to a relatively low impedance such as 100 ohms. Using the hydro-generator 2992 as a direct power source advantageously provides a power source that can be configured to cooperatively operate with the changing impedance of the UV light source 2984.

The hydro-power generator 2992 operated in the high voltage mode may be designed to provide a determined startup voltage to initially energize the UV light source 2984 directly. The determined startup voltage may be a range of voltage that is designed into the hydro-generator 2992 using worse case expected liquid flow rates and temperatures to anticipate a first RPM, and therefore the startup voltage, output by the hydro-generator 2992 under no-load conditions. The processor 3702 may energize the UV light source only when the RPM of the hydro-generator 2992 is in a determined range capable of providing the determined startup voltage. In addition, the hydro-generator 2992 may be configured to provide a running voltage that maintains energization of the UV light source 2984 following initial energization by designing for a corresponding second RPM under worst case expected liquid flow rates and temperatures.

The hydro-generator 2992 operable in the high voltage mode may further be designed with a flywheel effect to substantially maintain the first RPM and therefore the startup voltage for a determined period of time that is long enough to complete initial energization of the UV light source 2984. Substantially maintaining the first RPM allows the hydro-generator 2992 to supply sufficient power under load conditions to strike an arc and ionize the gas within the UV light source 2984 within the desired range of thermionic temperature. The determined period of time may be, for example, 800 microseconds. The processor 3702 may monitor the flywheel effect (the startup voltage) of the hydro-generator 2984 and adjust the determined range of RPM to achieve the determined period of time. Thus, the processor 3702 may continually adjust the optimum time to initially energize the UV light source 2984 to minimize subsequent startups of the UV light source 2984. Due to the continued load of the UV light source 2984, the RPM of hydro-generator 2992 may then reduce to provide the magnitude of operational voltage needed to maintain energization of the UV light source 2984.

When the hydro-generator 2992 is operated in the low voltage mode, the processor 3702 may again determine the optimum time to enable the UV switch 3706 to initially energize the UV light source 2984. The processor 3702 may monitor the RPM (or voltage) of the hydro-generator 2992 for a determined range. Upon reaching the determined range, the UV switch 3706 may provide DC voltage to the ballast 3730 to strike an arc in the UV light source 2984. Due to the determined range, the ballast 3730 may provide a magnitude of voltage capable of striking an arc in the UV light source 2984 within the desired range of thermionic temperature.

The hydro-generator 2992 operating in either the high voltage or the low voltage mode may be effectively "impedance matched" to the UV light source 2984 by the control of the processor 3702. The processor 3702 may monitor the RPM of the hydro-generator 2992 and selectively activate the UV switch 3706 to power the UV light source 2984 when the RPM reaches a determined range to minimize startup. By only striking an arc in the UV light source 2984 when sufficient power is provided from the hydro-generator 2992, the life of the UV light source 2984 may be maximized. In addition, the resulting plasma in the UV light source 2984 may be within a desired range of thermionic temperature that maximizes stability and minimizes variation in the UV energy produced.

In either mode, striking of the arc may be delayed slightly while the processor 3702 waits for the RPM (or voltage) to reach the determined range. The delay may be due to the time required to ramp the rotating inertia of the hydro-generator 2992 to the desired RPM range. The delay may advantageously avoid drawing energy from the hydro-generator 2992 while the hydro-generator 2992 is still ramping up to full speed. Thus a fast and efficient startup of the UV light source 2984 may be achieved that maximizes stability of the ionized gases.

The electronics module 2966 may also include as an option a storage device 3740 and a charge/discharge control 3742. The storage device 3740 may be a capacitor, a battery, or any other energy storage mechanism capable of storing and discharging power. The charge/discharge control 3742 may be any form of switch mechanism, such as a relay or a FET capable of selectively conducting power. The processor 3702 may control operation of the charge/discharge control 3742 with signals provided on a charge/discharge line 3744. The charge/discharge control 3742 may also be coupled with the storage device 3740 by an energy storage line 3746 and with the power supply 3708 by a stored energy line 3748.

The storage device 3740 may be used by the processor 3702 to supply power to the water treatment system when power is not being generated by the hydro-generator 2992. In addition, the storage device 3740 may be used by the processor 3702 to satisfy power requirements that exceed the present power output of the hydro-generator 2992. For example, if the processor 3702 cannot arc the UV light source 2984 due to insufficient RPM of the hydro-generator 2992, the processor 3702 may enable the charge/discharge control to supplement the available power with power from the storage device 3740 and then enable the UV switch 3706 to arc the UV light source 2984. The processor 3702 may also selectively enable the charge/discharge control 3742 when the hydro-generator 2992 is generating sufficient amounts of power to store power in the storage device 3740.

In yet another example, the processor 3702 may initially energize the UV light source 2984 with energy from the storage device 3740. The processor 3702 may enable the UV switch 3706 when the processor 3702 senses rotation of the hydro-generator 2992. In other words, when the processor 3702 senses a flow of liquid along the first flow path. The RPM (or voltage) of the hydro-generator 2992 may then be monitored by the processor 3702 until a determined range is reached that is capable of maintaining energization of the UV light source 2984. The processor 3702 may then switch the supply of power from the storage device 3740 to the hydro-generator with a synch switch (not shown). The storage device 3740 may then be recharged with power generated by the hydro-generator. Thus, the water treatment system may include instant on capability for the UV light source 2984 and be self powered. The option of including the storage device 3740 also provides a low cost and convenient way to provide treated liquid under low liquid pressure conditions such as in some third world countries.

Figure 38:
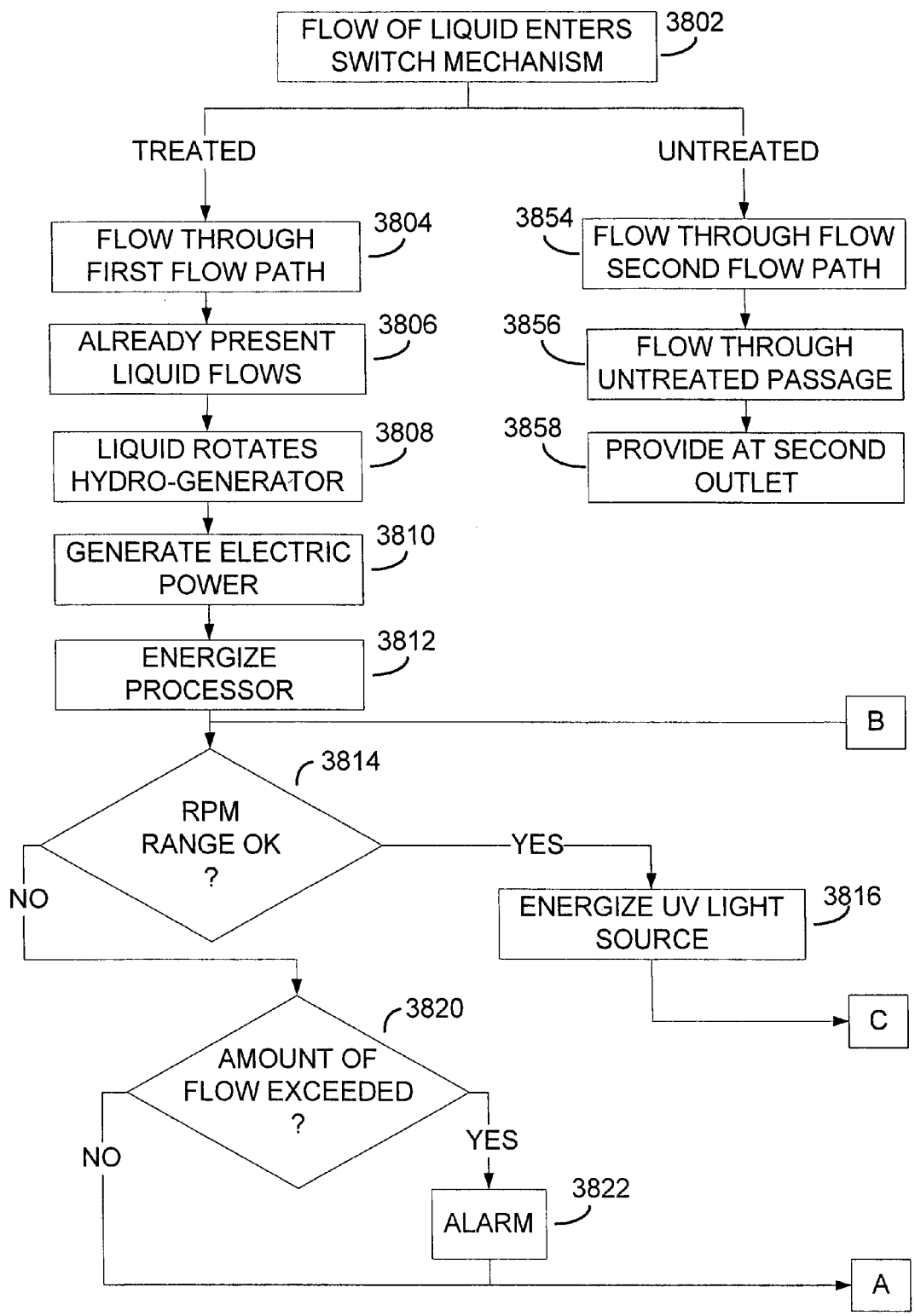
FIG. 38 is a process flow diagram illustrating operation of the water treatment system illustrated in FIG. 29.
Figure 39:
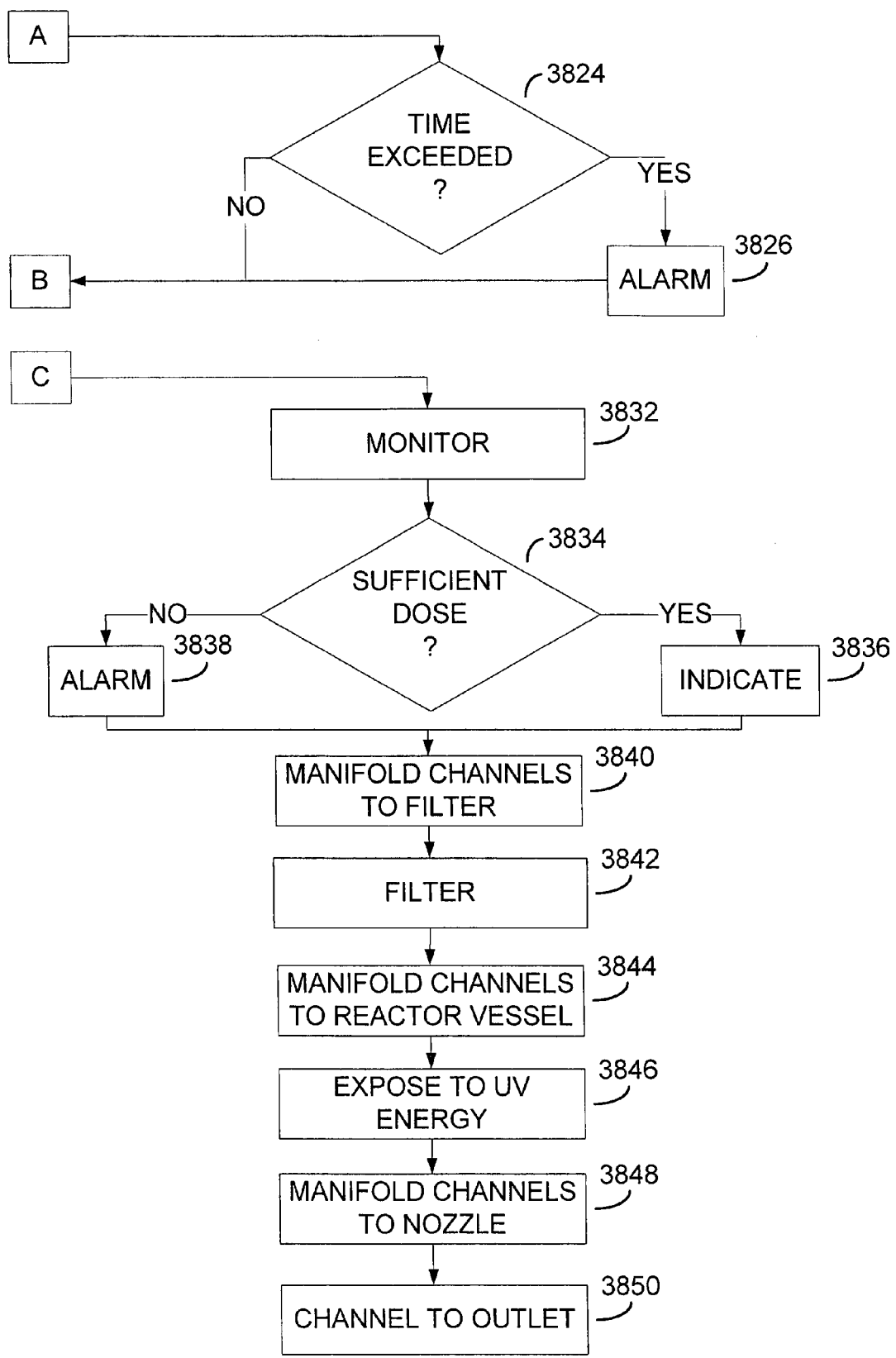
FIG. 39 is a second part of the process flow diagram of FIG. 38.

FIGS. 38-39 are an example operational flow diagram illustrating operation of the water treatment system 2804 previously described with reference to FIGS. 28-37. In the example operation described, it is assumed that the water treatment system 2804 has been previously operated and therefore holds liquid. The operation begins at block 3802 of FIG. 38, when a flow of liquid enters the switch mechanism 2806. If a user of the water treatment system 2804 selects to receive a flow of treated liquid by toggling the switch 2824, liquid flows through the switch mechanism 2806 along the first flow path and into the housing 2808 at block 3804. At block 3806, liquid already present in the first flow path begins to flow. The already present liquid remains from previous use of water treatment system 2804.

The previously present liquid is sprayed in a high velocity extruded stream at the hydro-generator 2992, and the hydro-generator 2992 begins to rotate at block 3808. At block 3810, the hydro-generator 2992 begins to generate electric power. The electric power energizes the processor 3702 at block 3812. At block 3814, the processor 3702 monitors the output power of the hydro-generator 2992 to determine if a determined range of RPM has been reached. If the range of RPM has been reached, the processor 3702 enables the UV switch 3706 to energize the UV light source 2984 at block 3816.

If at block 3814, the RPM is not in the determined range, the processor 3702 monitors the amount of liquid flow and determines if the flow has exceeded a determined amount at block 3820. The determined amount of flow may be that amount of previously present liquid already dosed with UV energy that is present in the reactor vessel 2988. If the determined amount of flow has been exceeded, the processor 3702 may provide an alarm or other indication that the flow of liquid is not sufficiently treated at block 3822.

Referring now to FIG. 39, at block 3824, the processor 3702 determines if a determined period of time, such as three seconds, has been exceeded. If the period of time has not been exceeded, the operation returns to block 3814 to monitor for the determined RPM range. If the period of time has been exceeded, the processor 3702 may generate an alarm with the display 3704 indicating that insufficient power was available to start the UV light source 2984 at block 3826 and the operation returns to block 3814 (FIG. 38). Alternatively, the processor 3702 may enable the storage device 3740 (if present) to provide additional power as previously discussed.

Once the UV light source is energized at block 3816 (FIG. 38), the processor 3702 monitors and tracks flow volume, filter life (usage), UV light source life (usage), etc. at block 3832. If the storage device 3740 is used to start the UV light source 2984, the processor 3702 may also monitor to determine when to switch from power supplied by the storage device 3740 to power supplied by the hydro-generator 2992 based on a determined range of RPM. At block 3834, the processor 3702 may access the tables to determine if the liquid has been subject to a sufficient dose of UV energy. Alternatively, a sensor 3714 may be monitored by the processor 3702 to make the determination. If the liquid has been subject to sufficient dose, the processor 3702 may indicate to the user via the display 3704 that the liquid is treated at block 3836. If the liquid has not been subject to sufficient dose, the processor 3702 may generate an alarm on the display 3704 at block 3838.

At block 3840, the flow of liquid that entered the switch mechanism 2806 enters the manifold 2968 and is channeled to the filter 2972 along the first flow path. The flow of liquid is filtered at block 3842. At block 3844, the filtered flow of liquid returns to the manifold 2968 and is channeled to the reactor vessel 2988 along the first flow path. The filtered flow of liquid is exposed to UV energy within the reactor vessel 2988 at block 3846. At block 3848, the dosed flow of liquid is again returned to the manifold 2968 and is channeled by the nozzle 1108 along the first flow path. The liquid is extruded in a stream of liquid by the nozzle 1108 at the hydro-generator 2992 and is channeled out of the first outlet 2816 along the first flow path at block 3850.

Referring again to FIG. 38, at block 3802, if the user selects untreated liquid, the liquid flows through the switch mechanism 2806 along the second flow path at block 3854. At block 3856, the flow of liquid enters the housing and flows through the untreated liquid passage 2996 along the second flow path. The untreated flow of liquid is provided at the second outlet 2818 at block 3858.

When the user stops the flow of liquid, the processor 3702 may maintain enough holdup power to direct storage of the operational and usage data in non-volatile memory. Alternatively, the storage device 3740 may power the processor 3702. Following completion of the data storage, the processor 3702 may de-energize, and the water treatment system may turn off.

The previously described miniaturized water treatment system is self-powered with a miniature hydro-power generation system that provides a stand alone source of electric power. The electric power may be generated using a flow of liquid that is treated by the miniaturized water treatment system. The miniaturized water treatment system may be mounted at the end of a faucet. Liquid flowing through the miniaturized water treatment system may be selected to flow through a first flow path to provide treated liquid or a second flow path to provide untreated liquid. Liquid flowing through the first flow path may be filtered, subject to UV energy and extruded in a stream to rotate a hydro-generator at high RPM. Rotation of the hydro-generator generates electric power used to initially energize and maintain energization of a UV light source. The electric power may also energize a processor included in the miniaturized water treatment system. The processor controls energization of the UV light source, as well as monitoring and control within the miniaturized water treatment system.

While the present invention has been described with reference to specific exemplary embodiments, it will be evident that various modifications and changes may be made to these embodiments without departing from the spirit and scope of the invention. It is the following claims, including all equivalents, which are intended to define the spirit and scope of the invention.

What is claimed is:

1. A miniature hydro-power generation system, comprising:
   a control circuit;
   a hydro-power generator operable to rotate based on a flow of liquid and generate an electric power output, the electric power output electrically coupled to the control circuit; and
   an energy storage device electrically coupled to the control circuit;

the control circuit operable to monitor a magnitude of voltage present on the electric power output and a charge level of the energy storage device;

the control circuit further operable to enable supply of the electric power output generated with the hydro-power generator to a load and the energy storage device in response to the magnitude of voltage present on the electric power output exceeding a first threshold voltage and the charge level of the energy storage device exceeding a second threshold voltage; and the control circuit further operable to enable the energy storage device to supply stored electric power to the load in response to the magnitude of voltage present on the electric power output being below the first threshold voltage and the charge level of the energy storage device exceeding the second threshold voltage.

2. The miniature hydro-power generation system of claim 1, wherein the control circuit comprises a processor.

3. The miniature hydro-power generation system of claim 1, wherein the control circuit comprises a load control switch coupled between the energy storage device and the load, and the control circuit is further operable to open the load control switch in response to the charge level of the energy storage device being depleted to a cutoff limit.

4. The miniature hydro-power generation system of claim 3, wherein the control circuit is further operable to remain energized by the energy storage device after the load control switch is opened and generate a status indication on a status output line.

5. The miniature hydro-power generation system of claim 1, wherein the control circuit is further operable to monitor a discharge rate of the energy storage device and switch the energy storage device to maximize a discharge time of the energy storage device.

6. The miniature hydro-power generation system of claim 1, wherein the energy storage device is a plurality of energy storage devices and the control circuit is further operable to selectively switch the plurality of energy storage devices between a series configuration and a parallel configuration with respect to the load to substantially maintain an output voltage supplied to the load within a predetermined range.

7. The miniature hydro-power generation system of claim 1, wherein the energy storage device is a plurality of energy storage devices and the control circuit is further operable to selectively switch the plurality of energy storage devices between a series configuration and a parallel configuration with respect to the hydro-power generator in accordance with a threshold magnitude of the electric power output generated with the hydro-power generator being supplied to the plurality of energy storage devices.

8. A miniature hydro-power generation system, comprising:

a hydro-power generator operable to generate electric power in response to rotation with a flow of liquid;

a processor electrically coupled with an output of the hydro-power generator and a load supply line; and an energy storage device electrically coupled with the processor; and the processor configured to monitor a charge stored on the energy storage device and an output voltage of the hydro-power generator; and the processor further configured to selectively supply a load coupled with the load supply line and the energy storage device with the electric power generated with the hydro-power generator based on the charge stored in the energy storage device and the output voltage of the hydro-power generator.

9. The miniature hydro-power generation system of claim 8, wherein the processor is further configured to monitor the output voltage of the hydro-power generator, and enable discharge of the charge stored in the energy storage device to supply the load supply line in response to the output voltage of the hydro-power generator being below a threshold output voltage.

10. The miniature hydro-power generation system of claim 9, wherein the processor is further configured to monitor a discharge rate of the energy storage device and disable discharge of the charge stored in the energy storage device to the load supply line in response to the energy storage device reaching a discharge cutoff.

11. The miniature hydro-power generation system of claim 8, wherein the energy storage device comprises a battery and a capacitor, the processor is further configured to independently switch the battery and the capacitor to charge and discharge based on the output voltage of the hydro-power generator and a voltage level of the load supply line.

12. The miniature hydro-power generation system of claim 11, wherein the processor is further configured to monitor the voltage level on the load supply line and selectively discharge the battery until a predetermined discharge limit is reached and the processor is further configured to begin to also discharge the capacitor to maximize discharge time of the energy storage device.

13. The miniature hydro-power generation system of claim 11, wherein the processor is configured to disconnect the load in response to the energy storage device reaching a predetermined cutoff discharge limit.

* * * * *

UNITED STATES PATENT AND TRADEMARK OFFICE
CERTIFICATE OF CORRECTION

PATENT NO. : 7,663,258 B2  Page 1 of 1
APPLICATION NO. : 11/980944
DATED : February 16, 2010
INVENTOR(S) : David W. Baarman et al.

It is certified that error appears in the above-identified patent and that said Letters Patent is hereby corrected as shown below:

On the Title Page

Item [54], please delete "GENTERATION" and insert --GENERATION--.

Signed and Sealed this

Sixth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,663,258 B2  Page 1 of 1
APPLICATION NO. : 11/980944
DATED : February 16, 2010
INVENTOR(S) : David W. Baarman et al.

It is certified that error appears in the above-identified patent and that said Letters Patent is hereby corrected as shown below:

On the Title Page, Item (54) and at Column 1, line 2 in the title please delete "GENTERATION" and insert --GENERATION--.

This certificate supersedes the Certificate of Correction issued April 6, 2010.

Signed and Sealed this

Twenty-seventh Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,663,258 B2  Page 1 of 1
APPLICATION NO. : 11/980944
DATED : February 16, 2010
INVENTOR(S) : David W. Baarman et al.

It is certified that error appears in the above-identified patent and that said Letters Patent is hereby corrected as shown below:

On the Title Page

Item [60] please delete "7,605,484" and insert --7,663,257--.

Signed and Sealed this

Fifth Day of October, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,663,258 B2 | Page 1 of 1 |
| APPLICATION NO. | : 11/980944 | |
| DATED | : February 16, 2010 | |
| INVENTOR(S) | : David W. Baarman et al. | |

It is certified that error appears in the above-identified patent and that said Letters Patent is hereby corrected as shown below:

On the Title Page

In Column 1, Item [60], please delete "7,605,484" and insert --7,663,257--.

Signed and Sealed this

Sixteenth Day of November, 2010

David J. Kappos
*Director of the United States Patent and Trademark Office*